United States Patent
Zhang et al.

(10) Patent No.: US 10,270,642 B2
(45) Date of Patent: Apr. 23, 2019

(54) METHOD, APPARATUS, AND SYSTEM FOR OBJECT TRACKING AND NAVIGATION

(71) Applicant: ORIGIN WIRELESS, INC., Greenbelt, MD (US)

(72) Inventors: Feng Zhang, Greenbelt, MD (US); Hung-Quoc Duc Lai, Parkville, MD (US); Chun-I Chen, Brookeville, MD (US); Chau-Wai Wong, Raleigh, NC (US); Beibei Wang, Clarksville, MD (US); Chen Chen, College Park, MD (US); Oscar Chi-Lim Au, San Jose, CA (US); Yi Han, Ellicott City, MD (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 15/873,806

(22) Filed: Jan. 17, 2018

(65) Prior Publication Data
US 2018/0183650 A1    Jun. 28, 2018

Related U.S. Application Data

(63) Continuation-in-part of application No. 14/912,324, filed as application No. PCT/US2014/051148 on
(Continued)

(51) Int. Cl.
*H04L 27/36* (2006.01)
*H04W 72/04* (2009.01)
(Continued)

(52) U.S. Cl.
CPC ........ *H04L 27/362* (2013.01); *G01S 13/00* (2013.01); *H04B 1/38* (2013.01); *H04W 72/0413* (2013.01)

(58) Field of Classification Search
None
See application file for complete search history.

(56) References Cited

U.S. PATENT DOCUMENTS

| | | |
|---|---|---|
| 2,933,702 A | 4/1960 | Bogert |
| 3,767,855 A | 10/1973 | Ueno et al. |

(Continued)

FOREIGN PATENT DOCUMENTS

| | | |
|---|---|---|
| EP | 2571214 A2 | 3/2013 |
| WO | 2007/031088 A1 | 3/2007 |

(Continued)

OTHER PUBLICATIONS

U.S. Appl. No. 15/004,314, filed Jan. 22, 2016, Chen et al.
(Continued)

*Primary Examiner* — Jamaal R Henson
(74) *Attorney, Agent, or Firm* — Yingxin Xiao

(57) ABSTRACT

Method, apparatus and systems for object tracking are disclosed. In one example, a disclosed method includes obtaining at least one time series of channel information (CI) of a wireless multipath channel using: a processor, a memory communicatively coupled with the processor and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a current movement of an object in the venue. The method also includes determining a spatial-temporal information of the object based on at least one of: the at least one time series of channel information, a time parameter associated with the current movement, and a past spatial-temporal information of the object. The at least one time series of channel information is preprocessed. Associated computation may be shared among the processor, the Type 1 heterogeneous wireless device and the Type 2 heterogeneous wireless device.

30 Claims, 13 Drawing Sheets

Related U.S. Application Data

Aug. 14, 2014, now Pat. No. 9,900,794, application No. 15/873,806, which is a continuation-in-part of application No. 15/004,335, filed on Jan. 22, 2016, now Pat. No. 10,009,148, and a continuation-in-part of application No. 15/326,112, filed as application No. PCT/US2015/041037 on Jul. 17, 2015, and a continuation-in-part of application No. 14/605,611, filed on Jan. 26, 2015, and a continuation-in-part of application No. 15/584,052, filed on May 2, 2017, and a continuation-in-part of application No. 15/434,813, filed on Feb. 16, 2017, now Pat. No. 10,129,862, and a continuation-in-part of application No. PCT/US2017/021963, filed on Mar. 10, 2017, and a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, which is a continuation-in-part of application No. 13/969,320, filed on Aug. 16, 2013, now Pat. No. 9,559,874, said application No. 15/384,217 is a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,254, which is a continuation of application No. 14/202,651, filed on Mar. 10, 2104, now Pat. No. 9,226,304, said application No. 15/384,217 is a continuation-in-part of application No. 14/605,611, filed on Jan. 26, 2015, and a continuation-in-part of application No. 14/615,984, filed on Feb. 6, 2015, now Pat. No. 9,686,054, which is a continuation-in-part of application No. 15/004,314, filed on Jan. 22, 2016, now Pat. No. 10,014,982, and a continuation-in-part of application No. 15/061,059, filed on Mar. 4, 2016, which is a continuation-in-part of application No. PCT/US2015/041037, which is a continuation-in-part of application No. 14/605,611, filed on Jan. 26, 2015, and a continuation-in-part of application No. 15/268,477, filed on Sep. 16, 2016, now Pat. No. 9,887,864, and a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, and a continuation-in-part of application No. PCT/US2016/066015, filed on Dec. 9, 2016, application No. 15/873,806, which is a continuation-in-part of application No. PCT/US2017/015909, filed on Jan. 31, 2017, and a continuation-in-part of application No. PCT/US2016/066015, filed on Dec. 9, 2016.

(60) Provisional application No. 62/106,395, filed on Jan. 22, 2015, provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/332,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/511,309, filed on May 25, 2017, provisional application No. 62/069,090, filed on Oct. 27, 2014, provisional application No. 62/025,795, filed on Jul. 17, 2014, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/322,575, filed on Apr. 14, 2016, provisional application No. 62/384,060, filed on Sep. 6, 2016, provisional application No. 62/411,504, filed on Oct. 21, 2016.

(51) Int. Cl.
*H04B 1/38* (2015.01)
*G01S 13/00* (2006.01)

(56) References Cited

U.S. PATENT DOCUMENTS

| | | |
|---|---|---|
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,249,252 B1 * | 6/2001 | Dupray .................. G01S 1/028 342/450 |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |
| 7,587,291 B1 | 9/2009 | Sarvazyan et al. |
| 7,768,876 B2 | 8/2010 | Dahl et al. |
| 8,195,112 B1 | 6/2012 | Zhang et al. |
| 8,346,197 B2 | 1/2013 | Huy et al. |
| 8,411,765 B2 | 4/2013 | Smith et al. |
| 8,451,181 B2 | 5/2013 | Huy et al. |
| 8,457,217 B2 | 6/2013 | Huy et al. |
| 8,498,658 B2 | 7/2013 | Smith et al. |
| 8,593,998 B2 | 11/2013 | Huy et al. |
| 8,738,036 B1 * | 5/2014 | Boyle .................. H04W 4/023 455/456.1 |

(56) References Cited

U.S. PATENT DOCUMENTS

| | | | |
|---|---|---|---|
| 8,743,976 B2 | 6/2014 | Smith et al. | |
| 8,792,396 B2 | 7/2014 | Huy et al. | |
| 8,831,164 B2 | 9/2014 | Lu | |
| 9,226,304 B2 | 12/2015 | Chen et al. | |
| 9,402,245 B2 | 7/2016 | Chen et al. | |
| 9,407,306 B2 | 8/2016 | Yang et al. | |
| 9,686,054 B2 | 6/2017 | Yang et al. | |
| 9,736,002 B2 | 8/2017 | Yang et al. | |
| 9,781,700 B2 | 10/2017 | Chen et al. | |
| 9,794,156 B2 | 10/2017 | Ma et al. | |
| 9,882,675 B2 | 1/2018 | Han et al. | |
| 9,883,511 B1 | 1/2018 | Yang et al. | |
| 9,887,864 B1 | 2/2018 | Han et al. | |
| 2001/0022558 A1* | 9/2001 | Karr, Jr. | G01S 1/026 342/450 |
| 2002/0059535 A1* | 5/2002 | Bekritsky | G01S 1/026 713/400 |
| 2003/0138053 A1 | 7/2003 | Candy et al. | |
| 2004/0156443 A1 | 8/2004 | Dent | |
| 2006/0025229 A1 | 2/2006 | Mahajan | |
| 2006/0098746 A1 | 5/2006 | Candy et al. | |
| 2006/0115031 A1 | 6/2006 | Lindskog et al. | |
| 2006/0233221 A1 | 10/2006 | Xu | |
| 2010/0109903 A1 | 5/2010 | Carrick | |
| 2010/0302977 A1 | 12/2010 | Huy et al. | |
| 2010/0309829 A1 | 12/2010 | Huy et al. | |
| 2012/0155515 A1 | 6/2012 | Smith et al. | |
| 2012/0183037 A1 | 7/2012 | Allpress et al. | |
| 2012/0207234 A1 | 8/2012 | De Rosny et al. | |
| 2012/0257660 A1 | 10/2012 | Smith et al. | |
| 2012/0263056 A1 | 10/2012 | Smith et al. | |
| 2012/0328037 A1 | 12/2012 | Hsu et al. | |
| 2013/0034130 A1 | 2/2013 | Forenza | |
| 2013/0201958 A1 | 8/2013 | Huy et al. | |
| 2013/0223503 A1 | 8/2013 | Smith et al. | |
| 2014/0012918 A1* | 1/2014 | Chin | G06Q 50/01 709/204 |
| 2014/0022128 A1 | 1/2014 | Smith | |
| 2014/0126567 A1 | 5/2014 | Husain et al. | |
| 2014/0232380 A1 | 8/2014 | Foletto et al. | |
| 2015/0049792 A1 | 2/2015 | Han et al. | |
| 2016/0018508 A1 | 1/2016 | Chen et al. | |
| 2016/0188631 A1* | 6/2016 | Deb | G06F 17/30241 707/687 |
| 2016/0205569 A1 | 7/2016 | Han et al. | |
| 2017/0188359 A1 | 6/2017 | Liu et al. | |
| 2017/0212210 A1 | 7/2017 | Chen et al. | |
| 2018/0131554 A1 | 5/2018 | Liu et al. | |

FOREIGN PATENT DOCUMENTS

| | | |
|---|---|---|
| WO | 2011/029072 A2 | 3/2011 |
| WO | 2011/029075 A2 | 3/2011 |
| WO | 2012/151316 A1 | 11/2012 |
| WO | 2013/126054 A1 | 8/2013 |
| WO | 2016/011433 A2 | 1/2016 |
| WO | 2017/100706 A1 | 6/2017 |
| WO | 2017/155634 A1 | 9/2017 |
| WO | 2017/156487 A1 | 9/2017 |
| WO | 2017/156492 A1 | 9/2017 |
| WO | 2017/180698 A1 | 10/2017 |

OTHER PUBLICATIONS

U.S. Appl. No. 15/004,335, filed Jan. 22, 2016, Chen et al.
U.S. Appl. No. 15/434,813, filed Feb. 16, 2017, Wu et al.
U.S. Appl. No. 15/061,059, filed Mar. 4, 2016, Ma et al.
U.S. Appl. No. 15/284,496, filed Oct. 3, 2016, Han et al.
Han et al., "Green radio: radio techniques to enable energy-efficient networks", IEEE Commun. Mag., Jun. 2011, pp. 46-54, vol. 49, No. 6.
Chen et al., "Achieving centimeter-accuracy indoor localization on wifi platforms: A frequency hopping approach", IEEE Internet of Things Journal, pp. 111-121, 2017, vol. 4, No. 1.
Kuhn et al., "High accuracy uwb localization in dense indoor environments", in Ultra-Wideband, 2008. ICUWB 2008. IEEE International Conference on, IEEE, 2008, pp. 129-132, vol. 2.
Lee et al., "Ranging in a dense multipath environment using an uwb radio link", IEEE Journal on Selected Areas in Communications, 2002, pp. 1677-1683, vol. 20, No. 9.
Wang et al., "No need to war-drive: Unsupervised indoor localization", in Proceedings of the 10th international conference on Mobile systems, applications, and services, ACM, 2012, pp. 197-210.
Yang et al., "Mobility increases localizability: A survey on wireless indoor localization using inertial sensors", ACM Computing Surveys (Csur), 2015, p. 54, vol. 47, No. 3.
Giustiniano et al., "Caesar: carrier sense-based ranging in off-the-shelf 802.11 wireless lan", in Proceedings of the Seventh Conference on emerging Networking Experiments and Technologies, ACM, 2011, p. 10.
Sen et al., "Bringing cupid indoor positioning system to practice", in Proceedings of the 24$^{th}$ International Conference on World Wide Web, International World Wide Web Conferences Steering Committee, 2015, pp. 938-948.
Bahl et al., "Radar: An in-building rf-based user location and tracking system", in INFOCOM 2000, Nineteenth Annual Joint Conference of the IEEE Computer and Communications Societies, Proceedings IEEE, 2000, pp. 775-784, vol. 2.
Kotaru et al., "Spotfi: Decimeter level localization using wifi", in ACM SIGCOMM Computer Communication Review, ACM, 2015, pp. 269-282, vol. 45.
Gjengset et al., "Phaser: Enabling phased array signal processing on commodity wifi access points", in Proceedings of the 20th annual international conference on Mobile computing and networking, ACM, 2014, pp. 153-164.
Sen et al., "Avoiding multipath to revive inbuilding wifi localization", in Proceeding of the 11th annual international conference on Mobile systems, applications, and services, ACM, 2013, pp. 249-262.
Youssef et al., "The horus wlan location determination system", in Proceedings of the 3rd international conference on Mobile systems, applications, and services, ACM, 2005, pp. 205-218.
Xiong et al., "Tonetrack: Leveraging frequency-agile radios for time-based indoor wireless localization", in Proceedings of the 21st Annual International Conference on Mobile Computing and Networking, ACM, 2015, pp. 537-549.
Golden et al., "Sensor measurements for wi-fi location with emphasis on time-of-arrival ranging", IEEE Transactions on Mobile Computing, 2007, pp. 1185-1198, vol. 6, No. 10.
Castro et al., "A probabilistic room location service for wireless networked environments", in Ubicomp 2001: Ubiquitous Computing, Springer, 2001, pp. 18-34.
Wang et al., "Deepfi: Deep learning for indoor fingerprinting using channel state information", in Wireless Communications and Networking Conference (WCNC), 2015 IEEE, pp. 1666-1671.
Wang et al., "Phasefi: Phase fingerprinting for indoor localization with a deep learning approach", in Global Communications Conference (GLOBECOM), 2015 IEEE, pp. 1-6.
Xiong et al., "Arraytrack: A fine-grained indoor location system", 10th USENIX Symposium on Networked Systems Design and Implementation (NSDI '13), Usenix, 2013, pp. 71-84.
Wu et al., "Csi-based indoor localization", IEEE Transactions on Parallel and Distributed Systems, 2013, pp. 1300-1309, vol. 24, No. 7.
Sen et al., "Precise indoor localization using phy information", in Proceedings of the 9th international conference on Mobile systems, applications, and services, ACM, 2011, pp. 413-414.
Xiao et al., "Mobile speed estimation for tdma-based hierarchical cellular systems", IEEE Transactions on Vehicular Technology, 2001, pp. 981-991, vol. 50, No. 4.
Wang et al., "Green wireless communications: a time-reversal paradigm", IEEE J. Sel. Areas Commun., Sep. 2011, pp. 1698-1710, vol. 29, No. 8.

(56) References Cited

OTHER PUBLICATIONS

Zhang et al., "A timereversal spatial hardening effect for indoor speed estimation", in Proc. of IEEE ICASSP, Mar. 2017, pp. 5955-5959.

Gurbuz et al., "Micro-Doppler-based in-home aided and unaided walking recognition with multiple radar and sonar systems", IET Radar, Sonar Navigation 2017, pp. 107-115, vol. 11, No. 1.

Hsu et al., "Extracting gait velocity and stride length from surrounding radio signals", in Proc. of CHI Conference on Human Factors in Computing Systems, ACM, 2017, pp. 2116-2126.

Qian et al., "Widar: Decimeterlevel passive tracking via velocity monitoring with commodity wi-fi", in Proc. of the 18th ACM International Symposium on Mobile Ad Hoc Networking and Computing, ACM, 2017, p. 6.

Qian et al., "Inferring motion direction using commodity wi-fi for interactive exergames", in Proc. of CHI Conference on Human Factors in Computing Systems, ACM, 2017, pp. 1961-1972.

Sun et al., "WiDraw: Enabling hands-free drawing in the air on commodity WiFi devices", in Proc. of the 21st Annual International Conference on Mobile Computing & Networking, ACM, 2015, pp. 77-89.

Adib et al., "See through walls with WiFi!", SIGCOMM Comput. Commun. Rev., Aug. 2013, pp. 75-86, vol. 43.

Seifeldin et al., "Nuzzer: A large-scale device-free passive localization system for wireless environments", IEEE Transactions on Mobile Computing, Jul. 2013, pp. 1321-1334, vol. 12, No. 7.

Adib et al., "3D tracking via body radio reflections", in 11th USENIX Symposium on Networked Systems Design and Implementation, USENIX Association, 2014, pp. 317-329.

Chen et al., "Achieving centimeter-accuracy indoor localization on WiFi platforms: A multi-antenna approach", IEEE Internet of Things Journal, Feb. 2017, pp. 122-134, vol. 4, No. 1.

Wu et al., "A time-reversal paradigm for indoor positioning system", IEEE Transactions on Vehicular Technology, 2015, pp. 1331-1339, vol. 64, No. 4.

Zhang et al., "Wiball: a timereversal focusing ball method for indoor tracking", arXiv preprint arXiv:1712.06562, 2017.

Ghourchian et al., "Real-Time Indoor Localization in Smart Homes Using Semi-Supervised Learning", Proceedings of the Twenty-Ninth AAAI Conference on Innovative Applications (IAAI-17)), 2017.

Ghourchian, "Location-Based Activity Recognition," Proceedings of the Twenty-Fifth International Joint Conference on Artificial Intelligence (IJCAI-16), 2016.

Chen et al., "Taming the Inconsistency of Wi-Fi Fingerprints for Device-Free Passive Indoor Localization", IEEE Infocom 2017-IEEE Conference on Computer Communications, 2017.

* cited by examiner

METHOD, APPARATUS, AND SYSTEM FOR OBJECT TRACKING AND NAVIGATION

CROSS-REFERENCE TO RELATED APPLICATIONS

The present application hereby incorporates by reference the entirety of the disclosures of, and claims priority to, each of the following cases:
(a) U.S. patent application Ser. No. 14/912,324, entitled "TIME-REVERSAL WIRELESS SYSTEMS HAVING ASYMETRIC ARCHITECTURE," filed on Feb. 16, 2016,
 (1) which is a national stage entry of PCT patent application PCT/US2014/051148, entitled "TIME-REVERSAL WIRELESS SYSTEMS HAVING ASYMETRIC ARCHITECTURE", filed on Aug. 14, 2014, published as WO 2015/023895A1 on Feb. 19, 2015,
(b) U.S. patent application Ser. No. 15/004,335, entitled "TIME-REVERSAL TECHNOLOGIES FOR HYBRID WIRELESS NETWORKS," filed on Jan. 22, 2016,
 (1) which claims priority to U.S. Provisional patent application 62/106,395, entitled "TIME-REVERSAL TECHNOLOGIES FOR HYBRID WIRELESS NETWORKS", filed on Jan. 22, 2015,
(c) U.S. patent application Ser. No. 15/326,112, entitled "WIRELESS POSITIONING SYSTEMS", filed on Jan. 13, 2017,
 (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
   1. which claims priority to U.S. Provisional patent application 62/025,795, entitled "TIME-REVERSAL POSITIONING SYSTEMS", filed on Jul. 17, 2014, and
   2. which claims priority to U.S. Provisional patent application 62/069,090, entitled "TIME-REVERSAL POSITIONING SYSTEMS", filed on Oct. 27, 2014,
(d) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
 (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(e) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
 (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
 (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(f) PCT patent application PCT/US2017/021963, entitled "METHODS, APPARATUS, SERVERS, AND SYSTEMS FOR VITAL SIGNS DETECTION AND MONITORING", filed on Mar. 10, 2017,
 (1) which claims priority to U.S. Provisional patent application 62/307,081, entitled "TR-BREATH: TIME-REVERSAL BREATHING RATE ESTIMATION AND DETECTION", filed on Mar. 11, 2016,
 (2) which claims priority to U.S. Provisional patent application 62/316,850, entitled "TR-BREATH: TIME-REVERSAL BREATHING RATE ESTIMATION AND DETECTION", filed on Apr. 1, 2016,
(g) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017,
 (1) which claims priority to U.S. Provisional patent application 62/307,172, entitled "RADIO SHOT: THROUGH-THE-WALL HUMAN IDENTIFICATION", filed on Mar. 11, 2016,
 (2) which claims priority to U.S. Provisional patent application 62/334,110, entitled "TIME-REVERSAL TRACKING WITHOUT MAPPING", filed on May 10, 2016,
(h) PCT patent application PCT/US2017/027131, entitled METHODS, APPARATUS, SERVERS, AND SYSTEMS FOR OBJECT TRACKING, filed on Apr. 12, 2017,
 (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
 (2) which claims priority to U.S. Provisional patent application 62/334,110, entitled "TIME-REVERSAL TRACKING WITHOUT MAPPING", filed on May 10, 2016, and
 (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(i) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(j) U.S. Provisional patent application 62/593,826, entitled "METHOD, APPARATUS, AND SYSTEM FOR OBJECT TRACKING AND NAVIGATION", filed on Dec. 1, 2017,
(k) U.S. Provisional patent application 62/511,309, entitled "METHODS, DEVICES, SERVERS, APPARATUS, AND SYSTEMS FOR WIRELESS INTERNET OF THINGS APPLICATIONS", filed on May 25, 2017,
(l) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
 (1) which is a Continuation-in-Part of U.S. patent application Ser. No. 13/706,342, entitled "WAVEFORM DESIGN FOR TIME-REVERSAL SYSTEMS," filed on Dec. 5, 2012,
 (2) which is a Continuation-in-Part of U.S. patent application Ser. No. 13/969,271, entitled "TIME-REVER- SAL WIRELESS SYSTEMS HAVING ASYMMETRIC ARCHITECTURE", filed on Aug. 16, 2013, published as US2015/0049745A1 on Feb. 19, 2015,
(3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
(4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/0164669A1 on Jun. 9, 2016, issued as U.S. Pat. No. 9,794,156 on Oct. 17, 2017,
(5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
 a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016,
(6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
 a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
  1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
 a. which claims priority to U.S. Provisional patent application 62/069,090, entitled "TIME-REVERSAL POSITIONING SYSTEMS", filed on Oct. 27, 2014,
 b. which claims priority to U.S. Provisional patent application 62/025,795, entitled "TIME-REVERSAL POSITIONING SYSTEMS", filed on Jul. 17, 2014,
(8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
 a. which claims priority to U.S. Provisional patent application 62/025,795, entitled "TIME-REVERSAL POSITIONING SYSTEMS", filed on Jul. 17, 2014,
(9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016,
 a. which claims priority to U.S. Provisional patent application 62/106,395, entitled "TIME-REVERSAL TECHNOLOGIES FOR HYBRID WIRELESS NETWORKS", filed on Jan. 22, 2015,
(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
 a. which claims priority to U.S. Provisional patent application 62/128,574, entitled "TIME-REVERSAL SCALABILITY FOR HIGH NETWORK DENSIFICATION", filed on Mar. 5, 2015,
(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
 a. which claims priority to U.S. Provisional patent application 62/148,019, entitled "WIRELESS POSITIONING SYSTEMS", filed on Apr. 15, 2015,
 b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
  1. which claims priority to U.S. Provisional patent application 62/025,795 entitled "TIME-REVERSAL POSITIONING SYSTEMS", filed on Jul. 17, 2014, and
  2. which claims priority to U.S. Provisional patent application 62/069,090 entitled "TIME-REVERSAL POSITIONING SYSTEMS", filed on Oct. 27, 2014,
(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016,
 a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
 b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
  1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
   i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,
(13) which is a Continuation-in-Part of U.S. patent application Ser. No. 15/284,496, entitled "TIME-REVERSAL COMMUNICATION SYSTEMS", filed on Oct. 3, 2016,
 a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,
   a. which claims priority to U.S. Provisional patent application 62/265,155, entitled "INDOOR EVENTS DETECTION SYSTEM", filed on Dec. 9, 2015,
   b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
   c. which claims priority to U.S. Provisional patent application 62/383,235, entitled "TIME REVERSAL MONITORING SYSTEM", filed on Sep. 2, 2016,
   d. which claims priority to U.S. Provisional patent application 62/307,081, entitled "TR-BREATH: TIME-REVERSAL BREATHING RATE ESTIMATION AND DETECTION", filed on Mar. 11, 2016,
   e. which claims priority to U.S. Provisional patent application 62/316,850, entitled "TR-BREATH: TIME-REVERSAL BREATHING RATE ESTIMATION AND DETECTION", filed on Apr. 1, 2016,
(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,
(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(18) which claims priority to U.S. Provisional patent application 62/307,081, entitled "TR-BREATH: TIME-REVERSAL BREATHING RATE ESTIMATION AND DETECTION", filed on Mar. 11, 2016,
(19) which claims priority to U.S. Provisional patent application 62/316,850, entitled "TR-BREATH: TIME-REVERSAL BREATHING RATE ESTIMATION AND DETECTION", filed on Apr. 1, 2016,
(20) which claims priority to U.S. Provisional patent application 62/307,172, entitled "RADIO SHOT: THROUGH-THE-WALL HUMAN IDENTIFICATION", filed on Mar. 11, 2016,
(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
(22) which claims priority to U.S. Provisional patent application 62/334,110, entitled "TIME-REVERSAL TRACKING WITHOUT MAPPING", filed on May 10, 2016,
(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(24) which claims priority to U.S. Provisional patent application 62/383,235, entitled "TIME REVERSAL MONITORING SYSTEM", filed on Sep. 2, 2016,
(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
(m) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017,
   (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,
   (2) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
   (3) which claims priority to U.S. Provisional patent application 62/307,081, entitled "TR-BREATH: TIME-REVERSAL BREATHING RATE ESTIMATION AND DETECTION", filed on Mar. 11, 2016,
   (4) which claims priority to U.S. Provisional patent application 62/316,850, entitled "TR-BREATH: TIME-REVERSAL BREATHING RATE ESTIMATION AND DETECTION", filed on Apr. 1, 2016,
   (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
   (6) which claims priority to U.S. Provisional patent application 62/334,110, entitled "TIME-REVERSAL TRACKING WITHOUT MAPPING", filed on May 10, 2016,
   (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
   (8) which claims priority to U.S. Provisional patent application 62/383,235, entitled "TIME REVERSAL MONITORING SYSTEM", filed on Sep. 2, 2016,
   (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,
   (10) which claims priority to U.S. Provisional patent application 62/307,172, entitled "RADIO SHOT: THROUGH-THE-WALL HUMAN IDENTIFICATION", filed on Mar. 11, 2016,
   (11) which claims priority to PCT patent application PCT/US2016/066015, entitled "METHOD, APPARATUS, AND SYSTEMS FOR WIRELESS EVENT DETECTION AND MONITORING", filed on Dec. 9, 2016.

TECHNICAL FIELD

The present teaching generally relates to object tracking. More specifically, the present teaching relates to object tracking and monitoring (including periodic object motion monitoring) based on time-reversal technology in a rich-scattering environment.

BACKGROUND

Regarding object tracking and monitoring, indoor location-based service is becoming more and more important nowadays. One popular approach is to use dead-reckoning method to estimate the location of a moving object in real time. Usually, the moving direction and the moving distance are estimated by inertia measurement unit (IMU). However, the performance of moving distance estimation in the dead-reckoning based approach is far from satisfactory, which is the main reason that such indoor navigation systems are still not popular now.

Estimating the speed of a moving object in an indoor environment, which may assist the location-based service, is also an open problem and no satisfactory results appear yet. The Doppler effect has been widely applied to different speed estimation systems using sound wave, microwave, or laser light. However, low speed such as human walking speed is very difficult to be estimated using Doppler shift, especially using electromagnetic (EM) waves. This is because the maximum Doppler shift is about $\Delta_f = v/cf_0$, where $f_0$ is the carrier frequency of the transmitted signal, c is the speed of light, and v is the human walking speed. Under normal human walking speed v=5.0 km/h and $f_0$=5.8 GHz, $\Delta_f$ is around 26.85 Hz and it is extremely difficult to estimate this tiny amount with high accuracy. In addition, these methods need line-of-sight (LOS) condition and perform poorly in a complex indoor environment with rich multipath reflections.

Most of the existing speed estimation methods that work well for outdoor environments fail to offer satisfactory performance for indoor environments, since the direct path signal is disturbed by the multipath signal in indoor environments and the time-of-arrival (or Doppler shift) of the direct path signal cannot be estimated accurately. Then, researchers focus on the estimation of the maximum Doppler frequency which may be used to estimate the moving speed. Various methods have been proposed, such as level crossing rate methods, covariance based methods, and wavelet based methods. However, these estimators provide results that are unsatisfactory because the statistics used in these estimators have a large variance and are location-dependent in practical scenarios. For example, the accuracy of one existing speed estimation method may only differentiate whether a mobile station moves with a fast speed (above 30 km/h) or with a slow speed (below 5 km/h).

Another kind of indoor speed estimation method based on the traditional pedestrian dead reckoning algorithm is to use accelerometers to detect steps and to estimate the step length. However, pedestrians often have different stride lengths that may vary up to 40% at the same speed, and 50% with various speeds of the same person. Thus, calibration is required to obtain the average stride lengths for different individuals, which is impractical in real applications and thus has not been widely adopted.

Regarding periodic motion detection, many important human vital signs such as breathing are periodic motions. Vital signs are important indicators of a person's health and well-being as well as predictors of acute medical conditions and chronic disease states for a person. Breathing rate is one of the most important vital signs, which may be measured by the number of exhalation and inhalation a person takes per minute. In addition, the breathing pattern may be highly correlated to psychological conditions of a human being, such as stress and anxiety.

Most traditional approaches for breathing monitoring are invasive in that they need physical contact of the human bodies. For instance, in hospitals, the patients are required to wear oxygen masks, Nasal cannulas, chest straps, or wearable sensors such as thermistors and pressure sensors. Another example is Polysomnography (PSG) used in sleep medicine, which typically requires a minimum of 22 wire attachments to the patient. These dedicated devices are often costly and bulky, create discomfort to the human bodies, and are limited only to clinical settings.

Currently existing non-invasive (contact-free) breathing monitoring solutions may be categorized as below.

(1) Radar-based breathing monitoring: Doppler radars are often used in breathing monitoring. They are operated by transmitting a signal and receiving a signal with a Doppler shift due to a periodic motion of objects. The breathing rates may be extracted from the Doppler shift. As a drawback, these systems use high transmission power, rely on sophisticated and expensive hardware, and use extremely large bandwidths. A vital sign monitoring system was disclosed utilizing frequency modulated continuous radar (FMCW). It used Universal Software Radio Peripheral (USRP) as the RF front-end to transmit a frequency-sweeping signal. But the additional cost and complexity of the dedicated hardware limited a large-scale deployment of FMCW radar.

(2) Wireless-sensor based breathing monitoring: The received signal strength (RSS) measurements from 802.15.4 compliant sensors on multiple 802.15.4 channels were also used for breathing detection and breathing rate estimation. Dense deployment of wireless sensors is required in these methods as additional wireless infrastructures. In addition, the specific design of frequency-hopping mechanism is required to support multiple channel measurements.

(3) Wi-Fi-based breathing monitoring: RSS is commonly used in the Wi-Fi-based breathing monitoring due to its availability on most commercial Wi-Fi network interface controllers (NICs). Measurements were also used with Wi-Fi devices for breathing estimation. But this method is accurate only when the users hold the Wi-Fi-enabled devices in close proximity to their chests.

In addition to the drawbacks mentioned above, methods (1) and (2) require design and manufacturing of special devices such as specialized radar devices or sensor network nodes, while method (3) has very low accuracy and sensitivity.

Therefore, there is a need for methods and apparatus for vital sign detection and monitoring to solve the above-mentioned problems and to avoid the above-mentioned drawbacks.

SUMMARY

The present teaching generally relates to object tracking and monitoring. More specifically, the present teaching relates to object tracking based on time-reversal technology in a rich-scattering environment, e.g. an indoor environment or urban metropolitan area, enclosed environment, underground environment, open-air venue with barriers such as parking lot, storage, yard, square, forest, cavern, valley, etc.

In one embodiment, a method performed by a system is disclosed. The method includes obtaining at least one time series of channel information (CI) of a wireless multipath channel using: a processor, a memory communicatively coupled with the processor and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a current movement of an object in the venue. The method also includes determining a spatial-temporal information of the object based on at least one of: the at least one time series of channel information, a time parameter associated with the current movement, and a past spatial-temporal information of the object. The at least one time series of channel information is preprocessed.

A task is performed based on the spatial-temporal information. The task may comprise: locationing of the object, tracking the object, navigation for the object, navigation of the object, obstacle avoidance for the object, tracking activity of the object, detecting motion of the object, detecting/estimating vital signal of the object, detecting/estimating a periodic motion associated with the object, detecting/estimating breathing of the object, detecting an event associated with the current movement of the object, detecting a fall-down of the object, presenting the spatial-temporal information, and/or graphical display of the spatial-temporal information.

The spatial-temporal information (info) may be related to the current movement of the object and may include a location, a location tag, a location label, a starting location, an ending location, a horizontal location, a vertical location, a length, an area, a volume, a capacity, a distance, a direction, a displacement, a displacement vector, a speed, a velocity, a velocity vector, an acceleration, an acceleration vector, a rotational speed, a rotational acceleration, a gait cycle, a motion type, a motion classification, a motion characteristics, a sudden motion, a correlation between two characteristic, a similarity between two characteristics, a co-occurrence of two characteristics, a timed-occurrence of two characteristics, a temporal characteristics, a timing, a time stamp, a time period, a time window, a sliding time window, a time delay, a time mapping, a time label, a time tag, a starting time, an ending time, a temporal profile, a temporal history, a trend, a spatial-temporal trend, a frequency trend, a frequency characteristics, a frequency, a temporal frequency, a spatial frequency, a spatial-temporal frequency, a frequency range, a starting frequency, an ending frequency, a temporal range, a spatial range, a spatial-temporal change, a spatial change, a temporal change, a frequency change, a frequency shift, an information of a periodic motion, an information of a transient motion, a time trend, a frequency trend, a spatial trend, a time-varying characteristics, a steady-state characteristics, a transient characteristics, a consumed characteristics, a remaining characteristics, a stationary characteristics, a cyclo-stationary characteristics, a pseudo-stationary characteristics, an event, a temporal event, a spatial event, a frequency event, a spatial-temporal event, and/or another information.

In one embodiment, the task may comprise a presentation of the spatial-temporal information. It may be presented in an audio-visual way, a graphical way, a textual way, symbolic way or mechanical way. For example, the spatial-temporal information may be a detection of motion of the object in different rooms of a house. A graphical user interface (GUI) may be constructed to show that the whereabout of the object in a house. For example, the object may be a person. The location or approximate location of the object may be shown/marked. And the GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated also. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area. living room, bedroom1, etc. The GUI may be a software for a computer/a tablet, an app on a smart phone (e.g. iPhone, Android phone, etc.), an app in a smart device (e.g. smart glass, smart watch, etc.).

Computation associated with the method may be shared among the processor, the Type 1 heterogeneous wireless device and the Type 2 heterogeneous wireless device.

There may be multiple Type 1 heterogeneous wireless devices interacting with the same Type 2 heterogeneous wireless device, and/or there may be multiple Type 2 heterogeneous wireless devices interacting with the same Type 1 heterogeneous wireless device. The multiple Type 1 devices/Type 2 devices may be synchronized and/or asynchronous, with same/different characteristics/settings. The multiple Type 1 devices/Type 2 devices may operate independently and/or collaboratively. The multiple Type 1 devices/Type 2 devices may be communicatively coupled to same or different servers (e.g. cloud server, edge server, local server). Operation of one device may be based on operation, state, internal state, storage, processor, memory output, physical location, computing resources, network of another device. Difference devices may communicate directly, and/or via another device/server/cloud server. The devices may be associated with one or more users, with associated settings. The settings may be chosen once, pre-programmed, and/or changed over time.

Each channel information may be associated with a time stamp.

A distance of the current movement of the object may be determined (e.g. by an object tracking server, the processor, the Type 1 heterogeneous device, the Type 2 heterogeneous device, and/or another device) based on the one or more time series of the channel information. An estimated direction of the current movement of the object may be obtained. The spatial-temporal information (info) of the object may be determined based on the distance and/or the estimated direction of the current movement of the object.

At least one similarity score may be computed (e.g. by an object tracking server, the processor, the Type 1 heterogeneous device, the Type 2 heterogeneous device, and/or another device). Each similarity score may be based on a pair of temporally adjacent CI of the time series of CI associated with the current movement of the object. A characteristic similarity score may be computed based on the at least one similarity score. A distance of the current movement of the object may be determined based on comparing the characteristic similar score to a reference decay curve. The spatial-temporal information of the object may be determined based on the distance of the current movement of the object.

At least one most recent CI may be determined (e.g. by an object tracking server, the processor, the Type 1 heterogeneous device, the Type 2 heterogeneous device, and/or another device). Each most recent CI may be most recent in one of the one or more time series of CI. One or more time series of similarity scores may be computed. Each similarity score may be computed based on two channel information (CIs) of a particular time series associated with the similarity score. The two CI may be the most recent CI and a temporally adjacent CI within a time window associated with the current movement of the object. At least one curve may be determined. Each curve may be determined based on a time series of similar scores. At least one feature point of a curve may be identified. The spatial-temporal information of the object may be determined/computed based on the at least one feature point. The at least one feature point may include: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and/or another feature point.

At least one second similarity score may be computed (e.g. by an object tracking server, the processor, the Type 1 heterogeneous device, the Type 2 heterogeneous device, and/or another device). Each similarity score may be computed based on an initial CI and a current CI. The initial CI may be temporally close to a beginning of the current movement. The current CI may be temporally close to an end of the current movement, and/or a current moment. A characteristic second similarity score may be determined based on the at least one second similar score. If the characteristic second similarity score is greater than (or "greater than or equal to", or "less than" or "less than or equal to") a threshold, the object may be determined to be stationary and the current movement may be determined to be a null movement, a small movement, and/or a negligibly small movement.

The preprocessing, any postprocessing and/or any main processing may include: doing nothing, zero-padding, time-domain processing, frequency domain processing, time-frequency processing, spatially varying processing, temporally varying processing, adaptive processing, de-noising, smoothing, conditioning, enhancement, restoration, feature extraction, weighted averaging, averaging over antenna links, averaging over selected frequency, averaging over selected components, filtering, linear filtering, nonlinear filtering, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, inverse transform, integer transform, power-of-2 transform, real transform, floating-point transform, fixed-point transform, complex transform, fast transform, Fourier transform, Laplace transform, Hadamard transform, Hilbert transform, sine transform, cosine transform, triangular transform, wavelet transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and/or another preprocessing.

The preprocessing, the post-processing and/or the main process may comprise: normalization, temporal normalization, frequency normalization, magnitude correction, phase correction, phase cleaning, cleaning a phase associated with the channel information, normalizing components associated with the channel information, cleaning a phase of frequency components of the channel information, normalizing the frequency components, re-sampling, labeling, tagging, training, sorting, grouping, folding, thresholding, matched filtering, spectral analysis, clustering, quantization, vector quantization, time correction, time base correction, time stamp correction, sampling rate up-conversion/down-conversion, interpolation, intrapolation, extrapolation, sub-sampling, decimation, compression, expansion, encryption decryption, coding, storing, retrieving, transmitting, receiving, representing, merging, combining, splitting, tracking, monitoring, and another operation etc.

Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

In the case of at least one Type 1 devices interacting with at least one Type 2 devices, the processing, preprocessing, post-processing, and/or other processing may be different for different devices. The processing/preprocessing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

A similarity score may be computed (e.g. by an object tracking server, the processor, the Type 1 heterogeneous device, the Type 2 heterogeneous device, and/or another device) based on a pair of temporally adjacent CI of a particular time series of CI. The similarity score may also be based on a pair of temporally adjacent CI from two different time series of CI. The similarity score may be or may include: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score. The spatial-temporal information of the object may be determined or computed based on the similarity score.

The channel information may be associated with: signal strength, signal amplitude, signal phase, attenuation of the wireless signal through the wireless multipath channel, received signal strength indicator (RSSI), channel state information (CSI), an equalizer information, a channel impulse response, a frequency domain transfer function, information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics, information associated with at least one of: a time period, a time signature, a time amplitude, a time phase, a time trend, and a time characteristics, information associated with at least one of: a time-frequency partition, a time-frequency signature, a time-frequency amplitude, a time-frequency phase, a time-frequency trend, and a time-frequency characteristics, information associated with a direction, an angle of arrival, an angle of a directional antenna, and a phase, and/or another channel information, of the wireless signal through the wireless multipath channel.

An initial spatial-temporal information of the object at an initial time prior to the current movement of the object may be determined (e.g. by an object tracking server, the processor, the Type 1 heterogeneous device, the Type 2 heterogeneous device, and/or another device) based on another time series of another channel information (CI) associated with a prior movement of the object. The another time series of the another channel information may be extracted from a second wireless signal transmitted between a second Type 1 heterogeneous device at a third position (e.g. 408) in the venue and a second Type 2 heterogeneous device at a fourth position in the venue through the wireless multipath channel. The wireless multipath channel may be impacted by the prior movement of the object. The initial spatial-temporal information of the object at the initial time may be determined to be a known location associated with the second Type 1 heterogeneous device and/or the second Type 2 heterogeneous device. A time period may be determined. Within the time period, essentially all (e.g. all except a few, or all without the outliers) corresponding CI of the another time series of the another CI may be larger than a first adaptive threshold and smaller than a second adaptive threshold. The initial time may be determined as a characteristic point of the time period. The spatial-temporal information of the object may be determined based on the initial spatial-temporal information of the object at the initial time. The characteristic point of the time period may be: a mid-point, a quartile point, a percentile point, a starting point, an ending point, a point at which the another CI is locally maximum, a point at which the another CI is locally minimum, a point at which the another CI has a certain characteristic, and/or another characteristic point.

At the initial time during the prior movement of the object, one of the second Type 1 heterogeneous device and the second Type 2 heterogeneous device may be spatially close to and may move with the object during the prior movement of the object. At the initial time, the other one of the second Type 1 heterogeneous device and the second Type 2 heterogeneous device may have a directional antenna. The initial spatial-temporal information of the object at the initial time may be determined (e.g. by an object tracking server, the processor, the Type 1 heterogeneous device, the Type 2 heterogeneous device, and/or another device) to be a known location associated with the other one of the second Type 1 heterogeneous device and the second Type 2 heterogeneous device with the directional antenna.

One of the first Type 1 heterogeneous device and the first Type 2 heterogeneous device may be spatially close to and may move with the object during the movement of the object. One of the first Type 1 heterogeneous device and the first Type 2 heterogeneous device may be communicatively coupled with a network server, and/or communicatively coupled with a local device that may be communicatively coupled with the network server. The local device may be: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and/or another device.

One or more time series of power information (PI) may be computed (e.g. by an object tracking server, the processor, the Type 1 heterogeneous device, the Type 2 heterogeneous device, and/or another device) based on the one or more time series of CI. Each PI may be associated with a CI. The PI may be a complex quantity. The real part of the power information (PI) may be computed based on: magnitude, square of magnitude, phase, real part, imaginary part and another function, of the CI. A first function of the one or more time series of PI may be computed. The first function may include an operation on/of: an autocorrelation function, a square of autocorrelation function, an auto-covariance function, a square of auto-covariance function, an inner product, an auto-correlation-like function, and/or a covariance-like function.

The operation may include: a polynomial function, a linear function, a nonlinear function, a filtering, a denoising, a smoothing, a conditioning, an enhancement, a restoration, a feature extraction, a weighted averaging, a high-pass filtering, a low-pass filtering, a bandpass filtering, a median filtering, a quartile filtering, a percentile filtering, a mode filtering, a linear filtering, a nonlinear filtering, a finite impulse response (FIR) filtering, an infinite impulse response (IIR) filtering, a moving average (MA) filtering, an auto-regressive (AR) filtering, an auto-regressive moving average (ARMA) filtering, a selective filtering, an adaptive filtering, a thresholding, a soft thresholding, a hard thresholding, a soft clipping, a first derivative, a second derivative, a higher order derivative, a local maximization, a local minimization, an optimization of a cost function, a neural network, a machine learning, a supervised learning, an unsupervised learning, a semi-supervised learning, a zero crossing, an absolute function, an indicator function, a Fourier transform, a Laplace transform, a Hadamard transform, another transform, a transformation, a decomposition, a derivative, a first order derivative, a second order derivative, a higher order derivative, a convolution, a multiplication, a division, zero crossing, an indicator function, an absolute conversion, a preprocessing, a post-processing, and/or another operation.

At least one characteristics of the first function may be determined (e.g. by an object tracking server, the processor, the Type 1 heterogeneous device, the Type 2 heterogeneous device, and/or another device). The at least one characteristics may include: a local maximum, a local minimum, a local extremum, a constrained (with argument within a constraint) maximum, a constrained minimum, a constrained extremum, a maximum slope, a minimum slope, a constrained maximum slope, a constrained minimum slope, a maximum higher order derivative, a minimum higher order derivative, a constrained higher order derivative, a zero-crossing, a constrained zero-crossing, a zero-crossing of slope, a zero-crossing of higher order derivative, and/or another characteristics. At least one argument of the first function associated with the at least one characteristics of the first function may be identified. The spatial-temporal information of the object may be determined based on the at least one argument of the first function.

The Type 1 heterogeneous wireless device may be caused to switch (e.g. by an object tracking server, the processor, the Type 1 heterogeneous device, the Type 2 heterogeneous device, and/or another device) wireless coupling from the Type 2 heterogeneous wireless device to a second Type 2 heterogeneous wireless device at another location in the venue. The Type 1 heterogeneous device may be capable of wirelessly coupling with at least two Type 2 heterogeneous devices. A second wireless signal may be caused to be transmitted between the Type 1 heterogeneous device and the second Type 2 heterogeneous device through the wireless multipath channel. The wireless multipath channel may be impacted by the current movement of the object in the venue. One or more second time series of channel information (CI) of the wireless multipath channel may be obtained. The one or more second time series of channel information may be extracted from the second wireless signal. The spatial-temporal information of the object may be determined based on the one or more second time series of channel information.

In another embodiment, an object tracking server includes a processor, a memory communicatively coupled with the processor, and a set of instructions stored in the memory and executed by the processor. When the set of instructions is executed by the processor using the memory, the object tracking server is configured to obtain one or more time series of channel information (CI) of a wireless multipath channel. The at least one time series of channel information is extracted from a wireless signal transmitted between a Type 1 heterogeneous wireless device at a first position in a venue and a Type 2 heterogeneous wireless device at a second position (e.g. 406) in the venue through the wireless multipath channel. The wireless multipath channel is impacted by a current movement of an object in the venue. The object tracking server determines a spatial-temporal information of the object based on: the at least one time series of channel information, a time parameter associated with the current movement, and/or a past spatial-temporal information of the object. The one or more time series of channel information is preprocessed. The spatial-temporal information includes: a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a time stamp, a time period, a time window, a sliding time window, a history, a frequency trend, a spatial-temporal trend, a spatial-temporal change, and an event. The processor shares computational workload with the Type 1 heterogeneous wireless device and Type 2 heterogeneous wireless device.

In yet another embodiment, a system of an object tracking server includes a Type 1 heterogeneous wireless device at a first position in a venue, a Type 2 heterogeneous wireless device at a second position (e.g. 406) in the venue wirelessly coupled with the Type 1 heterogeneous device through a wireless multipath channel associated with the venue, and/or the object tracking server. The object tracking server has a processor, a memory communicatively coupled with the processor and a set of instructions stored in the memory executed by the processor.

The object tracking server, the Type 1 heterogeneous device and the Type 2 heterogeneous device are configured to: obtain at least one time series of channel information (CI) of the wireless multipath channel. The at least one time series of channel information is extracted from a wireless signal transmitted between the Type 1 heterogeneous device and the Type 2 heterogeneous device through the wireless multipath channel. The wireless multipath channel is impacted by a current movement of an object in the venue.

A spatial-temporal information of the object is determined based on: the at least one time series of channel information, a time parameter associated with the current movement, and/or a past spatial-temporal information of the object. The at least one time series of channel information is preprocessed. The spatial-temporal information includes: a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a time stamp, a time period, a time window, a sliding time window, a history, a frequency trend, a spatial-temporal trend, a spatial-temporal change, and an event. Computational workload is shared among the processor, the Type 1 heterogeneous wireless device and Type 2 heterogeneous wireless device.

Other concepts relate to software for implementing the present teaching on object tracking and monitoring (including periodic object motion monitoring) based on time-reversal technology in a rich-scattering environment.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
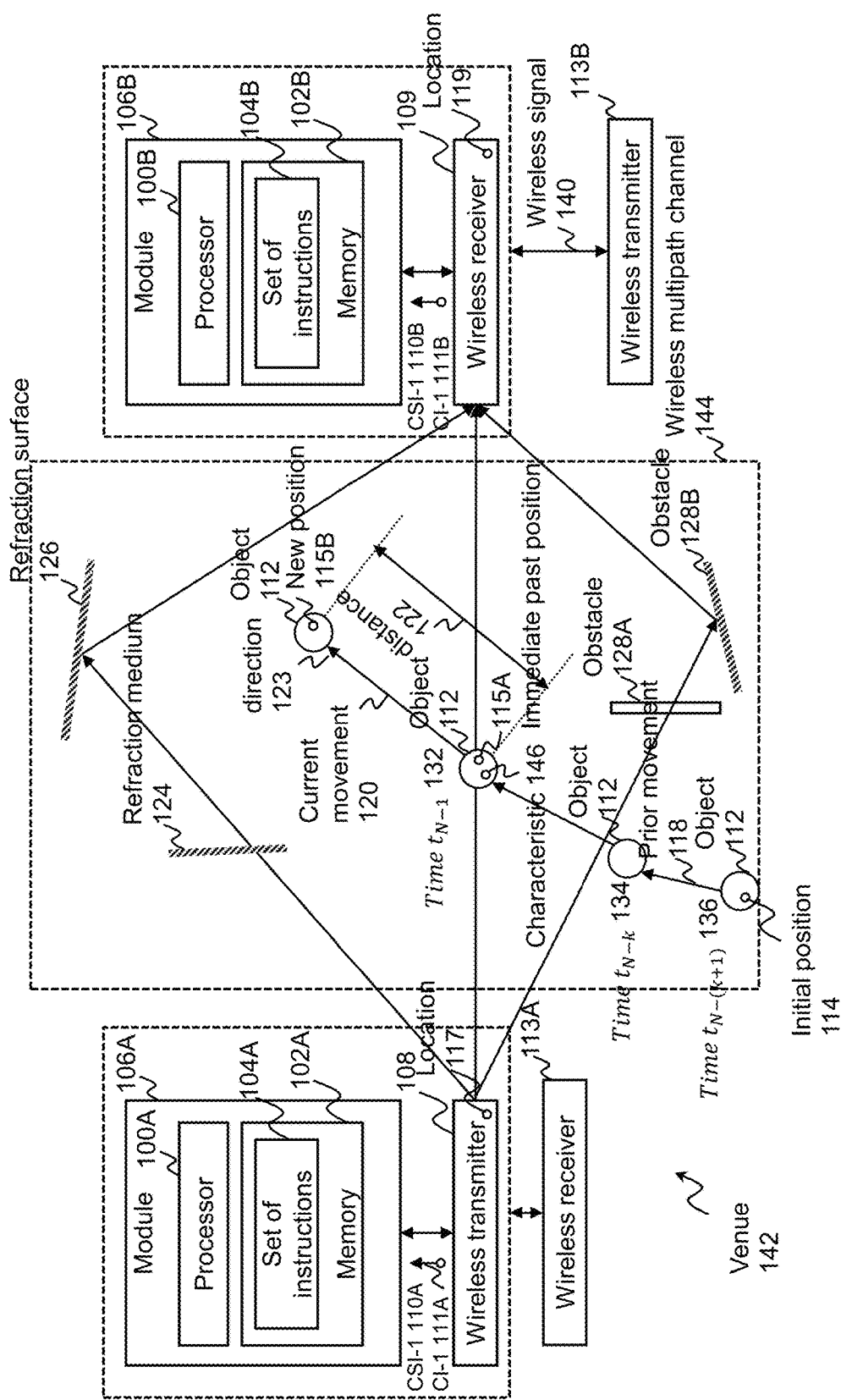
FIG. 1 is a diagram showing an exemplary environment for determining a first position of an object using wireless signal (e.g. 140), according to one embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Original times tamps of the time series of channel information may be corrected in the current sliding time window so that corrected timestamps of time-corrected channel information may be uniformly spaced in time.

Machine learn, training, discriminative training, deep learning, neural network, continuous time processing, distributed computing, distributed storage, GPU/DSP/coprocessor/multicore/multiprocessing acceleration may be applied to any/every operation disclosed in the present teaching.

In one embodiment, a method/device/system of an object tracking system includes obtaining one or more time series of channel information (CI, e.g. 111A, 111B of FIG. 1) of a wireless multipath channel (e.g. 144 of FIG. 1) using a processor (e.g. 100A, 100B of FIG. 1), a memory (e.g. 102A, 102B of FIG. 1) communicatively coupled with the processor (e.g. 100A, 100B) and a set of instructions (e.g. 104A,104B of FIG. 1) stored in the memory (e.g. 102A, 102B). The one or more time series of channel information (e.g. 300, 111A, 111B) is extracted/derived/obtained from a wireless signal (e.g. 140 of FIG. 1) transmitted between a Type 1 heterogeneous wireless device (e.g. 106A, 106B, 108, 109, 113A, 113B of FIG. 1) at a first position (e.g. 114, 115B, 115A, 117, 119, 406, 408, 410, 414) in a venue (e.g. 142 of FIG. 1) and a Type 2 heterogeneous wireless device (e.g. 106A, 106B, 108, 109, 113A, 113B of FIG. 1) at a second position (e.g. 114, 115B, 115A, 117, 119, 406, 408, 410, 414) in the venue (e.g. 142) through the wireless multipath channel (e.g. 144). The wireless multipath channel (e.g. 144) is impacted by a current movement (e.g. 120) of an object (e.g. 112) in the venue (e.g. 142). The method/device/system also determines a spatial-temporal information (e.g. location, speed, velocity, acceleration, a periodic motion, a time trend, a transient motion, a period, a characteristic, etc.) of the object (e.g. 112) based on the at least one time series of channel information (e.g. 300, 111A, 111B), a time parameter associated with the current movement (e.g. 120), and/or a past spatial-temporal information of the object (e.g. 112). The one or more time series of channel information (e.g. 300, 111A, 111B) is preprocessed.

The spatial-temporal information may include a location, a location tag, a location label, a starting location, an ending location, a horizontal location, a vertical location, a length, an area, a volume, a capacity, a distance, a direction, a displacement, a displacement vector, a speed, a velocity, a velocity vector, an acceleration, an acceleration vector, a rotational speed, a rotational acceleration, a gait cycle, a motion type, a motion classification, a motion characteristics, a sudden motion, a correlation between two characteristic, a similarity between two characteristics, a co-occurrence of two characteristics, a timed-occurrence of two characteristics, a temporal characteristics, a timing, a time stamp, a time period, a time window, a sliding time window, a time delay, a time mapping, a time label, a time tag, a starting time, an ending time, a temporal profile, a temporal history, a trend, a spatial-temporal trend, a frequency trend, a frequency characteristics, a frequency, a temporal frequency, a spatial frequency, a spatial-temporal frequency, a frequency range, a starting frequency, an ending frequency, a temporal range, a spatial range, a spatial-temporal change, a spatial change, a temporal change, a frequency change, a frequency shift, an information of a periodic motion, an information of a transient motion, a time trend, a frequency trend, a spatial trend, a time-varying characteristics, a steady-state characteristics, a transient characteristics, a consumed characteristics, a remaining characteristics, a stationary characteristics, a cyclo-stationary characteristics, a pseudo-stationary characteristics, an event, a temporal event, a spatial event, a frequency event, a spatial-temporal event, and/or another information.

Computation associated with the method/device/system may be shared among the processor (e.g. 100A, 100B), the Type 1 heterogeneous wireless device (e.g. 106A, 106B, 108, 109, 113A, 113B, 400, 402, 404) and the Type 2 heterogeneous wireless device (e.g. 106A, 106B, 108, 109, 113A, 113B, 400, 402, 404).

As an example, the tracking of the object may be achieved by obtaining an initial location of the object at time T, and then computing an updated location of the object at time T+ΔT based on the at least one time series of channel information.

The initial location of the object at time T may be obtained by installing some directional antennas at an entrance such that when the object moves under the directional antenna, a wireless signal may be received indicating that the object is at the location associated with the directional antenna.

The updated location of the object may be computed by computing a distance travelled by the object in the incremental time ΔT and combining the distance with an object motion direction (e.g. obtained from a gyroscope associated with the object) to obtain a displacement vector. The displacement vector may be added to the location at time T to obtain the updated location of the object at time T+ΔT.

The Type 1 heterogeneous wireless device is a heterogeneous wireless device of a first type (e.g. a wireless transmitter that sends a first probing signal (such as an impulse), a wireless receiver that receives a second probing signal, a wireless device functioning as a Bot, or a wireless device functioning as an Origin) and the Type 2 heterogeneous wireless device is a heterogeneous wireless device of a second type (e.g. a wireless receiver that receives the first probing signal, a wireless transmitter that sends the second probing signal, or a wireless transceiver, or a wireless device functioning as an Origin, or a wireless device functioning as a Bot). The Type 1 device may work in collaboration with a Type 2 device such that one sends a probing signal and the other receives it. A Type 1 device and/or a Type 2 device may be a smart speaker, a smart phone, an attachment to a phone, a portable dongle to plug into another device, a USB dongle, a computer, a WiFi router, an LTE base station, a WiFi repeater, an LTE repeater, a TV, a DVD player, a HiFi, an audio equipment, a lighting equipment, a clock, a lamp, a refrigerator, a microwave oven, an appliance, a utensil, a torch, a security camera, a dedicated security box, an ornament, etc.

According to various embodiments of the present teaching, an Origin may be a transceiver and a Bot may be another transceiver in the system for object tracking and navigation. Each of the Origin and the Bot may be a Type 1 or Type 2 heterogeneous wireless device.

There may be multiple Type 1 heterogeneous wireless devices interacting with the same Type 2 heterogeneous wireless device, and/or there may be multiple Type 2 heterogeneous wireless devices interacting with the same Type 1 heterogeneous wireless device. The multiple Type 1 devices/Type 2 devices may be synchronized and/or asynchronous, with same/different characteristics/settings. The multiple Type 1 devices/Type 2 devices may operate independently and/or collaboratively. The multiple Type 1 devices/Type 2 devices may be communicatively coupled to same or different servers (e.g. cloud server, edge server, local server). Operation of one device may be based on operation, state, internal state, storage, processor, memory output, physical location, computing resources, network of another device. Difference devices may communicate directly, and/or via another device/server/cloud server. The devices may be associated with one or more users, with associated settings. The settings may be chosen once, preprogrammed, and/or changed over time.

Each channel information may be associated with a time stamp.

The Type 1 heterogeneous wireless device (e.g. 106A, 106B, 108, 109, 113A, 113B, 400, 402, 404) and the Type 2 heterogeneous wireless device (e.g. 106A, 106B, 108, 109, 113A, 113B, 400, 402, 404) may be different. Different Type 1 heterogeneous wireless devices (e.g. 106A, 106B, 108, 109, 113A, 113B, 400, 402, 404) may be different. Different Type 2 heterogeneous devices (e.g. 106A, 106B, 108, 109, 113A, 113B, 400, 402, 404) may be different. They may have different amount of antennas (e.g. 200A, 200B, 200C, 200D, 200E, 200F). Their antennas (e.g. 200A, 200B, 200C, 200D, 200E, 200F) may be different. They may use different circuit boards, different chips, and/or different logic with different power consumption and/or different prices. Each may have different additional functionalities and/or upgraded functionalities. They may be from different manufacturers, different factories, and/or from different brands. They may share some common components (e.g. hardware, antenna, circuit, processor (e.g. 100A, 100B), memory (e.g. 102A, 102B), storage, network), some common software (e.g. in the device (e.g. 106A, 106B, 108, 109, 113A, 113B, 400, 402, 404), in the cloud, etc.), and/or some common modules.

A distance (e.g. 122) of the current movement (e.g. 120) of the object (e.g. 112) may be determined (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) based on the one or more time series of the channel information (e.g. 300, 111A, 111B). An estimated direction (e.g. 123) of the current movement (e.g. 120) of the object (e.g. 112) may be obtained. The spatial-temporal information of the object (e.g. 112) may be determined based on the distance (e.g. 122) and/or the estimated direction (e.g. 123) of the current movement (e.g. 120) of the object (e.g. 112).

At least one similarity score may be computed (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device). Each similarity score may be based on a pair of temporally adjacent CI (e.g. 111A, 111B) of the time series of CI (e.g. 300) associated with the current movement (e.g. 120) of the object (e.g. 112). A characteristic similarity score (e.g. representative similarity score such as a mean, a medium, a mode, a weight average, a centroid, a percentile, a quartile, a trimmed mean, etc.) may be computed based on the at least one similarity score. A distance (e.g. 122) of the current movement (e.g. 120) of the object (e.g. 112) may be determined based on comparing the characteristic similar score to a reference decay curve (e.g. a curve generated by a mathematic formulae, a curve learned by some learning algorithm, or a combination of both, etc.). The spatial-temporal information of the object (e.g. 112) may be determined based on the distance (e.g. 122) of the current movement (e.g. 120) of the object (e.g. 112).

At least one most recent CI (e.g. 111A, 111B) may be determined (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device). Each most recent CI (e.g. 111A, 111B) may be most recent in one of the one or more time series of CI (e.g. 300). "Most recent" may be "current." A most recent CI may be a CI with a most recent time index. One or more time series of similarity scores may be computed. Each similarity score may be computed based on two channel information (e.g. 111A, 111B) (CIs) of a particular time series associated with the similarity score. The two CI (e.g. 111A, 111B) may be the most recent CI (e.g. 111A, 111B) and a temporally adjacent CI (e.g. 111A, 111B) within a time window associated with the current movement (e.g. 120) of the object (e.g. 112). The set of temporally adjacent CI used to compute the time series of similarity scores may include all recent-past CI within a time window. At least one curve may be determined. Each curve may be determined based on a time series of similar scores. At least one feature point of a curve may be identified. The spatial-temporal information of the object (e.g. 112) may be determined/computed based on the at least one feature point. The at least one feature point may include: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and/or another feature point.

At least one second similarity score may be computed (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device). Each similarity score may be computed based on an initial CI (e.g. 111A, 111B) and a current CI (e.g. 111A, 111B). The initial CI (e.g. 111A, 111B) may be temporally close to a beginning of the current movement (e.g. 120). The current CI (e.g. 111A, 111B) may be temporally close to an end of the current movement (e.g. 120), and/or a current moment. A characteristic second similarity score may be determined based on the at least one second similar score. If the characteristic second similarity score is greater than (or "greater than or equal to", or "less than" or "less than or equal to") a threshold, the object (e.g. 112) may be determined to be stationary and the current movement (e.g. 120) may be determined to be a null movement, a small movement, and/or a negligibly small movement.

The preprocessing may include: doing nothing, zero-padding, time-domain processing, frequency domain processing, time-frequency processing, spatially varying processing, temporally varying processing, adaptive processing, de-noising, smoothing, conditioning, enhancement, restoration, feature extraction, weighted averaging, averaging over antenna links, averaging over selected frequency, averaging over selected components, filtering, linear filtering, nonlinear filtering, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, inverse transform, integer transform, power-of-2 transform, real transform, floating-point transform, fixed-point transform, complex transform, fast transform, Fourier transform, Laplace transform, Hadamard transform, Hilbert transform, sine transform, cosine transform, triangular transform, wavelet transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and/or another preprocessing.

The preprocessing, the post-processing and/or the main process may comprise: normalization, temporal normalization, frequency normalization, magnitude correction, phase correction, phase cleaning, cleaning a phase associated with the channel information, normalizing components associated with the channel information, cleaning a phase of frequency components of the channel information, normalizing the frequency components, re-sampling, labeling, tagging, training, sorting, grouping, folding, thresholding, matched filtering, spectral analysis, clustering, quantization, vector quantization, time correction, time base correction, time stamp correction, sampling rate up-conversion/down-conversion, interpolation, intrapolation, extrapolation, sub-sampling, decimation, compression, expansion, encryption decryption, coding, storing, retrieving, transmitting, receiving, representing, merging, combining, splitting, tracking, monitoring, and another operation etc.

Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

In the case of at least one Type 1 devices interacting with at least one Type 2 devices, the processing, preprocessing, post-processing, and/or other processing may be different for different devices. The processing/preprocessing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

A similarity score may be computed (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) based on a pair of temporally adjacent CI (e.g. 111A, 111B) of a particular time series of CI (e.g. 300). The similarity score may also be based on a pair of temporally adjacent CI (e.g. 111A, 111B) from two different time series of CI (e.g. 300). The similarity score may be or may include: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score. The spatial-temporal information of the object (e.g. 112) may be determined/computed based on the similarity score.

The channel information (e.g. 111A, 111B) may be associated with: signal strength, signal amplitude, signal phase, attenuation of the wireless signal (e.g. 140) through the wireless multipath channel (e.g. 144), received signal strength indicator (RSSI), channel state information (CSI, e.g. 110A, 110B of FIG. 1), an equalizer information, a channel impulse response, a frequency domain transfer function, information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics, information associated with at least one of: a time period, a time signature, a time amplitude, a time phase, a time trend, and a time characteristics, information associated with at least one of: a time-frequency partition, a time-frequency signature, a time-frequency amplitude, a time-frequency phase, a time-frequency trend, and a time-frequency characteristics, information associated with a direction (e.g. 123), an angle of arrival, an angle of a directional antenna, and a phase, and/or another channel information (e.g. 111A, 111B), of the wireless signal (e.g. 140) through the wireless multipath channel (e.g. 144).

An initial spatial-temporal information (e.g. initial position 114) of the object (e.g. 112) at an initial time (e.g. 116) prior to the current movement (e.g. 120) of the object (e.g.

112) may be determined (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) based on another time series of another channel information (e.g. 111A, 111B) (CI) associated with a prior movement of the object (e.g. 112). The another time series of the another channel information (e.g. 300) may be extracted from a second wireless signal (e.g. 140) transmitted between a second Type 1 heterogeneous device (e.g. 106A, 106B, 108, 109, 113A, 113B, 400, 402, 404) at a third position (e.g. 408) in the venue (e.g. 142) and a second Type 2 heterogeneous device (e.g. 106A, 106B, 108, 109, 113A, 113B, 400, 402, 404) at a fourth position (e.g. 410) in the venue (e.g. 142) through the wireless multipath channel (e.g. 144). The wireless multipath channel (e.g. 144) may be impacted by the prior movement of the object (e.g. 112). The initial spatial-temporal information (e.g. initial position 114) of the object (e.g. 112) at the initial time (e.g. 116) may be determined to be a known location associated with the second Type 1 heterogeneous device (e.g. 106A, 106B, 108, 109, 113A, 113B, 400, 402, 404) and/or the second Type 2 heterogeneous device (e.g. 106A, 106B, 108, 109, 113A, 113B, 400, 402, 404). A time period may be determined. Within the time period, essentially all (e.g. all except a few, or all without the outliers) corresponding CI (e.g. 111A, 111B) of the another time series of the another CI (e.g. 111A, 111B) may be larger than a first adaptive threshold and smaller than a second adaptive threshold. The initial time (e.g. 116) may be determined as a characteristic point of the time period. The spatial-temporal information of the object (e.g. 112) may be determined based on the initial spatial-temporal information (e.g. initial position 114) of the object (e.g. 112) at the initial time (e.g. 116). The characteristic point of the time period may be: a mid-point, a quartile point, a percentile point, a starting point, an ending point, a point at which the another CI (e.g. 111A, 111B) is locally maximum, a point at which the another CI (e.g. 111A, 111B) is locally minimum, a point at which the another CI (e.g. 111A, 111B) has a certain characteristics, and/or another characteristic point.

At the initial time (e.g. 116) during the prior movement of the object (e.g. 112), "one" of the second Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) may be spatially close to and may move with the object (e.g. 112) during the prior movement of the object (e.g. 112). At the initial time (e.g. 116), the "other one" of the second Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) may have a directional antenna. The initial spatial-temporal information (e.g. initial position 114) of the object (e.g. 112) at the initial time (e.g. 116) may be determined (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) to be a known location associated with the other one of the second Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) with the directional antenna.

As an example, the "one" of the second Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) may be module1 106A and/or wireless transmitter (e.g. 108) while the "other one" of the second Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) may be module2 106B and/or wireless receiver (e.g. 109). The "one" may be a smart phone and/or other portable gadget. The object (e.g. 112) may be a person. The object (e.g. 112) (the person) may be carrying the "one" (the smart phone, spatially close to the person) as the object (e.g. 112) (the person) moves around. The prior movement (e.g. walking) may be the person with the smart phone entering the venue (e.g. 142) (e.g. an airport, a terminal, a mall, a supermarket, etc.). Thus the "one" may be spatially close to the object (e.g. 112) and may move with the object (e.g. 112) during the prior movement of the object (e.g. 112). a smart phone or another portable device spatially close to the object (e.g. 112) (e.g. a person).

The "other one" may be installed at the top or at the side or at the bottom or around or near the entrance. The directional antenna of the "other one" may be aiming/pointing at the entrance such that a special signal would be pick up when the "one" carried by the object (e.g. 112) passes through the entrance. The initial time (e.g. 116) may be the moment the person passes through the entrance. As the beam (the cone-shape coverage) of the directional antenna may be narrow (e.g. compared with the speed of the human movement), the special signal may be strong for a short period of time (e.g. 0.2 second). The initial time (e.g. 116) may be determined as a characteristics point of the time period (e.g. mid-point). The initial spatial-temporal information (e.g. initial position 114) of the person at the initial time (e.g. 116) may be the location of the entrance, or a predefined location near the entrance.

At a current time during the movement of the object (e.g. 112), "one" of the first Type 1 heterogeneous device (e.g. 106A, 106B, 108, 109, 113A, 113B, 400, 402, 404) and the first Type 2 heterogeneous device (e.g. 106A, 106B, 108, 109, 113A, 113B, 400, 402, 404) may be spatially close to and may move with the object (e.g. 112) during the movement of the object (e.g. 112). The "one" may be a smart phone. The object (e.g. 112) may be a person. The person may be carrying the smart phone. The movement of the object (e.g. 112) may be the person walk around a venue (e.g. 142) (e.g. a mall). The "one" (e.g. the smart phone) may be spatially close to and/or may move with the object (e.g. 112) (e.g. the person) during the movement of the object (e.g. 112).

The current time may be real time during the movement of the object (e.g. 112). For example, the initial time (e.g. 116) may be seconds, minutes, hours, days, weeks, months, and/or years before the current time.

At the current time, "one" of the first Type 1 heterogeneous device (e.g. 106A, 106B, 108, 109, 113A, 113B, 400, 402, 404) and the first Type 2 heterogeneous device (e.g. 106A, 106B, 108, 109, 113A, 113B, 400, 402, 404) may be communicatively coupled with a network server, and/or may be communicatively coupled with a local device (e.g. 106A, 106B, 108, 109, 113A, 113B, 400, 402, 404) that may be communicatively coupled with the network server. The "one" and/or the local device (e.g. 106A, 106B, 108, 109, 113A, 113B, 400, 402, 404) may be connected to a cloud server in the internet using 2.5G/3G/4G/LTE/5G/6G, WiFi, WiMax, Zigbee, Bluetooth, BLE, wireless network, etc. The "one" may connect to the cloud server via the local device (e.g. 106A, 106B, 108, 109, 113A, 113B, 400, 402, 404) by connecting to the local device (e.g. 106A, 106B, 108, 109, 113A, 113B, 400, 402, 404) which is in turn connected to the cloud server.

When the "one" (e.g. smart phone, portable/moveable device, portable gadget communicatively coupled with the smart phone via WiFi and/or BLE and/or other communication channels or a portable device) moves with the object (e.g. 112) (e.g. a person) in the venue (e.g. 142) (e.g. a mall), the movement of the object (e.g. 112) and/or the "one" may impact the wireless signal (e.g. 140) passing through the wireless multipath channel (e.g. 144) associated with the venue (e.g. 142) such that the object (e.g. 112) position (e.g. 114, 115B, 115A, 117, 119, 406, 408, 410, 414) may be tracked based on the channel information (e.g. 111A, 111B) derived/extracted/obtained/computed from the wireless signal (e.g. 140).

The local device (e.g. 106A, 106B, 108, 109, 113A, 113B, 400, 402, 404) may be: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and/or another device.

As an example, the object (e.g. 112) may be at a current location L1 (e.g. new position 115B) at a current time T1 (e.g. current time t_N 130) Immediately before the current time T1 (e.g. 130), the object (e.g. 112) may be at an immediately past location L0 (e.g. immediately past position 115A) at an immediately past time T0 (e.g. immediately past time t_{N−1} 132). "One" of the Type 1 heterogeneous device (e.g. 106A, 106B, 108, 109, 113A, 113B, 400, 402, 404) and the Type 2 heterogeneous device (e.g. 106A, 106B, 108, 109, 113A, 113B, 400, 402, 404) may be spatially close to the object (e.g. 112) and may move with the object (e.g. 112). The "one" may comprise two antennas A1 and A2 spatially close to each other. The distance between A1 and A2 may be d. The time difference between T1 and T0 may be t=T1−T0. The line connecting A1 and A2 is a direction theta.

At the immediately past time T0 (e.g. 132) when the object (e.g. 112) may be at the immediately past location L0 (e.g. 115A), the two antennas A1 and A2 may be at locations L0A1 and L0A2 respectively, both of which may be close to L0 (e.g. 115A). At time T0, a channel information CI0A1 associated with the antenna A1 may be obtained, and a channel information CI0A2 associated with the antenna A2 may be obtained.

At the current time T1 (e.g. 130) when the object (e.g. 112) may be at the current location L1 (E.g. 115B), the two antennas A1 and A2 may be at locations L1A1 and L1A2 respectively, both of which may be close to L1 (e.g. 115B). At time T1, a channel information CI1A1 associated with the antenna A1 may be obtained, and a channel information CI1A associated with the antenna A2 may be obtained.

The spatial-temporal information of the object may be determined based on CI0A1, CI0A2, CI1A1, and CI1A2. The spatial-temporal information may comprise at least one of: a displacement, a distance, a direction, a speed, an acceleration of a current movement (e.g. current movement 120).

The CI1A1 and CI1A2 may be compared with CI0A1 and CI0A2.

If CI1A1 may match CI0A2 (e.g. with a similarity score larger than some threshold), it may be an indication that the antenna A2 (and the "one" and the object itself) may have moved from location L0A2 at time T0 to location L1A1 at time T1. The distance (i.e. the spatial-temporal information) may be determined as d, the distance between the antennas A1 and A2, i.e. distance between L0A2 and L1A1. The speed may be determined as the distance d divided by the time t=T1−T0, i.e. speed=d/(T1−T0). The axis of motion may be determined as the axis connecting antennas A1 and A2. The direction may be determined as the direction from antenna A2 to A1 (e.g. theta).

If CI1A2 may match CI0A1 (e.g. with similarity score larger than some threshold), it may be an indication that the antenna A1 (and the "one" and the object itself) may have moved from location L0A1 at time T0 to location L1A2 at time T1. The distance (i.e. the spatial-temporal information) may be determined as d, the distance between the antennas A1 and A2, i.e. distance between L0A1 and L1A2. The speed may be determined as the distance d divided by the time t=T1−T0, i.e. speed=d/(T1−T0). The axis of motion may be determined as the axis connecting antennas A1 and A2. The direction may be determined as the direction from antenna A1 to A2.

The "one" may have more than two antennas. For example, they may be an antenna at a center surrounded by a number of other antennas (e.g. N antennas). The center antenna may be antenna A1. One of the other antennas may be antenna A2. Or, two of the other antennas may be the antennas A1 and A2. The other antennas may be uniformly spaced (e.g. uniformly spaces on a circle with angle=90 degrees for N=4, angle=60 degree for N=6, angle=45 degrees for N=8, angle=30 for N=12 etc.) and/or non-uniformly spaced (e.g. randomly space, or locally uniformly spaced). The angle sustained by adjacent antennas at the center antenna may be uniformed spaced and/or non-uniformed spaced. For example, the other antennas may be at equal distance from the center antenna (i.e. on a circle), at vertices of one or more polyhedron (e.g. square, pentagon, hexagon, heptagon, octagon, non-convex polyhedron, etc.), and/or randomly spaced.

In one example, the "one" may have 9 antennas arranged in a tic-tac-toe configuration (on a square lattice or rectangular lattice), with the center antenna being in the center. The "one" may have 9 (or any other number of) antennas, with one being in the center and the rest arranged in a circle or ellipse or other shape (e.g. concave shape, convex shape, non-convex shape, non-concave shape, irregular shape) around the center.

In one example, the "one" may have antennas arranged in a 3-dimensional arrangement (or constellation). E.g. antennas may be arranged in a 3-dimensional square and/or rectangular lattice, and/or in a sphere (like GPS satellites surrounding the earth). Or, 9 antennas with 1 at center and 8 at vertices of a cube.

In one example, the "one" may have a center antenna, a set of antennas (e.g. N1 antennas) arranged in one way around the center antenna, and another set of antennas (e.g. N2 antennas) arranged in another way around the center antenna.

In one example, the "one" may have multiple center antennas.

In one example, the "one" may have movable antennas such that the relative spacing and placement of the antennas may be changed over time. The adaptive spacing and placement of the antennas may depend on a current motion, a past motion and/or a predictive future motion.

In one example, the "one" may have at least one movable/adjustable barrier around the antennas so that the wireless multipath signals may be controlled and/or steered. The barriers may be moved/adjusted so that the multipath signals may be focused/steered in some directions.

In an example, the "one" may comprise M antennas $A_1$, $A_2, \ldots, M$ (or $A_i$, for $i=1, \ldots, M$) arranged in a co-linear manner. Due to the co-linear placement, there is an inherent "direction", "orientation", and/or "axis" associated with the M antennas. Let the distances between adjacent antennas be $d_1, d_2, \ldots, d_{M-1}$, wherein $d_i$ is the distance between antennas $A_i$ and $A_{i+1}$, for $i=1, \ldots, M-1$. The distances $d_1, d_2, \ldots, d_{M-1}$ may/may not be all equal. If the antennas are uniformly spaced, the distances $d_1, d_2, \ldots, d_{M-1}$ may be all equal.

Consider N ascending time instances: $T_1, T_2, \ldots T_N$ (or $T_i$, for $i=1, \ldots, N$). Let the time difference between adjacent time instances be $t_1, t_2, \ldots, t_{N-1}$, wherein $t_i=T_{i+1}-T_i$ for $i=1, 2, \ldots, N-1$. The time differences $t_1, t_2, \ldots, t_{N-1}$ may/may not be equal over time. If the time instances $t_1, t_2, \ldots, t_{N-1}$ are uniformly space, the time difference may be all equal. The object (e.g. 112) may be at location $L_1$ at $T_1$, $L_2$ at $T_2, \ldots,$ and $L_N$ at $T_N$.

At time $T_i$, the object may be at location $L_i$. Let the location of the $j^{th}$ antenna $A_j$ at $T_i$ be $L_{i,j}$, for $i=1, \ldots, N$ and $j=1, \ldots, M$. The $d_1, d_2, \ldots, d_{M-1}$ may change over time. The orientation of the M antennas may/may not change over time.

At time $T_i$, a channel information $CI_{i,j}$ associated with the antenna $A_j$ (for $i=1, \ldots, N$, $j=1, \ldots, M$) may be obtained.

The spatial-temporal information of the object may be determined based on $\{CI_{i,j}: i=1, \ldots N, j=1, \ldots, M\}$. The spatial-temporal information may comprise at least one of: a displacement, a distance, a direction, a speed, an acceleration of a current movement (e.g. current movement 120).

Different time shift k may be studied/tested, wherein k ranges from 1 to N−1. For a time shift k, a may be compared with $CI_{i+k,j2}$, for $j1=1, \ldots, M$, $j2=1, \ldots, M$.

If $CI_{i,j1}$ may match $CI_{i+k,j2}$ (e.g. with a similarity score larger than some threshold T1), it may be an indication that location $L_{i,j1}$ is the same (or almost the same) as location $L_{i+k,j2}$, and the antenna $A_{j2}$ (and the "one" and the object itself) may have moved from location $L_{i,j2}$ at time $T_i$ to location $L_{i+k,j2}$ (i.e. $L_{i,j1}$) at time $T_{i+k}$. In other words, the object and the "one" (together with its antennas) may have moved in the "direction" or "orientation" or the "axis" of the antennas.

For example, for $i=1, k=1, j1=1, j2=2$, $CI_{1,1}$ may match $CI_{2,2}$, which may indicate that antenna $A_2$ may have moved from location $L_{1,2}$ at time $T_1$ to location $L_{1,1}$ at time $T_2$. In other words, in one (since k=1) unit of time (e.g. uniform time spacing such that 1 unit of time=$T_2-T_1=T_3-T_2$), the object and the "one" together with its antennas may have moved in the direction of the antenna axis by one unit of distance (e.g. the antennas are uniformly spaced, such that 1 unit of distance=$d_1=d_2=d_3$).

As another example, for $i=1, k=2, j1=3, j2=4$, $CI_{1,3}$ may match $CI_{3,4}$, which may indicate that antenna $A_4$ may have moved from location $L_{1,4}$ at time $T_1$ to location $L_{1,3}$ at time $T_3$. In other words, in two (since k=2) unit of time (e.g. uniform time spacing such that 1 unit of time=$T_2-T_1=T_3-T_2$), the object and the "one" together with its antennas may have moved in the direction of the antenna axis by one unit of distance (e.g. the antennas are uniformly spaced, such that 1 unit of distance=$d_1=d_2=d_3$).

The similarity score between $CI_{i,j1}$ and $CI_{i+k,j2}$ may comprise an inner product, an inner-product-like quantity, a quantity based on correlation, a quantity based on covariance, a discriminating score, a distance, a Euclidean distance, an absolute distance, an $L_k$ distance, a weighted distance, a distance-like quantity and/or another similarity value, between the first vector and the second vector.

A combined similarity score may be obtained by combining multiple similarity scores, e.g. multiple similarity scores from multiple time instances, multiple antennas, and/or multiple "the other ones." For example, a combined similarity score may be obtained by combining similarity scores, each score being between $CI_{i+1,j1}$ and $CI_{i+l+k,j2}$, for a set of values of l. For example, the set may comprise a subset of $\{l: l=0, 1, 2, \ldots, N-1-k\}$.

The combined similarity score may be normalized. It may be normalized by dividing by the cardinality of the set of values of l. The combined similarity score may comprise a mean, median, mode, weighted mean, trimmed mean, and/or robust mean of the similarity scores. The combined similarity score may be a combination of mean, median, mode, weighted mean, trimmed mean, and/or robust mean.

The threshold T1 for the similar score may be adaptive determined. The threshold may depend on the cardinality of the set of values of l. The threshold may be smaller when the cardinality of the set of values of l is larger. The threshold may depend on the combination of mean, median, mode, weighted mean, trimmed mean, and/or robust mean.

The distance (i.e. a possible spatial-temporal information) may be determined as the distance between $L_{i,j1}$ and $L_{i,j2}$, which may be the sum of $d_{k1}+d_{j1+1}+ \ldots +d_{j2-1}$, if j2>j1, or $d_{j2}+d_{j2+1}+ \ldots +d_{j1-1}$, if j1>j2.

The speed (i.e. a possible spatial-temporal information) may be determined as the distance divided by the time duration between $T_i$ and $T_{i+k}$. If the time difference is uniformly spaced, the time duration may be k unit of time. The time duration may be equal to $t_i+t_{i+1}+t_{i+k-1}$. The axis of motion may be determined as the axis connecting the antennas. The direction may be determined as the direction from antenna $A_{j2}$ to $A_{j1}$.

Multiple channel information (associated with multiple antennas) may be matched for a strong matching. If $CI_{i,j1}$ may match $CI_{i+k,j2}$ (e.g. with a similarity score larger than some threshold T2) and $CI_{i,j1+1}$ match $CI_{i+k,j2+1}$ and . . . , and $CI_{i,j1+P}$ match $CI_{i+k,j2+P}$ simultaneously (i.e. $CI_{i,j1+r}$ may match $CI_{i+k,j2+r}$, for r=0, 1, . . . , P simultaneously), it may be an indication that location $L_{i,j1+r}$ is the same (or almost the same) as location $L_{i+k,j2+r}$, for r=0, 1, . . . , P, and a strong indication that the antenna $A_{j2+r}$ (and the "one" and the object itself) may have moved from location $L_{i,j2+r}$ at time $T_i$ to location $L_{i+k,j2+r}$ (i.e. $L_{i,j1}$) at time $T_{i+k}$. The threshold T2 for this strong matching may be different from the threshold T1 for individual matching.

The multiple channel information may be matched (e.g. with a similarity score larger than some threshold T3) for a subset of r=0, 1, . . . , P, (i.e. $CI_{i,j1+r}$ may match $CI_{i+k,j2+r}$, for a subset of r=0, 1, . . . , P simultaneously). This matching is not as strong as the matching for the full set of r=0, 1, . . . , P, but is stronger than the individual CI matching. The threshold T3 may be different from T1 and/or T2.

Multiple channel information (associated with multiple time instance) may be compared for a strong matching. If $CI_{i,j1}$ may match $CI_{i+k,j2}$ (e.g. with a similarity score larger than some threshold T4) and $CI_{i,j1}$ may match $CI_{i+2k,j1+2(j2-j1)}$, and . . . , and $CI_{i,j1}$ may match $CI_{i+Pk,j1+P(j2-j1)}$ (i.e. $CI_{i,j1}$ may match $CI_{i+rk,j1+r(j2-j1)}$, for (r=0, 1, . . . , P), it may be an indication that location $L_{i,j1}$ is the same (or almost the same) as locations $L_{i+rk,j1+r(j2-j1)}$, for r=0, 1, . . . , P, and an indication that the antenna $A_{j2}$ (and the "one" and the object itself) may have moved from location $L_{i,j2}$ at time $T_i$ to location $L_{i+k,j2}$ (i.e. $L_{i,j1}$) at time $T_{i+k}$. It is an indication that antenna $A_{j1+r(J2-j1)}$ (and the "one" and the object itself) may have moved from location $L_{i,j1+r(j2-j1)}$ at time $T_i$ to location $L_{i+rk,j1+2(j2-j1)}$ (i.e. $L_{i,j1}$) at time $T_{i+rk}$ for r=0, 1, . . . , P. As the movements of various antennas ($A_{j1+r(J2-j1)}$ for =0, 1, . . . , P) all point to the same speed and direction, this is a strong matching. The threshold T4 for this strong matching may be different from the threshold T1, T2 and/or T3.

The multiple channel information may be matched (e.g. with a similarity score larger than some threshold T5) for a subset of r=0, 1, . . . , P, (i.e. $CI_{i,j1}$ may match $CI_{i+rk,j1+r(j2-j1)}$, for a subset of r=0, 1, . . . , P). This matching is not as strong as the matching for the full set of r=0, 1, . . . , P, but is stronger than the individual CI matching. The threshold T5 may be different from T1, T2, T3 and/or T4.

A method/apparatus/system of an object tracking system comprises obtaining at least two time series of channel information (CI) of a wireless multipath channel using a processor, a memory communicatively coupled with the processor and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a current movement of an object in the venue. The Type 1 device is close to the object and moves with the object during the current movement of the object. The Type 1 device comprises at least two antennas.

A spatial-temporal information of the object is determined based on a first time series of channel information associated with a first antenna of the Type 1 device, and/or a second time series of channel information associated with a second antenna of the Type 1 device. The at least one time series of channel information is preprocessed. The spatial-temporal information comprises a location, a horizontal location, a vertical location, a speed, a displacement, an acceleration, a rotational speed, a rotational acceleration, a gait cycle, a periodic motion, a period of the periodic motion, a frequency of the periodic motion, a transient motion, a time trend, an event and/or another information.

Computational workload associated with the method is shared among the processor, the Type 1 heterogeneous wireless device and the Type 2 heterogeneous wireless device.

At least two first channel information (CI) at a first time may be obtained. Each of the first channel information may be associated with respective antenna of the Type 1 device. At least two second channel information (CI) at a second time may be obtained. Each of the second channel information may be associated with respective antenna of the Type 1 device. The first time may be close to the second time.

At least one similarity score may be computed. Each similarity score may be between one of the at least two first CI and one of the at least two second CI. A match between a particular first CI associated with a first antenna and a particular second CI associated with a second antenna may be identified. The first antenna and the second antenna may be different. The spatial-temporal information of the object may be determined based on at least one of: the particular first CI, the particular second CI.

A distance, a direction and/or another quantity may be determined based on location of the first antenna and location of the second antenna. The spatial-temporal information of the object may be determined based on at least one of: the distance, the direction, the first time and the second time.

The spatial-temporal information of the object may be computed by dividing the distance by time difference between the first time and the second time. The spatial-temporal information may be a speed of the object.

At least one combined similarity score may be computed. Each combine similarity score may be based on at least two similarity scores. The spatial-temporal information of the object may be determined based on at least one combined similarity score.

The similarity score may comprise: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score.

The spatial distribution of the at least two antennas may comprise a center antenna placed at a center, and the rest of the antennas arranged around the center antenna in a 2-dimensional configuration and/or a 3-dimensional configuration.

The spatial distribution of the at least two antennas may comprise a center antenna placed at a center, and the rest of the antennas uniformly arranged around the center antenna.

The spatial distribution of the at least two antennas may comprise a number of antennas forming a rectangular lattice.

The spatial distribution of the at least two antennas may comprise: a number of antennas forming a straight line.

The spatial distribution of at least two antennas may comprise a number of antennas forming a circular lattice, an elliptical lattice, a convex configuration, a non-convex configuration, a concave configuration, a non-concave configuration, and/or an irregular configuration.

At least two first channel information (CI) for each of a set of time instance may be obtained, each first channel information associated with respective antenna of the Type 1 device.

At least one similarity score may be computed, each between two CI: a first CI associated with a first time and a first antenna, and a second CI associated with a second time and a second antenna.

A match between a particular first CI associated with a particular first antenna and a particular first time, and a particular second CI associated with a particular second antenna and a particular second time may be identified.

The spatial-temporal information of the object may be determined based on at least one of: the particular first CI, the particular first antenna, the particular first time, a related first information, the particular second CI, the particular second antenna, the particular second time, and a related second information.

At least one combined similarity score may be computed, each combined similarity score based on at least two similarity scores. The spatial-temporal information of the object may be determined based on at least one combined similarity score.

The similarity score may comprise a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score.

One of the at least two similarity scores may be a similarity score between a first CI associated with a first time, and a second CI associated with a second time. The rest of the at least two similarity scores may be similarity scores between CI associated with the first time and CI associated with the second time.

One of the at least two similarity scores may be a similarity score between a first CI associated with a first time, and a second CI associated with a second time. The at least two similarity scores may comprise at least one similarity scores each between third CI and fourth CI. The difference between the time instance associated with the third CI and the time instance associated with the fourth CI may be equal to the difference between the first time and the second time.

One or more time series of power information (PI) may be computed (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) based on the one or more time series of CI (e.g. 300). Each PI may be associated with a CI (e.g. 111A, 111B). The PI may be a complex quantity. The real part of the power information (PI) may be computed based on: magnitude, square of magnitude, phase, real part, imaginary part and another function, of the CI (e.g. 111A, 111B). A first function of the one or more time series of PI may be computed. The first function may include an operation on/of: an autocorrelation function, a square of autocorrelation function, an auto-covariance function, a square of auto-covariance function, an inner product, an auto-correlation-like function, and/or a covariance-like function.

The operation may include: a polynomial function, a linear function, a nonlinear function, a filtering, a de-noising, a smoothing, a conditioning, an enhancement, a restoration, a feature extraction, a weighted averaging, a high-pass filtering, a low-pass filtering, a bandpass filtering, a median filtering, a quartile filtering, a percentile filtering, a mode filtering, a linear filtering, a nonlinear filtering, a finite impulse response (FIR) filtering, an infinite impulse response (IIR) filtering, a moving average (MA) filtering, an auto-regressive (AR) filtering, an auto-regressive moving average (ARMA) filtering, a selective filtering, an adaptive filtering, a thresholding, a soft thresholding, a hard thresholding, a soft clipping, a first derivative, a second derivative, a higher order derivative, a local maximization, a local minimization, an optimization of a cost function, a neural network, a machine learning, a supervised learning, an unsupervised learning, a semi-supervised learning, a zero crossing, an absolute function, an indicator function, a Fourier transform, a Laplace transform, a Hadamard transform, another transform, a transformation, a decomposition, a derivative, a first order derivative, a second order derivative, a higher order derivative, a convolution, a multiplication, a division, zero crossing, an indicator function, an absolute conversion, a preprocessing, a post-processing, and/or another operation.

At least one characteristics of the first function may be determined (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device). The at least one characteristics may include: a local maximum, a local minimum, a local extremum, a constrained (with argument within a constraint) maximum, a constrained minimum, a constrained extremum, a maximum slope, a minimum slope, a constrained maximum slope, a constrained minimum slope, a maximum higher order derivative, a minimum higher order derivative, a constrained higher order derivative, a zero-crossing, a constrained zero-crossing, a zero-crossing of slope, a zero-crossing of higher order derivative, and/or another characteristics. At least one argument of the first function associated with the at least one characteristics of the first function may be identified. The spatial-temporal information of the object (e.g. 112) may be determined based on the at least one argument of the first function.

The Type 1 heterogeneous wireless device (e.g. 106A, 106B, 108, 109, 113A, 113B, 400, 402, 404) may be caused to switch (e.g. by an object tracking server, the processor (e.g. 100A, 100B), the Type 1 heterogeneous device (e.g. 106A, 106B, 108, 109, 113A, 113B, 400, 402, 404), the Type 2 heterogeneous device (e.g. 106A, 106B, 108, 109, 113A, 113B, 400, 402, 404), and/or another device) wireless coupling from the Type 2 heterogeneous wireless device (e.g. 106A, 106B, 108, 109, 113A, 113B, 400, 402, 404) to a second Type 2 heterogeneous wireless device (e.g. 106A, 106B, 108, 109, 113A, 113B, 400, 402, 404) at another location in the venue (e.g. 142). The Type 1 heterogeneous device (e.g. 106A, 106B, 108, 109, 113A, 113B, 400, 402, 404) may be capable of wirelessly coupling with at least two Type 2 heterogeneous devices (e.g. 106A, 106B, 108, 109, 113A, 113B, 400, 402, 404). A second wireless signal (e.g. 140) may be caused to be transmitted between the Type 1 heterogeneous device (e.g. 106A, 106B, 108, 109, 113A, 113B, 400, 402, 404) and the second Type 2 heterogeneous device (e.g. 106A, 106B, 108, 109, 113A, 113B, 400, 402, 404) through the wireless multipath channel (e.g. 144). The wireless multipath channel (e.g. 144) may be impacted by the current movement (e.g. 120) of the object (e.g. 112) in the venue (e.g. 142). One or more second time series of channel information (e.g. 300, 111A, 111B) (CI) of the wireless multipath channel (e.g. 144) may be obtained. The one or more second time series of channel information (e.g. 300, 111A, 111B) may be extracted from the second wireless signal (e.g. 140). The spatial-temporal information of the object (e.g. 112) may be determined based on the one or more second time series of channel information (e.g. 300, 111A, 111B).

In another embodiment, an object tracking server includes a processor (e.g. 100A, 100B), a memory (e.g. 102A, 102B) communicatively coupled with the processor (e.g. 100A, 100B), and a set of instructions (e.g. 104A, 104B) stored in the memory (e.g. 102A, 102B) and executed by the processor (e.g. 100A, 100B). When the set of instructions (e.g. 104A, 104B) is executed by the processor (e.g. 100A, 100B) using the memory (e.g. 102A, 102B), the object (e.g. 112) tracking server is configured to obtain one or more time series of channel information (e.g. 300, 111A, 111B) (CI) of a wireless multipath channel (e.g. 144). The at least one time series of channel information (e.g. 300, 111A, 111B) is extracted from a wireless signal (e.g. 140) transmitted between a Type 1 heterogeneous wireless device (e.g. 106A, 106B, 108, 109, 113A, 113B, 400, 402, 404) at a first position (e.g. 114, 115B, 115A, 117, 119, 406, 408, 410, 414) in a venue (e.g. 142) and a Type 2 heterogeneous wireless device (e.g. 106A, 106B, 108, 109, 113A, 113B, 400, 402, 404) at a second position (e.g. 114, 115B, 115A, 117, 119, 406, 408, 410, 414) in the venue (e.g. 142) through the wireless multipath channel (e.g. 144). The wireless multipath channel (e.g. 144) is impacted by a current movement (e.g. 120) of an object (e.g. 112) in the venue (e.g. 142). The object (e.g. 112) tracking server determines a spatial-temporal information of the object (e.g. 112) based on: the at least one time series of channel information (e.g. 300, 111A, 111B), a time parameter associated with the current movement (e.g. 120), and/or a past spatial-temporal information of the object (e.g. 112). The one or more time series of channel information (e.g. 300, 111A, 111B) is preprocessed. The spatial-temporal information includes: a location, a horizontal location, a vertical location, a speed, a displacement, an acceleration, a rotational speed, a rotational acceleration, a gait cycle, a periodic motion, a period of the periodic motion, a frequency of the periodic motion, a transient motion, a time trend, an event and/or another information. The processor (e.g. 100A, 100B) shares computational workload with the Type 1 heterogeneous wireless device (e.g. 106A, 106B, 108, 109, 113A, 113B, 400, 402, 404) and Type 2 heterogeneous wireless device (e.g. 106A, 106B, 108, 109, 113A, 113B, 400, 402, 404).

In yet another embodiment, a system of an object tracking server includes a Type 1 heterogeneous wireless device (e.g. 106A, 106B, 108, 109, 113A, 113B, 400, 402, 404) at a first position (e.g. 114, 115B, 115A, 117, 119, 406, 408, 410, 414) in a venue (e.g. 142), a Type 2 heterogeneous wireless device (e.g. 106A, 106B, 108, 109, 113A, 113B, 400, 402, 404) at a second position (e.g. 114, 115B, 115A, 117, 119, 406, 408, 410, 414) in the venue (e.g. 142) wirelessly coupled with the Type 1 heterogeneous device (e.g. 106A, 106B, 108, 109, 113A, 113B, 400, 402, 404) through a wireless multipath channel (e.g. 144) associated with the venue (e.g. 142), and/or the object (e.g. 112) tracking server. The object (e.g. 112) tracking server has a processor (e.g. 100A, 100B), a memory (e.g. 102A, 102B) communicatively coupled with the processor (e.g. 100A, 100B) and a set of instructions (e.g. 104A, 104B) stored in the memory (e.g. 102A, 102B) executed by the processor (e.g. 100A, 100B).

The object (e.g. 112) tracking server, the Type 1 heterogeneous device (e.g. 106A, 106B, 108, 109, 113A, 113B, 400, 402, 404) and the Type 2 heterogeneous device (e.g. 106A, 106B, 108, 109, 113A, 113B, 400, 402, 404) are configured to: obtain at least one time series of channel information (e.g. 300, 111A, 111B) (CI) of the wireless multipath channel (e.g. 144). The at least one time series of channel information (e.g. 300, 111A, 111B) is extracted from a wireless signal (e.g. 140) transmitted between the Type 1 heterogeneous device (e.g. 106A, 106B, 108, 109, 113A, 113B, 400, 402, 404) and the Type 2 heterogeneous device (e.g. 106A, 106B, 108, 109, 113A, 113B, 400, 402, 404) through the wireless multipath channel (e.g. 144). The wireless multipath channel (e.g. 144) is impacted by a current movement (e.g. 120) of an object (e.g. 112) in the venue (e.g. 142).

A spatial-temporal information of the object (e.g. 112) is determined based on: the at least one time series of channel information (e.g. 300, 111A, 111B), a time parameter associated with the current movement (e.g. 120), and/or a past spatial-temporal information of the object (e.g. 112). The at least one time series of channel information (e.g. 300, 111A, 111B) is preprocessed. The spatial-temporal information includes: a location, a horizontal location, a vertical location, a speed, a displacement, an acceleration, a rotational speed, a rotational acceleration, a gait cycle, a periodic motion, a period of the periodic motion, a frequency of the periodic motion, a transient motion, a time trend, an event and/or another information. Computational workload is shared among the processor (e.g. 100A, 100B), the Type 1 heterogeneous wireless device (e.g. 106A/B, 108, 109, 113A, 113B, 400, 402, 404) and Type 2 heterogeneous wireless device (e.g. 106A/B, 108, 109, 113A, 113B, 400, 402, 404).

In one example, a system, an apparatus, and/or a method for tracking a spatial-temporal information (e.g. current movement 120, prior movement 118, position 115A, initial position 114, of FIG. 1, speed, velocity, acceleration, etc.) of an object (e.g. object 112) in real time (e.g. time t_N 130, t_(N−1) 132, t_(N−k) 134, t_(N−k−1) 136 of FIG. 1) is disclosed. The system, apparatus and/or method may comprise a processor (e.g. 100A, 100B) and a memory (e.g. 102A, 102B) communicatively coupled with the processor (e.g. 100A, 100B). The system, apparatus and/or method comprises obtaining an initial spatial-temporal information (e.g. initial position 114, immediate past position 115A) of the object (e.g. 112) prior to a movement (e.g. 120, 118) of the object (e.g. 112), and obtaining at least one wireless signal (e.g. 140) from a multipath channel (e.g. 144) that is impacted by the movement (e.g. 120, 118) of the object (e.g. 112). The system, apparatus and/or method further comprises extracting a time series of channel information (e.g. 111A, 111B, or channel state information (CSI) 110A/110B) for the multipath channel (e.g. 144) from the at least one wireless signal (e.g. 140) and determining a distance (e.g. 122) of the movement (e.g. 120) of the object (e.g. 112) based on the time series of CSI (e.g. 300, 110A, 110B). The system, apparatus and/or method comprises estimating a direction (e.g. 123) of the movement (e.g. 120) of the object (e.g. 112), and determining a new spatial-temporal information (e.g. position 115B associated with time t_N 130) of the object (e.g. 112) after the movement (e.g. current movement 120) based on the distance (e.g. 122), the direction (e.g. 123), and the initial spatial-temporal information (e.g. initial position 114).

In another example, a system, an apparatus and/or a method is disclosed. The system, apparatus and/or method is for determining an initial spatial-temporal information (e.g. initial position 114) of an object (e.g. 112) prior to a current movement (e.g. 120) of the object (e.g. 112). The system, apparatus and/or method obtains at least one wireless signal (e.g. 140) from a wireless multipath channel (e.g. 144) that is impacted by a prior movement (e.g. 118) of the object (e.g. 112) before the current movement (e.g. 120) of the object (e.g. 112) using a processor (e.g. 100A and/or 100B), a memory (e.g. 102A and/or 102B) communicatively coupled with the processor (e.g. 100A, 100B) and a set of instructions (e.g. 104A, 104B) stored in the memory (e.g. 102A, 102B). The system, apparatus and/or method extracts at least one time series of channel information (CI) (e.g. 300, 111A, 111B) of the wireless multipath channel (e.g. 144) from the wireless signal (e.g. 140), and determines the initial spatial-temporal information (e.g. initial position 114) of the object (e.g. 112) prior to the current movement (e.g. 120) of the object (e.g. 112) based on channel information (e.g. 300, 111A, 111B) associated with the prior movement (e.g. 118) of the object (e.g. 112). The spatial-temporal information (e.g. current movement 120) of the object (e.g. 112) may be tracked. The system, apparatus and/or method may make the spatial-temporal information (e.g. 114, 115A) available for the tracking of another spatial-temporal information (e.g. current movement 120) of the object (e.g. 112).

The object (e.g. 112) may be people, passengers, children, older people, babies, patients, workers, waiters, customers in a mall, travelers in airport/train station/bus terminal/shipping terminals, staffs/workers/customer service personnel in a factory/mall/supermarket/office/workplace, serviceman in sewage/air ventilation system/lift well, lifts in lift wells, elevators, inmate, people to be tracked/monitored, animals, pets, smart phones, phone accessories, computers, tablets, portable computers, dongles, computing accessories, networked devices, WiFi devices, IoT devices, smart watch, smart glasses, smart devices, keys, smart keys, wallets, purses, handbags, backpacks, goods, cargos, luggage, objects, equipment, air conditioners, fans, air conditioning equipment, light fixtures, moveable lights, televisions, cameras, audio and/or video equipment, stationary, surveillance equipment, parts, signage, tools, carts, tickets, parking tickets, toll tickets, airplane tickets, credit cards, plastic cards, access cards, food packaging, utensils, tables, chairs, cleaning equipment/tools, vehicles, cars, cars in parking facilities, merchandise in a warehouse/store/supermarket/distribution center, boats, bicycles, airplanes, drones, remote control car/plane/boat, robots, manufacturing device, assembly line, materials/unfinished parts/robots/wagons/transports on a factory floor, objects to be tracked in airports/shopping marts/supermarkets, etc. The object (e.g. 112) itself may be communicatively coupled with some network, such as WiFi, MiFi, 3G/4G/5G, Bluetooth, WiMax, Zigbee, adhoc network, and/or other network. The object (e.g. 112) itself may be bulky with AC power supply, but is moved during installation, cleaning, maintenance, renovation, etc. It may also be installed in a moveable platform such as a lift, a pad, a movable, platform, an elevator, a conveyor belt, a robot, a drone, a forklift, a car, a boat, a vehicle, etc.

The channel information (CI) (e.g. 111A, 111B) may be associated with signal strength, signal amplitude, signal phase, received signal strength indicator (RSSI), channel state information (CSI, e.g. 110A, 110B). The CI (e.g. 111A,111B) may be associated with information associated with a frequency band, a frequency signature, a frequency phase, a frequency amplitude, a frequency trend, a frequency characteristics, a frequency-like characteristics, an orthogonal decomposition characteristics, and/or a non-orthogonal decomposition characteristics of the wireless signal (e.g. 140) through the wireless multipath channel (e.g. 144). The CI (e.g. 111A, 111B) may be associated with information associated with a time period, a time signature, a time amplitude, a time phase, a time trend, and/or a time characteristics of the wireless signal (e.g. 140). The CI (e.g. 111A, 111B) may be associated with information associated with a time-frequency partition, a time-frequency signature, a time-frequency amplitude, a time-frequency phase, a time-frequency trend, and/or a time-frequency characteristics of the wireless signal (e.g. 140). The CI (e.g. 111A, 111B) may be associated with a decomposition of the wireless signal (e.g. 140). The CI (e.g. 111A, 111B) may be associated with information associated with a direction (e.g. 123), an angle of arrival, an angle of a directional antenna, and/or a phase of the wireless signal (e.g. 140) through the wireless multipath channel (e.g. 144). The CI (e.g. 111A, 111B) may be associated with attenuation patterns of the wireless signal (e.g. 140) through the wireless multipath channel (e.g. 144). The wireless multipath channel (e.g. 144) may be associated with a venue (e.g. 142). The attenuation may be due to signal propagation in the venue (e.g. venue 142), signal propagating/reflection/refraction/diffraction through/at/around air (e.g. air of venue 142), walls (e.g. refraction medium 124, reflection surface 126), doors (e.g. refraction medium 124, reflection surface 126), furniture (e.g. refraction medium 124, reflection surface 126, obstacle 128A, 128B), obstacles (e.g. refraction medium 124, reflection surface 126, obstacle 128A, 128B) and/or barriers (e.g. refraction medium 124, reflection surface 126, obstacle 128A, 128B), etc. The attenuation may be due to reflection at surfaces and obstacles (e.g. reflection surface 126, obstacle 128B) such as floor, ceiling, furniture, fixtures, objects, people, pets, etc. The channel information (e.g. 111A, 111B) may be associated with a received signal strength indicator (RSSI).

The wireless multipath channel (e.g. 144) may be associated with at least one wireless transmitter (e.g. 108) and at least one wireless receiver (e.g. 109). The processor (e.g. 100A, 100B), the memory (e.g. 102A, 102B) and the set of instructions (e.g. 104A, 104B) may be associated with one of the at least one wireless transmitter (e.g. 108, 113B) and/or one of the at least one wireless receiver (e.g. 109, 113A). The object (e.g. 112) may be associated with one of the at least one wireless transmitter (e.g. 108, 113B) and/or one of the at least one wireless receiver (e.g. 109, 113A).

A wireless transmitter (e.g. 108, 113B), a wireless receiver (e.g. 109, 113A), a first device (e.g. 106A/B, 108, 109, 113A, 113B, 400, 402, 404) comprising the wireless transmitter/receiver, and/or a second device (e.g. 106A, 106B, 108, 109, 113A, 113B, 400, 402, 404) coupled (e.g. via Bluetooth, Zigbee, BLE, WiFi, LTE, 3G/4G/5G/6G/7G/8G, etc.) with a first device (e.g. 106A/B, 108, 109, 113A, 113B, 400, 402, 404) comprising the wireless transmitter/receiver, may each be associated with an identity (ID). The ID may comprise: a numeral, a combination of text and numbers, a name, a password, an account, an account ID, a web link, a web address, index to some information, and/or another ID. The ID may be assigned. The ID may be assigned by hardware (e.g. hardwired, via a dongle and/or other hardware), software and/or firmware. The ID may be stored (e.g. in memory 102A and/or 102B, in a server, in the cloud, stored locally, stored remotely, stored permanently, stored temporarily) and may be retrieved. The ID may be associated with at least one record, account, user, household, address, phone number, social security number, customer number, another ID, time stamp, and/or collection of data. The ID and/or part of the ID of a first device (e.g. 106A/B, 108, 109, 113A, 113B, 400, 402, 404) may be made available to a second device (e.g. 106A/B, 108, 109, 113A, 113B, 400, 402, 404). The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by first device (e.g. 106A/B, 108, 109, 113A, 113B, 400, 402, 404) and/or second device (e.g. 106A/B, 108, 109, 113A, 113B, 400, 402, 404).

The venue (e.g. 142) may be a space such as a room, a house, an office, a building, a roof top, a store, a factory, an assembly line, a hotel room, a museum, a classroom, a school, a university, a government building, a public facility, a warehouse, a garage, a mall, an airport, a train station, a hub, an underground facility, a space facility, an floating facility, a cavern, an indoor facility, an open-air facility, an outdoor facility with some walls/doors/reflective barriers, a car, a truck, a bus, a van, a ship/boat, a submersible, a train, an airplane, a vehicle, a mobile home, a cave, a tunnel, a pipe, a channel, a highway, a road, a metropolitan area, downtown area with relatively tall buildings, a valley, a well, a duct, a pathway, a gas line, an oil line, a water pipe, a network of interconnecting pathways/alleys/roads/tubes/cavities/caves/pipe-like structure/air space/fluid space, a human body, an animal body, a body cavity, an organ, a bone, a teeth, a soft tissue, a hard tissue, a rigid tissue, a non-rigid tissue, a blood/body fluid vessel, windpipe, air duct, a den, etc. The venue (e.g. 142) may include both the inside and outside of the space. For example, the venue (e.g.

142) may include both the inside of a building and the outside of the building. For example, the venue (e.g. 142) may be a building that has one floor or multiple floors, and a portion of the building may be underground. The shape of the building may be, e.g., round, square, rectangular, triangle, or irregular-shaped. These are merely examples. The disclosure may be used to detect events in other types of venue (e.g. 142) or spaces.

Figure 2:
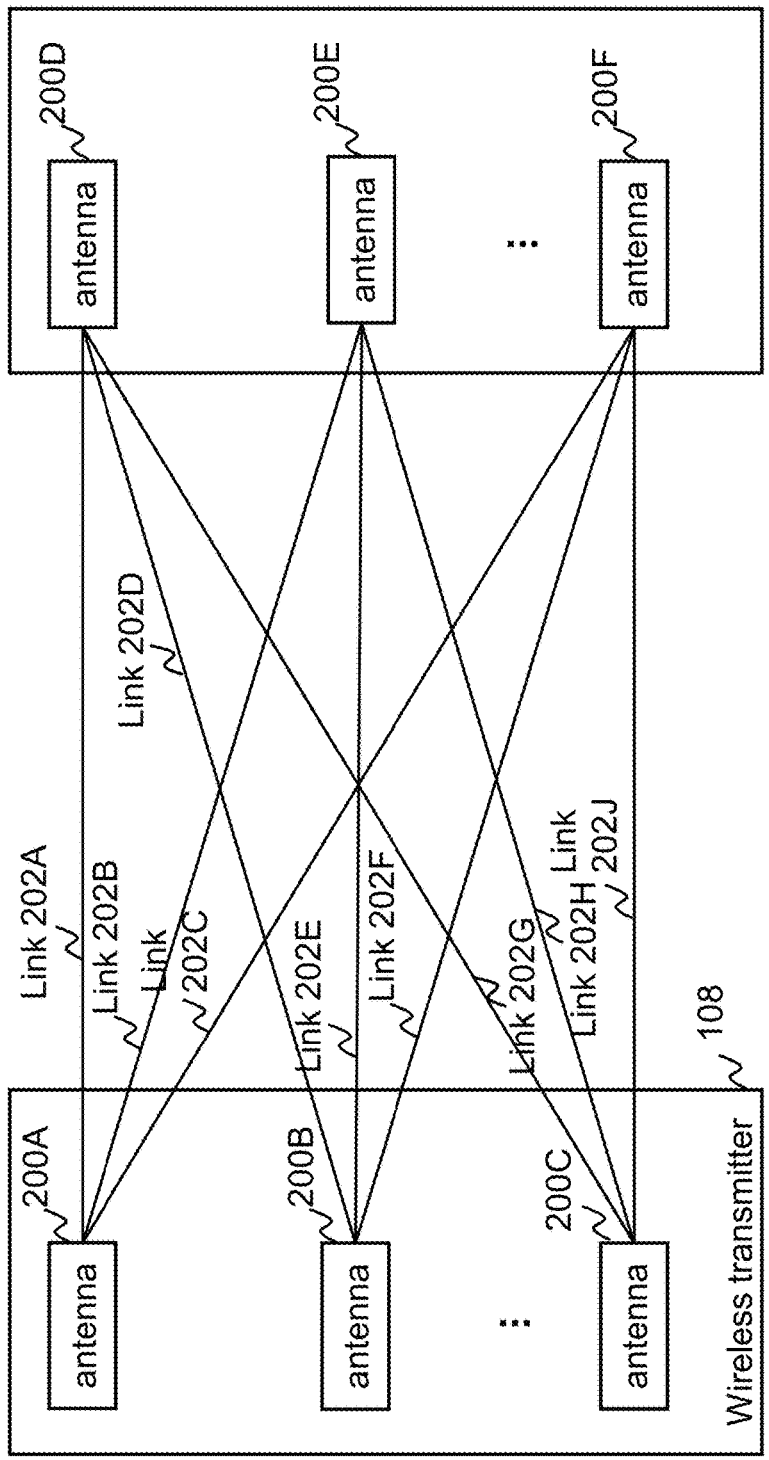
FIG. 2 is a diagram showing multiple links each formed by one antenna of a wireless transmitter (e.g. 108) with at least one antenna and one antenna of a wireless receiver (e.g. 109) with at least one antenna, according to one embodiment of the present teaching.

One of the at least one wireless transmitter (e.g. 118) may have at least one transmitting antenna (e.g. antenna 200A, 200B, 200C, etc. of FIG. 2). One of the at least one wireless receiver (e.g. 109) may have at least one receiving antenna (e.g. antenna 202A, 202B, 202C). A time series of channel information (e.g. 300, 111A and/or 111B) of the wireless multipath channel (e.g. 144) may be extracted from the wireless signal (e.g. 140) for each link (e.g. link 202A, 202B, 202C, 202D, 202E, 202F, 202G, 202G, 202J) between one of the at least one transmitting antenna (e.g. 200A, 200B, 200C) and one of the at least one receiving antenna (e.g. 202A, 202B, 202C). Each channel information (e.g. 111A, 111B) (CI) of the time series (e.g. 300) may be associated with a time instance (e.g. time 130, 132, 134, 136) and/or the link (e.g. link 202A, 202B, 202C, 202D, 202E, 202F, 202G, 202G, 202J) between the corresponding transmitting antenna (e.g. 200A, 200B, 200C) and the corresponding receiving antenna (e.g. 202A, 202B, 202C).

The at least one time series of channel information (e.g. 300, 111A, 111B) may be preprocessed using de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function. The at least one time series of channel information (e.g. 300, 111A, 111B) may be preprocessed jointly.

The initial spatial-temporal information (e.g. initial position 114) may be determined based on at least one local characteristics (e.g. temporally local or local in terms of time, spatially local or local in terms of space, local in terms of frequency, and/or local in terms of some decomposition, etc.) of the at least one time series of channel information (e.g. 300, 111A, 111B). A time collection of the at least one time series comprising a set of time instances (e.g. time 130, 132, 134, 136, etc.) may be identified. At (or around) each time instance of the time collection, channel information (e.g. 111A, 111B) (of one of the at least one time series) may have a certain local characteristics (e.g. local in terms of time, space, frequency, and/or some decomposition, etc.). The local characteristics may be that each of the channel information (e.g. 111A, 111B) (e.g. channel information may be quantities associated with time, space, frequency and/or some decomposition) is larger than a first threshold, and/or smaller than a second threshold. The local characteristics may be that each of the channel information (e.g. 111A, 111B) belongs to a set of allowable information. The local characteristics may also be that some function of one and/or more channel information (e.g. 111A, 111B) is larger than the first threshold, and/or smaller than the second threshold. The first threshold and/or the second threshold may be locally adaptive, with different values at different time instances. The first threshold and/or the second threshold may be locally adaptive, with different values at different time instances. The time collection may be a contiguous time period. The time collection may also be a combination of disjoint contiguous time periods and/or individual time instances. The allowable information may be continuous and/or discrete. The local characteristics may comprise other elements.

Each channel information may be associated with a time stamp, at least one first antenna of a Type 1 device, an ID of the Type 1 device, at least one second antenna of a Type 2 device, at ID of the Type 2 device, an SSID, a MAC address, an internet protocol (IP) address, a venue, a spatial location, a geo-tag, an environmental information, a frequency, a frequency band, a frequency channel, a WiFi frequency channel, an LTE channel, a mobile channel, a frequency characteristics of a decomposition, an object, an ID of the object, a user, an ID of the user, a venue, an ID of the venue, a local area network (LAN), an ID of the LAN, an SSID observable by the Type 1 device and/or Type 2 device.

Figure 3:
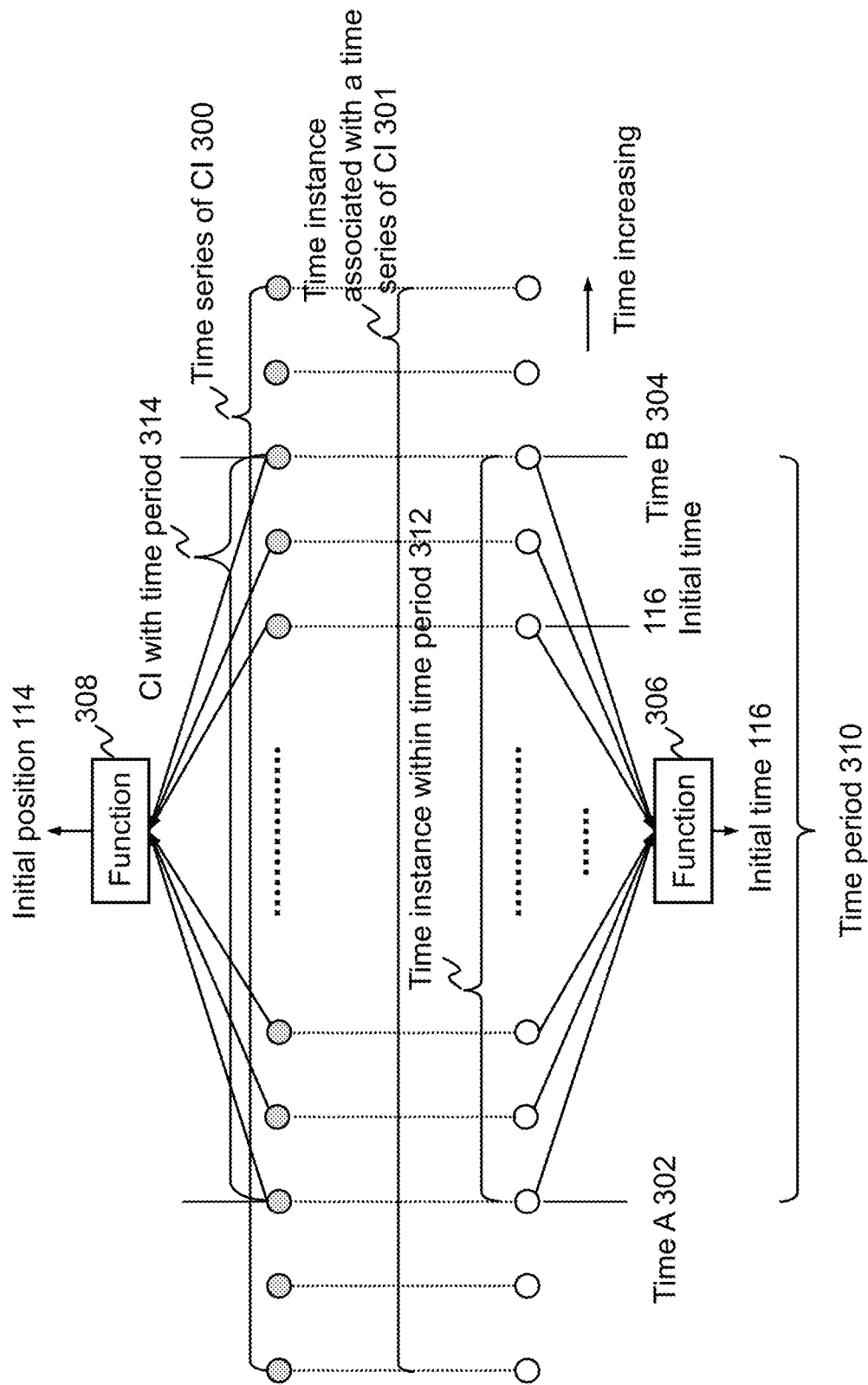
FIG. 3 is a diagram showing a time period associated with at least one time instance used to determine an initial time (e.g. 116) and with at least one associated channel information (e.g. 111A, 111B) used to determine an initial position, according to one embodiment of the present teaching.

Each channel information (e.g. 111A, 111B) of a time series (e.g. 300) may be associated with a time instance (e.g. 301). The initial spatial-temporal information (e.g. initial position 114) may be associated with an initial time (e.g. 116) and/or a time period (e.g. 310 of FIG. 3). The initial time (e.g. 116) may be a function (e.g. 306 of FIG. 3) of time instances (e.g. 301 of FIG. 3) in the time period. The time period may include all the time from time A to time B, such that the initial time (e.g. 116) is between A and B. Within the time period (e.g. 310), there may be many time instance (e.g. 301) of the at least one time series of CI (e.g. 300). The function (e.g. 306) may be mean, median, mode, a quartile, a percentile, and/or another function. The initial spatial-temporal information (e.g. initial position 114) may be determined based on the CI (e.g. 111A, 111B) in the time period (e.g. 314) associated with corresponding time instance in the period (e.g. 312).

The initial spatial-temporal information (e.g. initial position 114) may be determined based on at least one known spatial-temporal information (e.g. location 117, 119) associated with at least one of the wireless transmitter (e.g. 108) and the wireless receiver (e.g. 109). The initial position (e.g. 114) may be determined based on a map of the venue (e.g. 142). The initial time (e.g. 116) may be long before (i.e. large difference between time t_N 132 and time t_(N−k) 134) and/or shortly before (i.e. small difference between time t_N 132 and time t_(N−k) 134) the current movement (e.g. 120). The difference between time t_N 132 and time t_(N−k) 134 may be less than 1 second, between 1 second and 1 minute, between 1 minute to 1 hour, and/or larger than 1 hour.

The initial spatial-temporal information (e.g. initial position 114) may be associated with multiple initial time (e.g. 116) instances (e.g. 301, 312, 116) with multiple corresponding position (e.g. 114, 115B, 115A, 117, 119, 406, 408, 410, 414). The initial spatial-temporal information (e.g. initial position 114) associated with an initial time (e.g. 116) may be determined based on the multiple initial time (e.g. 116) instances (e.g. 301) and/or the multiple corresponding position (e.g. 114, 115B, 115A, 117, 119, 406, 408, 410, 414). The multiple initial time (e.g. 116) instances (e.g. 301) and the multiple corresponding spatial-temporal information (e.g. positions 114, 115B, 115A, 117, 119, 406, 408, 410, 414) may be processed with at least one of: linear regression, some regression, optimization, joint optimization, cost minimization, and/or curve fitting, etc. The initial time (e.g. 116) may be determined based on the multiple initial time (e.g. 116) instances and/or the multiple corresponding spatial-temporal info (e.g. 114, 115B, 115A, 117, 119, 406, 408, 410, 414).

The wireless multipath channel (e.g. 144) may be associated with at least one wireless transmitter (e.g. 108) and at least one wireless receiver (e.g. 109). The at least one wireless transmitter (e.g. 108) may transmit the wireless signal (e.g. 140) to the at least one wireless receiver (e.g. 109). The processor (e.g. 100A/B), the memory (e.g. 102A/B) and the set of instructions (e.g. 104A/B) may be associated with a particular wireless transmitter (e.g. 108) and/or a particular wireless receiver (e.g. 109). The particular wireless transmitter (e.g. 108) and/or the particular wireless receiver (e.g. 109) may move with the object (e.g. 112) in the prior movement (e.g. 118) of the object (e.g. 112), the current movement (e.g. 120) of the object (e.g. 112) and/or a future movement of the object (e.g. 112).

The particular wireless transmitter (e.g. 108) and/or the particular wireless receiver (e.g. 109) may be associated with at least one known spatial-temporal information (e.g. location 117, 119). The initial spatial-temporal information (e.g. initial location) may be determined based on the at least one known spatial-temporal information (e.g. location) associated with the particular wireless transmitter (e.g. 108) and/or the particular wireless receiver (e.g. 109). The initial spatial-temporal information (e.g. initial location 114) may be one of the at least one known spatial-temporal information (e.g. location).

The initial spatial-temporal information (e.g. initial position 114) and/or the initial time (e.g. 116) may further be determined based on another particular wireless receiver (e.g. 113A) and/or another particular wireless transmitter (e.g. 113B) associated with another known spatial-temporal information (e.g. another known location). The initial spatial-temporal information (e.g. initial location 114, the initial time 116) may be determined jointly based on both the particular wireless receiver (e.g. 109), the particular wireless transmitter (e.g. 108), the another particular wireless receiver (e.g. 113A), and/or the another particular wireless transmitter (e.g. 113B). The particular wireless receiver (e.g. 109), the particular wireless transmitter (e.g. 108), the another particular wireless receiver (e.g. 113A), and/or the another particular wireless transmitter (e.g. 113B) may be associated with at least one time series chosen from the at least one time series of CI (e.g. 300) based on at least one criteria. For example, one criteria may be that some channel information (e.g. 111A, 111B) of the time series is larger than a third threshold, and/or smaller than a fourth threshold.

The initial spatial-temporal information (e.g. initial location) may also be determined based on at least one representative channel information (e.g. 111A, 111B) in the time series associated with the particular wireless receiver (e.g. 109), the particular wireless transmitter (e.g. 108), the another particular wireless receiver (e.g. 113A), and/or the another particular wireless transmitter (e.g. 113B).

The wireless receiver (e.g. 109) and/or the wireless transmitter (e.g. 108) may each have at least one directional antenna (e.g. 200A, 200B, 200C, 200D, 200E, 200F). The initial spatial-temporal information (e.g. initial position 114) of the object (e.g. 112) may be determined based on at least one characteristics of the at least one directional antenna. The characteristics may be an orientation, an angle, a beam width, a reference signal strength, a decaying characteristics of the directional antenna, a gain characteristics of the directional antenna and/or another characteristics.

The initial spatial-temporal information (e.g. initial position 114) of the object (e.g. 112) may be determined based on a comparison of a particular time series of channel information (e.g. 300, 111A, 111B) with a stored reference time series of channel information (e.g. 300, 111A, 111B) of heterogeneous time duration. The stored reference time series may be obtained and/or collected in the past (before the initial time 116). The stored reference time series may/may not be associated with the object (e.g. 112) and/or another past movement (e.g. 118) of the object (e.g. 112). The stored reference time series may/may not be associated with the wireless receiver (e.g. 109) and/or the wireless transmitter (e.g. 108). The comparison may involve aligning the particular time series and the stored reference time series, and identifying at least one particular special moment of the particular time series aligned to at least one reference special moment of the stored reference time series. The aligning may be based on dynamic programming, a variation of dynamic programming, dynamic time warping (DTW) and/or a variation of DTW with respect to at least one mismatch measure. The initial spatial-temporal information (e.g. initial position 114) of the object (e.g. 112) may be determined based on the channel information (e.g. 111A, 111B) at or around the at least one particular special moment of the particular time series.

The initial spatial-temporal information (e.g. initial position 114) of the object (e.g. 112) may be determined based on at least one function (e.g. 308 of FIG. 3) of the channel information (e.g. 111A, 111B) at the at least one particular special moment of the particular time series. The initial spatial-temporal information (e.g. initial position 114) of the object (e.g. 112) may be determined based on comparing the at least one function of the channel information (e.g. 111A, 111B) at the at least one particular special moment of the particular time series with at least one threshold. The comparing may comprise hard threshold and/or soft thresholding.

At least one other special moment of the at least one time series may be identified. The initial spatial-temporal information (e.g. 114, 115B, 115A, 117, 119, 406, 408, 410, 414) of the object (e.g. 112) may be determined based on the at least one other special moment of the at least one time series.

The initial spatial-temporal information (e.g. 114, 115B, 115A, 117, 119, 406, 408, 410, 414) may be in the vicinity of one of at least one predetermined location (e.g. 117 and/or 119). In one example, the at least one wireless receiver (e.g. 109) and/or the at least one wireless transmitter (e.g. 108) may move with the object (e.g. 112) in the prior movement (e.g. 118), the current movement (e.g. 120) and/or a future movement of the object (e.g. 112). The at least one wireless receiver (e.g. 109) and/or the at least one wireless transmitter (e.g. 108) may be located at the at least one predetermined location (e.g. 117 and/or 119).

The initial spatial-temporal information (e.g. 114, 115B, 115A, 117, 119, 406, 408, 410, 414) may be associated with multiple predetermined spatial-temporal information (e.g. locations). The initial spatial-temporal info (e.g. 114, 115B, 115A, 117, 119, 406, 408, 410, 414) may be determined based on the multiple predetermined spatial-temporal information (e.g. locations). The initial spatial-temporal information (e.g. 114, 115B, 115A, 117, 119, 406, 408, 410, 414)

may be determined by triangulation and/or other fusion technique based on the multiple predetermined spatial-temporal information (e.g. locations).

The at least one wireless receiver (e.g. 109) and/or at least one wireless transmitter (e.g. 108) may be associated with the at least one predetermined spatial-temporal information (e.g. location).

In another example, a first device (e.g. 106A, 106B, 108, 109, 113A, 113B of FIG. 1, 400 of FIGS. 4A-4C) with one of a wireless receiver (e.g. 109) and a wireless transmitter (e.g. 108) may move with the object (e.g. 112) in the prior movement (e.g. 118), current movement (e.g. 120) and/or a future movement. The first device (e.g. 106A, 106B, 108, 109, 113A, 113B, 400) may be associated with a first spatial-temporal information (e.g. location) which changes with the object (e.g. 112) location (e.g. 114, 115B, 115A) as the object (e.g. 112) moves. A second device (e.g. 106A, 106B, 108, 109, 113A, 113B, 400, 402, 404), being the other one of the wireless receiver (e.g. 109) and the wireless transmitter (e.g. 108), may be located at, above, and/or around a second location (e.g. 406 of FIGS. 4A-4C). When the object (e.g. 112) moves close to the second location (e.g. 406), the first device (e.g. 400) and the second device (e.g. 402) will be very close such that the channel information (e.g. 111A, 111B) such as RSSI would exhibit a maximum at the second location (e.g. 117, 119), with the maximum value of channel information (e.g. 111A, 111B) larger than a threshold. The initial location 114 of the object (e.g. 112) may be determined to be the second location (e.g. 406) at a corresponding initial time (e.g. 116), wherein the initial time (e.g. 116) is the time instance (e.g. one of 301) associated with the maximum.

In another example, the first device (e.g. 400), being one of a wireless receiver (e.g. 109) and a wireless transmitter (e.g. 108) may move with the object (e.g. 112) in the prior movement (e.g. 118), current movement (e.g. 120) and/or a future movement. The object (e.g. 112) may move between two devices (e.g. 106A, 106B, 108, 109, 113A, 113B, 402, 404): the second device (e.g. 402) and a third device (e.g. 404). The first device (e.g. 400) may be communicatively coupled with the second device (e.g. 402) and the third device (e.g. 404) wirelessly. In other words, wireless signals (e.g. 140) may be sent between the first device (e.g. 400) and the second device (e.g. 402). Similarly, wireless signals (e.g. 140) may be sent between the first device (e.g. 400) and the third device (e.g. 404). The second device (e.g. 402), being the other one of the wireless receiver (e.g. 109) and the wireless transmitter (e.g. 108), may be located at, above, and/or around a second location (e.g. 406). The third device (e.g. 404), being another instance of the other one of the wireless receiver (e.g. 109) and the wireless transmitter (e.g. 108), may be located at, above, and/or around a third location (e.g. 408).

When the object (e.g. 112) with the first device (e.g. 400) moves between the second location (e.g. 406) and the third location (e.g. 408), the first device (e.g. 400) and the second device (e.g. 402) may be very close such that the channel information (e.g. 111A and/or 111B) such as RSSI corresponding to the second device (e.g. 402) may exhibit a maximum at a fourth time instance (e.g. 412) at a fourth location (e.g. 410) somewhere between the second location (e.g. 406) and the third location (e.g. 408). Meanwhile, the first device (e.g. 400) and the third device (e.g. 404) may be very close such that the channel information (e.g. 111A and/or 111B) such as RSSI corresponding to the third device (e.g. 404) may also exhibit a maximum at a fifth time instance (e.g. 416) at a fifth location (e.g. 414) somewhere between the second location (e.g. 406) and the third location (e.g. 408).

Figure 4A:
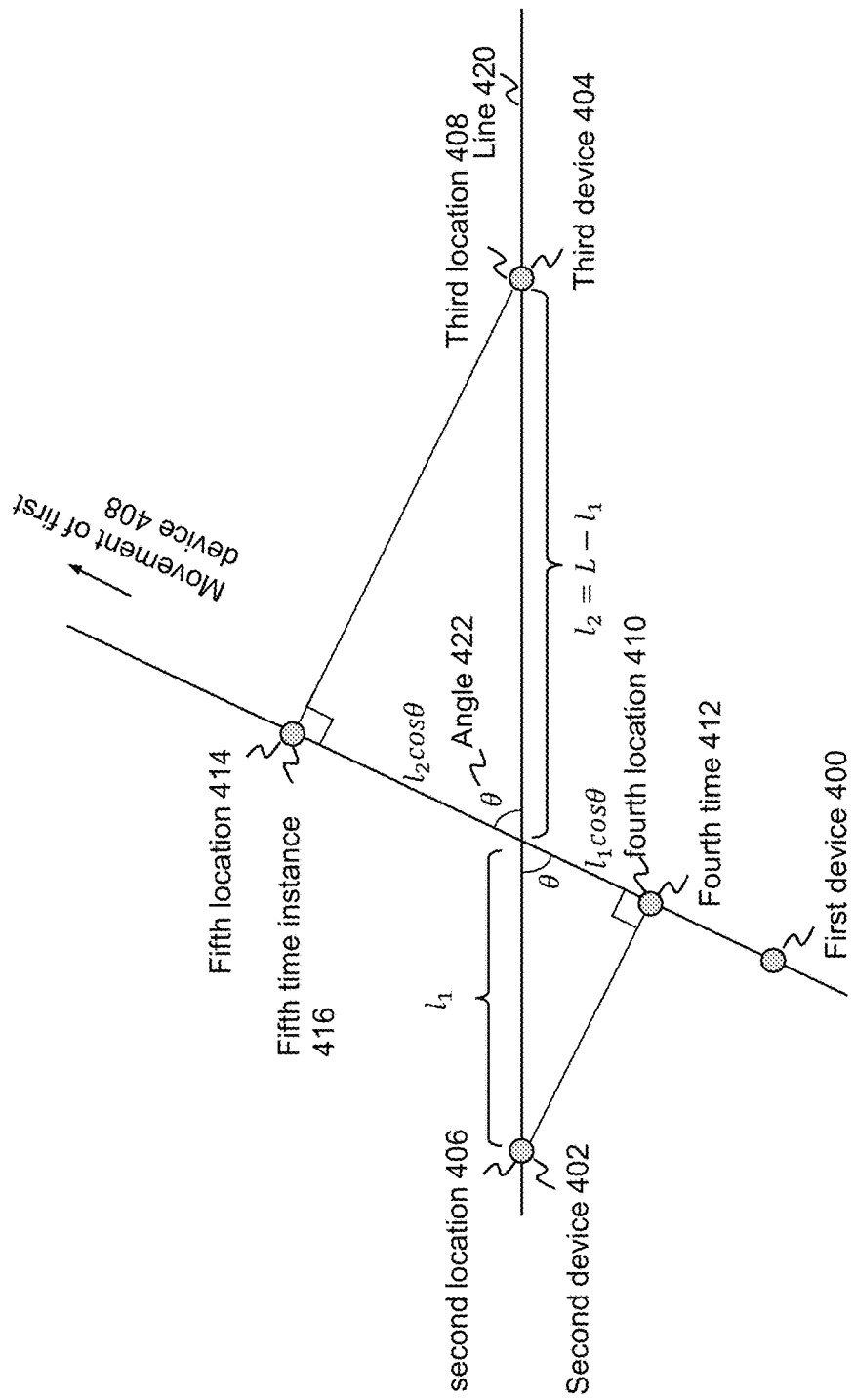
FIG. 4A is a diagram showing a first device moving between a second device and a third at an angle less than 90 degrees, with an initial direction, an initial position and an initial time (e.g. 116) of the first device to be determined, according to one embodiment of the present teaching.
Figure 4B:
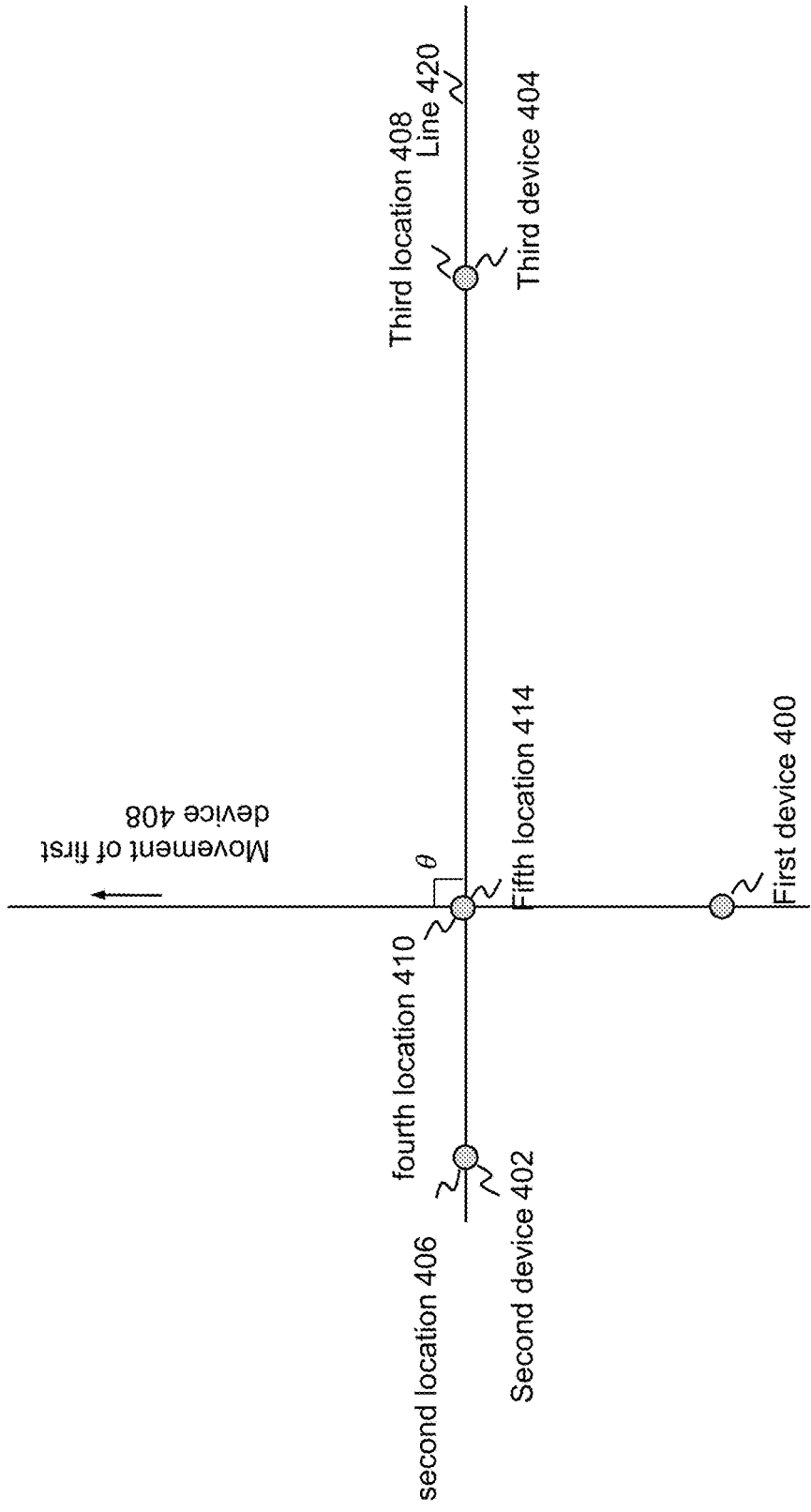
FIG. 4B is a diagram showing a first device moving between a second device and a third at an angle of 90 degrees, with an initial direction, an initial position and an initial time (e.g. 116) of the first device to be determined, according to one embodiment of the present teaching.
Figure 4C:
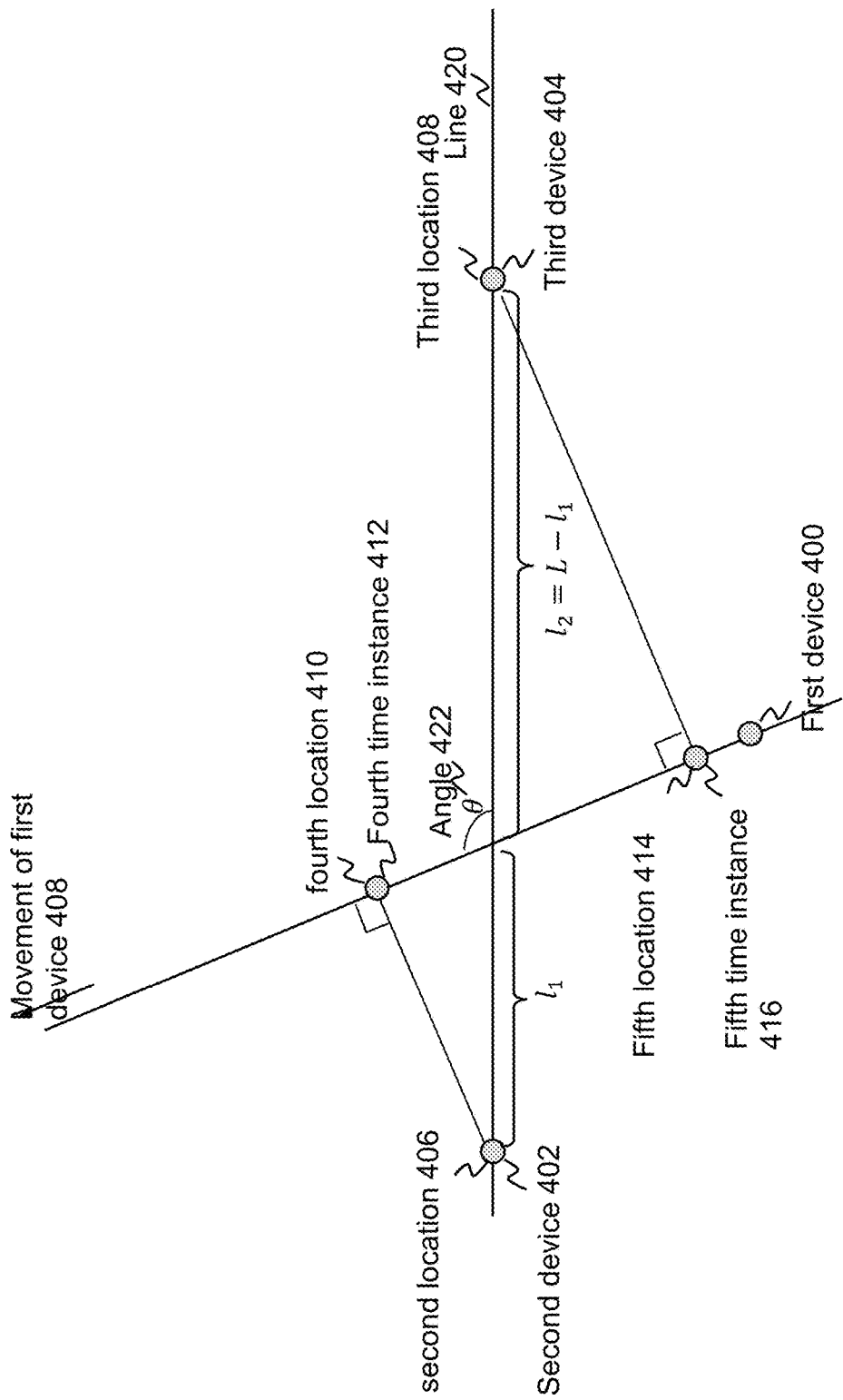
FIG. 4C is a diagram showing a first device moving between a second device and a third at an angle greater than 90 degrees, with an initial direction, an initial position and an initial time (e.g. 116) of the first device to be determined, according to one embodiment of the present teaching.

If the movement (e.g. 418) of the object (e.g. 112) is perpendicular to a straight line (e.g. 420) connecting the second location (e.g. 406) and the third location (e.g. 408) (i.e. if the angle (e.g. 422) is 90 degrees as shown in FIG. 4B), the fourth time instance (e.g. 412) may be equal to the fifth time instance (e.g. 416), and/or the fourth location (e.g. 410) may be the same as the fifth location (e.g. 414). If the movement (e.g. 418) of the object (e.g. 112) is at an angle (e.g. 422) with the straight line (e.g. 420) connecting the second location (e.g. 406) and the third location (e.g. 408) such that the angle (e.g. 422) is less than 90 degrees as shown in FIG. 4A, the fourth time instance (e.g. 412) may be before the fifth time instance (e.g. 416). If the angle (e.g. 422) is greater than 90 degrees as shown in FIG. 4C, the fourth time instance (e.g. 412) may be after the fifth time instance (e.g. 416). Thus the direction (e.g. 123) of the movement 418 of the first device (e.g. 400) may be estimated roughly based on whether the fourth time instance (e.g. 412) is equal to, before or after the fifth time instance (e.g. 416). The direction of the movement 418 of the first device (e.g. 400) may further be estimated by estimating angle (e.g. 422) based on the equation:

$$\cos\theta = (v\Delta t/L)$$

where v is the instantaneous speed of the first device (e.g. 400), $\Delta t$ is the fifth time instance (e.g. 416) minus the fourth time instance (e.g. 412), and L is the distance between the second location (e.g. 406) of the second device (e.g. 402) and the third location (e.g. 408) of the third device (e.g. 404).

The channel information CI (e.g. 111A, 111B) may comprise channel state information (CSI, e.g. 110A, 110B). The instantaneous speed v of the first device (e.g. 400) may be obtained by comparing an instantaneous time reversal resonating strength (TRRS) between two adjacent CSI against a model function, as described in our previous patent application. The two adjacent CSI may be CSI between the first device (e.g. 400) and the second device (e.g. 402). The two adjacent CSI may also be CSI between the first device (e.g. 400) and the third device (e.g. 404).

The initial location (e.g. 114) and the initial time (e.g. 116) of the object (e.g. 112) may be determined based on the fourth location (e.g. 410), the fourth time instance (e.g. 412), the fifth location (e.g. 414) and/or the fifth time instance (e.g. 416). The initial location 114 may also be determined based on the channel information (e.g. 111A, 111B) associated with the first device (e.g. 400), the second device (e.g. 402) and the third device (e.g. 404). For example, the CI (e.g. 111A, 111B) may comprise RSSI. A reference function of CI (e.g. 111A, 111B) may be obtained. The instantaneous CI (e.g. 111A, 111B) between the first device (e.g. 400) and the second device (e.g. 402) may be compared with the RSSI to estimate an instantaneous distance between the first device (e.g. 400) and the second device (e.g. 402). Similarly, the instantaneous CI (e.g. 111A, 111B) between the first device (e.g. 400) and the third device (e.g. 404) may be compared with the RSSI to estimate an instantaneous distance between the first device (e.g. 400) and the third device (e.g. 404). The instantaneous location of the object (e.g. 112) may be computed based on the two instantaneous distance. The instantaneous location of the object (e.g. 112) may be computed based on triangulation, trigonometry and another method.

The initial time (e.g. 116) may be chosen to be the fourth time instance (e.g. 412) such that the instantaneous location of the object (e.g. 112) at the fourth time instance (e.g. 412) is computed and chosen as the initial location 114. The initial time (e.g. 116) may be chosen to be the fifth time instance (e.g. 416) such that the instantaneous location of the object (e.g. 112) at the fifth time instance (e.g. 412) is computed and chosen as the initial location 114. The initial time (e.g. 116) may be chosen to be a time around the fourth time instance (e.g. 412) and/or the fifth time instance (e.g. 416) such that the instantaneous location of the object (e.g. 112) at the initial time (e.g. 116) is computed and chosen as the initial location 114. Interpolation and/or extrapolation may be used to compute the instantaneous location of the object (e.g. 112) at the initial time (e.g. 116). Interpolation may be used for the case of the initial time (e.g. 116) being between the fourth time instance (e.g. 412) and the fifth time instance (e.g. 416), and extrapolation may be used otherwise.

Apart from the second device (e.g. 402) and the third device (e.g. 404), additional similar devices (e.g. 106A, 106B, 108, 109, 113A, 113B, 400, 402, 404) at nearby locations may be coupled with the first device (e.g. 400) wirelessly and used to determine the initial location 114 and the initial time (e.g. 116) of the first device (e.g. 400). The second device (e.g. 402), the third device (e.g. 404) and/or the additional similar devices (e.g. 106A, 106B, 108, 109, 113A, 113B, 400, 402, 404) may be communicatively coupled also.

The second device (e.g. 402) may have two or more antennas (e.g. 200A, 200B, 200C, 200D, 200E, 200F) at different locations around the second location (e.g. 406). The third device (e.g. 404) may also have two or more antennas (e.g. 200A, 200B, 200C, 200D, 200E, 200F) at different locations around the third location (e.g. 408). Multiple straight lines may be drawn each between an antenna of the second device (e.g. 402) and an antenna of the third device (e.g. 404). Similar to the line (e.g. 420), each of these straight lines may give a corresponding estimated distance, estimated instantaneous location and/or estimated angle (e.g. 422) of the movement of the first device (e.g. 418), which may be combined to achieve higher precision for the estimated values.

The wireless transmitter (e.g. 108) and/or the wireless receiver (e.g. 109) may be embedded in a portable device (e.g. the module 106A and/or 106B, or a device with the module 106A and/or 106B, 108, 109, 113A, 113B, 400, 402, 404) that may move with the object (e.g. 112) in the prior movement (e.g. 118) and/or the current movement (e.g. 120). The portable device (e.g. 106A, 106B, 108, 109, 113A, 113B, 400, 402, 404) may be communicatively coupled with the object (e.g. 112) using a wired connection (e.g. through USB, microUSB, Firewire, HDMI, serial port, parallel port, and other connectors) and/or a wireless connection (e.g. Bluetooth, Bluetooth Low Energy (BLE), WiFi, ZigBee, etc.). The portable device (e.g. 106A, 106B, 108, 109, 113A, 113B, 400, 402, 404) may be a lightweight device. The portable device (e.g. 106A, 106B, 108, 109, 113A, 113B, 400, 402, 404) may be powered by battery, rechargeable battery and/or AC power. The portable device (e.g. 106A, 106B, 108, 109, 113A, 113B, 400, 402, 404) may be very small (e.g. at sub-millimeter scale and/or sub-centimeter scale), and/or small (e.g. coin-size, card-size, pocket-size, or larger). The portable device (e.g. 106A, 106B, 108, 109, 113A, 113B, 400, 402, 404) may be large, sizable, and/or bulky (e.g. heavy machinery to be installed). The portable device (e.g. 106A, 106B, 108, 109, 113A, 113B, 400, 402, 404) may be a WiFi hotspot, an access point, a mobile WiFi (MiFi), a dongle with USB/micro USB/Firewire/other connector, a smartphone, a portable computer, a computer, a tablet, a smart watch, a smart glass, a smart mirror, a smart antenna, a smart battery, a smart light, a smart pen, a smart ring, a smart door, a smart window, a smart clock, a small battery, a smart wallet, a smart belt, a smart handbag, a smart clothing/garment, a smart ornament, a smart packaging, a smart paper/book/magazine/poster/printed matter/signage/display/lighted system/lighting system, a smart key/tool, a smart bracelet/chain/necklace/wearable/accessory, a smart pad/cushion, a smart tile/block/brick/building material/other material, a smart garbage can/waste container, a smart food carriage/storage, a smart ball/racket, a smart chair/sofa/bed, a smart shoe/footwear/carpet/mat/shoe rack, a smart glove/hand wear/ring/hand ware, a smart hat/headwear/makeup/sticker/tattoo, a smart mirror, a smart toy, a smart pill, a smart utensil, a smart bottle/food container, a smart tool, a smart device, an IoT device, a WiFi enabled device, a network enabled device, a 3G/4G/5G/6G enabled device, an embeddable device, an implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, a vehicle, a cart, a wagon, warehouse vehicle, a car, a bicycle, a motorcycle, a boat, a vessel, an airplane, a basket/box/bag/bucket/container, a smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable may have an identity (ID) as described above.

The wireless receiver (e.g. 109) may receive the wireless signal (e.g. 140) and/or another wireless signal (e.g. 140) from the wireless transmitter (e.g. 108). The wireless receiver (e.g. 109) may receive another wireless signal (e.g. 140) from another wireless transmitter (e.g. 113B). The wireless transmitter (e.g. 108) may transmit the wireless signal (e.g. 140) and/or another wireless signal (e.g. 140) to another wireless receiver (e.g. 113A). The wireless transmitter (e.g. 108), the wireless receiver (e.g. 109), the another wireless receiver (e.g. 113A) and/or the another wireless transmitter (e.g. 113B) may be moving with the object (e.g. 112) and/or another object. The another object may be tracked. The wireless receiver (e.g. 109) may switch from the wireless transmitter (e.g. 108) to the another wireless transmitter (e.g. 113B) at some time. The transmitter (e.g. 108) may switch from the wireless receiver (e.g. 109) to the another wireless receiver (e.g. 113A) at another time. The wireless transmitter (e.g. 108) and the another wireless transmitter (e.g. 113B) may use same and/or different radio. The wireless receiver (e.g. 109) and the another wireless receiver (e.g. 113A) may use same and/or different radio. The wireless signal (e.g. 140) and/or the another wireless signal (e.g. 140) may have data embedded. The wireless receiver (e.g. 109), the wireless transmitter (e.g. 108), the another wireless receiver (e.g. 113A) and/or the another wireless transmitter (e.g. 113B) may be associated with at least one processor (e.g. 100A and/or 100B), memory (e.g.

102A, 102B) communicatively coupled with respective processor (e.g. 100A and/or 100B), and/or respective set of instructions (e.g. 104A, 104B) stored in the memory (e.g. 102A, 102B) which when executed cause the processor (e.g. 100A and/or 100B) to perform any and/or all operations needed to determine the spatial-temporal information (e.g. 114, 115B, 115A, 117, 119, 406, 408, 410, 414), the initial spatial-temporal information (e.g. 114, 115B, 115A, 117, 119, 406, 408, 410, 414), the initial time (e.g. 116), the direction (e.g. 123), the instantaneous location (e.g. 115B, 406, 408, 410, 414), the instantaneous angle (e.g. 422), and/or the speed, of the object (e.g. 112).

The wireless transmitter (e.g. 108), the wireless receiver (e.g. 109), the another wireless transmitter (e.g. 113B) and/or the another wireless receiver (e.g. 113A) may move with the object (e.g. 112) and/or another object in the prior movement (e.g. 118), the current movement (e.g. 120) and/or some future movement.

The wireless receiver (e.g. 109), the wireless transmitter (e.g. 108), the another wireless receiver (e.g. 113A) and/or the another wireless transmitter (e.g. 113B) may be communicatively coupled to one or more nearby device (e.g. 106A, 106B, 108, 109, 113A, 113B, 400, 402, 404). The nearby device (e.g. 106A, 106B, 108, 109, 113A, 113B, 400, 402, 404) may/may not move with the object (e.g. 112). The wireless receiver (e.g. 109), the wireless transmitter (e.g. 108), the another wireless receiver (e.g. 113A) and/or the another wireless transmitter (e.g. 113B) may transmit the at least one time series of channel information (e.g. 111A, 111B) and/or information associated with the at least one time series of CI (e.g. 300) to the nearby device (e.g. 106A, 106B, 108, 109, 113A, 113B, 400, 402, 404), the wireless transmitter (e.g. 108), the wireless receiver (e.g. 109), the another wireless transmitter (e.g. 113B) and/or the another wireless receiver (e.g. 113A). The another wireless transmitter (e.g. 113B) and/or the another wireless receiver (e.g. 113A) may be with the nearby device (e.g. 106A, 106B, 108, 109, 113A, 113B, 400, 402, 404).

The nearby device (e.g. 106A, 106B, 108, 109, 113A, 113B, 400, 402, 404) may be portable/not portable/moveable/non-moveable. The nearby device (e.g. 106A, 106B, 108, 109, 113A, 113B, 400, 402, 404) may use battery power, solar power, AC power and/or other power source. The nearby device (e.g. 106A, 106B, 108, 109, 113A, 113B, 400, 402, 404) may have replaceable/non-replaceable battery, and/or rechargeable/non-rechargeable battery. The nearby device (e.g. 106A, 106B, 108, 109, 113A, 113B, 400, 402, 404) may be similar to the object (e.g. 112). The nearby device (e.g. 106A, 106B, 108, 109, 113A, 113B, 400, 402, 404) may have identical (and/or similar) hardware and/or software to the object (e.g. 112). The nearby device (e.g. 106A, 106B, 108, 109, 113A, 113B, 400, 402, 404) may be a smart device, a network enabled device, a device with connection to WiFi/3G/4G/5G/6G/Zigbee/Bluetooth/adhoc network/other network, a smart speaker, a smart watch, a smart clock, a smart appliance, a smart machine, a smart equipment, a smart tool, a smart vehicle, an internet-of-thing (IoT) device, an internet-enabled device, a computer, a portable computer, a tablet, and another device.

The nearby device (e.g. 106A, 106B, 108, 109, 113A, 113B, 400, 402, 404) and/or at least one processor (e.g. 100A, 100B) associated with the wireless receiver (e.g. 109), the wireless transmitter (e.g. 108), the another wireless receiver (e.g. 113A), the another wireless transmitter 113B and/or a cloud server (in the cloud) may determine the initial spatial-temporal information (e.g. 114, 115B, 115A, 117, 119, 406, 408, 410, 414) of the object (e.g. 112). Two or more of them may determine the initial spatial-temporal info (e.g. 114, 115B, 115A, 117, 119, 406, 408, 410, 414) jointly. Two or more of them may share intermediate information in the determination of the initial spatial-temporal information (e.g. initial position 114).

In one example, the wireless transmitter (e.g. 108) may move with the object (e.g. 112) in the prior movement (e.g. 118) and/or the current movement (e.g. 120). The wireless transmitter (e.g. 108) may send the wireless signal (e.g. 140) to the wireless receiver (e.g. 109) for the determining of the initial spatial-temporal information (e.g. initial position 114) of the object (e.g. 112). The wireless transmitter (e.g. 108) may also send the wireless signal (e.g. 140) and/or another wireless signal (e.g. 140) to another wireless receiver (e.g. 113A) for the tracking of the current movement (e.g. 120) of the object (e.g. 112). The wireless receiver (e.g. 109) may also receive the wireless signal (e.g. 140) and/or another wireless signal (e.g. 140) from the wireless transmitter (e.g. 108) and/or the another wireless transmitter 113B for the tracking of the current movement (e.g. 120) of the object (e.g. 112).

In another example, the wireless receiver (e.g. 109) may move with the object (e.g. 112) in the prior movement (e.g. 118) and/or the current movement (e.g. 120). The wireless receiver (e.g. 109) may receive the wireless signal (e.g. 140) from the wireless transmitter (e.g. 108) for the determining of the initial spatial-temporal info (e.g. initial position 114) of the object (e.g. 112). The wireless receiver (e.g. 109) may also receive the wireless signal (e.g. 140) and/or another wireless signal (e.g. 140) from another wireless transmitter (e.g. 113B) for the tracking of current movement (e.g. 120) of the object (e.g. 112).

Coin-Sized Bot

This disclosure is also related to object tracking using a small (e.g. coin-size, cigarette box size, or even smaller, etc.) bot/origin. In our disclosure, the wireless transmitter (e.g. 108, 113B of FIG. 1) and/or the wireless receiver (e.g. 109, 113A) may be part of a small light-weight first portable device (e.g. 106A, 106B, 108, 109, 113A, 113B, 400, 402, 404). The first portable device (e.g. 106A, 106B, 108, 109, 113A, 113B, 400, 402, 404) may be wirelessly coupled with a second device (e.g. 106A, 106B, 108, 109, 113A, 113B, 400, 402, 404).

The second device (e.g. 106A, 106B, 108, 109, 113A, 113B, 400, 402, 404) may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The second device (e.g. 106A, 106B, 108, 109, 113A, 113B, 400, 402, 404) may be connected to a cloud server, a local server and/or other server via internet, wired internet connection and/or wireless internet connection. The second device may be portable.

The first portable device (e.g. 106A, 106B, 108, 109, 113A, 113B, 400, 402, 404), the second device (e.g. 106A, 106B, 108, 109, 113A, 113B, 400, 402, 404), a local server and/or a cloud server may share the computation and/or storage for any of the tasks (e.g. obtain time series of channel information (e.g. 300, 111A, 111B), determine characteristics of the object (e.g. 112) associated with the movement of the object (e.g. 112), computation of time series of power information, determining/computing the particular function, searching for local extremum, classification, identifying particular value of time offset, de-noising, processing, simplification, cleaning, wireless smart sensing task, extract channel information (e.g. 111A, 111B) from wireless signal (e.g. 140), switching, segmentation, estimate trajectory, process the map, correction, corrective adjustment, adjustment, map-based correction, detecting error, checking for boundary hitting, thresholding, etc.) and information (e.g. time series of channel information (e.g. 300, 111A, 111B)) associated with this disclosure.

CSI Ready Chip

This disclosure is also related to communication hardware that is capable of providing the channel information. The communication hardware may be a WiFi-capable chip (e.g. integrated circuit or IC), a next generation WiFi-capable chip, a LTE-capable chip, a 5G-capable chip, a 6G/7G/8G-capable chip, etc. The communication hardware computes the channel information (e.g. 111A, 111B) and stores the channel information (e.g. 111A, 111B) in a buffer memory (e.g. 102A, 102B) and make the channel information (e.g. 111A, 111B) available for extraction. The channel information (e.g. 111A, 111B) may comprise data and/or at least one matrices related to channel state information (e.g. CSI, 110A, 110B of FIG. 1). The at least one matrices may be used for channel equalization, and/or beam forming, etc.

Passive Speed Estimation

Another aspect of the disclosure is related to the estimation of one or more characteristics and/or spatial-temporal information (e.g. 144) of the object (e.g. 112) such as speed, acceleration, gait cycle, a gait, an object motion, and an event. More specifically, the present teaching is related to determining at least one characteristics and/or spatial-temporal information (e.g. 144) of the object (e.g. 112) based on time reversal technology in a rich scattering environment.

The event may be an object (e.g. 112) related event, such as fall-down of the object (e.g. 112) (e.g. an person and/or a sick person), a rotation, a hesitation, a pause, an impact (e.g. a person hitting a sandbag, a door, a window, a bed, a chair, a table, a desk, a cabinet, a box, another person, an animal, a bird, a fly, a table, a chair, a ball, a bowling ball, a tennis ball, a football, a soccer ball, a baseball, a basketball, a volley ball, etc.), a two-body action (e.g. a person letting go a balloon, catching a fish, molding a clay, writing a paper, a person typing on a computer, etc.), a car moving in a garage, a person carrying a smart phone and walking around an airport/mall/government building/office/etc., an autonomous moveable object/machine moving around (e.g. vacuum cleaner, utility vehicle, a car, drone, self-driving car, etc.).

A threshold (e.g. first threshold, second threshold, etc.) to be applied to a test statistics to differentiate two events (or two conditions, or two situations, or two states), A and B, may be determined. Data (e.g. channel information (e.g. 111A, 111B), channel state information (CSI, e.g. 110A, 110B of FIG. 1)) may be collected under A and/or under B in a training situation. The test statistics may be computed based on the data. Distributions of the test statistics under A may be compared with distributions of the test statistics under B, and the threshold may be chosen according to some criteria. The criteria may comprise: maximum likelihood (ML), maximum aposterior probability (MAP), discriminative training, minimum type 1 error for a given type 2 error, minimum type 2 error for a given type 1 error, and/or other criteria. The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, occasionally, sporadically, and/or on demand. The threshold adjustment may be adaptive. The threshold adjustment may depend on the object (e.g. 112), an object movement (e.g. 118, 120)/location (e.g. 114, 115A, 117, 119)/direction (e.g. 123)/action, an object characteristics/spatial-temporal information/size/property/trait/habit/behavior, the venue (e.g. 142), a feature/fixture/furniture/barrier/material/machine/living thing/thing/object/boundary/surface/medium that is in/at/of the venue (e.g. 142), a map, a constraint of the map, the event/state/situation/condition, a time, a timing, a duration, a current state, a past history, a user, and/or a personal preference, etc.

The characteristics and/or spatial-temporal information (e.g. 146) may be position (e.g. initial position 114, new position 115B, position 115A, 117, 119, 406, 408, 410), speed, acceleration, angle of motion, direction of motion (e.g. 123), rotation, deformation, transformation, shrinking, expanding, another spatial-temporal characteristics, and/or another characteristics, etc. The object (e.g. 112) may have multiple parts, each part with different movement. For example, the object (e.g. 112) may be a person walking forward. While walking, his left hand and right hand may move in different direction, with different instantaneous speed, acceleration, motion, etc.

In one example, a system, apparatus and/or method for determining at least one characteristics and/or spatial-temporal information (e.g. characteristics 146) of an object (e.g. object (e.g. 112)) associated with a movement of the object (e.g. 112) (e.g. current movement 120, and/or prior movement (e.g. 118)) comprises obtaining one or more time series of channel information (CI) (e.g. channel information 111A and/or 111B) of a wireless multipath channel (e.g. wireless multipath channel 144) using a processor (e.g. processor 100A, and/or 100B), a memory (e.g. memory 102A, and/or 102B) communicatively coupled with the processor (e.g. 100A, and/or 100B) and a set of instructions (e.g. set of instructions 104A, and/or 104B) stored in the memory (e.g. 102A, and/or 102B). The at least one time series of channel information (e.g. channel information 111A, and/or 111B, or channel state information 110A and/or 110B) is obtained from a wireless signal (e.g. wireless signal 140) sent through the wireless multipath channel (e.g. 144). The wireless multipath channel (e.g. 144) is impacted by the movement (e.g. 120) of the object (e.g. 112). The system, apparats and/or method further comprises determining the one or more characteristics and/or spatial-temporal information (e.g. 146) of the object (e.g. 112) associated with the movement (e.g. 120) of the object (e.g. 112) based on the one or more time series of channel information (e.g. 110A, 110B, 111A, and/or 111B).

The channel information (e.g. 111A and/or 111B) may be obtained from a WiFi-enabled chip, an LTE-enabled chip, a Bluetooth-enabled chip, a BLE-enabled (Bluetooth-Low-Energy enabled) chip, and another chip enabled for wireless communication using the wireless signal (e.g. 140) (e.g. Zigbee, WiMax, 3G/4G/5G/6G/7G/8G, etc.).

The channel information (e.g. 111A and/or 111B) may include channel state information (CSI) (e.g. 110A and/or 110B) of the wireless multipath channel (e.g. 144).

Each CSI of the wireless multipath channel (e.g. 144) may be associated with a time. Each CSI may include time domain element, frequency domain element, and/or time-frequency domain element. Each CSI may contain one or more elements. Each element of the CSI may be a real quantity, an imaginary quantity, a complex quantity, a magnitude, a phase, a flag, and/or a set.

Each channel information (e.g. 111A, 111B) (CI) may include a vector of complex numbers, a matrix of complex numbers, a set of mixed quantities, and/or a multi-dimensional collection of at least one complex numbers.

One or more time series of power information may be computed based on the one or more time series of channel information (e.g. 300, 111A, 111B) of the wireless multipath channel (e.g. 144). Each power information may be associated with a channel information (e.g. 111A, 111B) of the wireless multipath channel (e.g. 144). Both the power information and the channel information (e.g. 111A, 111B) may be associated with a time. The vector of the channel information (e.g. 111A, 111B) and the vector of the power information may have the same number of elements. Each real element of the power information vector may be computed based on respective magnitude, phase, real part, imaginary part and/or another function of corresponding complex element of the channel information (e.g. 111A, 111B). In particular, the real element of the power information vector may be based on square of magnitude of corresponding complex element of the channel info (e.g. 111A/B).

A particular function may be determined based on a first time, a time offset, a first window of power information and a second window of power information. Although power information is mentioned here, the particular function may be applied to channel information (e.g. 111A, 111B) and/or other information. The first window of power information may be a first subset of a particular time series of power information associated with the first time. The second window of power information may be a second subset of the particular time series of power information associated with a second time which is at the time offset from the first time. The first window and the second window may be of the same size. The second window is at the time offset from the first window. The first window and the second window may both be windows of the same particular time series of power information (and/or or channel information (e.g. 111A, 111B), and/or other information). The cardinality of the first subset may be equal to the cardinality of the second subset.

The particular function may be computed for at least one value of the first time and for at least one value of the time offset for each of the first time. The one or more characteristics and/or spatial-temporal information of the object (e.g. 112) associated with the movement of the object (e.g. 112) may be determined based on the articular function computed for the at least one value of time offset. A particular value of the first time may be associated with the movement of the object (e.g. 112) and the at least one characteristics and/or spatial-temporal information of the object (e.g. 112).

The particular function may be a second function of at least one of: a covariance function, a covariance-like function, an auto-covariance function, an auto-covariance-like function, a correlation function, a correlation-like function, an auto-correlation function, an auto-correlation-like function, an inner product, another function, a combination of any of these functions with a preprocessing function, a combination of any of these functions with a post-processing function, and a combination of any of these functions with at least one of: frequency decomposition, time decomposition, time-frequency decomposition, and another decomposition.

The second function may be at least one of: de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function, and a third function.

The particular function may be an estimate of a weighted sum of square of autocorrelation function (ACF) of electric field components of the received electromagnetic (EM) wave of the wireless signal (e.g. 140).

The power information may include a frequency decomposition, time decomposition, time-frequency decomposition, and/or another decomposition. Another function may be determined based on a frequency of the frequency decomposition (or a variable/index of other decompositions), the first time, the time offset, the first window of power information and the second window of power information. The another function may be computed for at least one value of the frequency of the frequency decomposition. The particular function may be computed by averaging the another function computed for the at least one value of the frequency of the frequency decomposition.

In another example, the power information may include a frequency subband decomposition. Another function is determined based on a frequency subband of the frequency decomposition, the first time, the time offset, the first window of power information and the second window of power information. The another function may be computed for at least one instance of the frequency subband of the frequency decomposition. The particular function may be computed by averaging the another function computed for the at least one instance of the frequency subband of the frequency decomposition.

In another example, the power information may comprise a time-frequency decomposition. Another function may be determined based on a time-frequency partition of the time-frequency decomposition, the first time, the time offset, the first window of power information and the second window of power information. The another function may be computed for at least one instance of the time-frequency partition of the time-frequency decomposition. The particular function may be computed by averaging the another function computed for the at least one instance of the time-frequency partition of the time-frequency decomposition.

The computing of the particular function may comprise determining a preliminary function based on the first time, a third time, the time offset, a third window of power information and a fourth window of power information. The third window of power information may be a third subset of the particular time series of power information associated with the third time. The fourth window of power information may be a fourth subset of the particular time series of power information associated with a fourth time at the time offset from the third time. The preliminary function may be computed for a particular value of the first time and a particular value of the time offset for at least one value of the third time close to the first time. The particular function for the particular value of the first time and the particular value of the time offset may be computed by averaging the preliminary function for the particular value of the first time and the particular value of the time offset computed for the at least one value of the third time close to the first time.

At least one special characteristics and/or special spatial-temporal info (e.g. local maximum, local minimum, zero crossing, etc.) may be determined/computed for a particular value of the first time. At least one particular value of the time offset each associated with a respective special characteristics and/or spatial-temporal information (e.g. local maximum, local minimum, zero crossing, etc.) of the particular function for the particular value of the first time may be identified. The at least one special characteristics and/or special spatial-temporal info of the object (e.g. 112) associated with the movement of the object (e.g. 112) may be determined based on the at least one particular value of the time offset.

The at least one special characteristics and/or special spatial-temporal information of the particular function for the particular value of the first time may include: a local maximum, a local maximum with positive time offset, a first local maximum with positive time offset, a local maximum with negative time offset, a first local maximum with negative time offset, a local minimum, a local minimum with positive time offset, a first local minimum with positive time offset, a local minimum with negative time offset, a first local minimum with negative time offset, a local extremum, a local extremum with positive time offset, a first local extremum with positive time offset, a local extremum with negative time offset, a first local extremum with negative time offset, a zero crossing, a zero crossing with positive time offset, a first zero crossing with positive time offset, a zero crossing with negative time offset, a first zero crossing with negative time offset, a local maximum slope, a local maximum slope with positive time offset, a first local maximum slope with positive time offset, a local maximum slope with negative time offset, a first local maximum slope with negative time offset, a local minimum slope, a local minimum slope with positive time offset, a first local minimum slope with positive time offset, a local minimum slope with negative time offset, a first local minimum slope with negative time offset, a local maximum second order derivative, a local minimum second order derivative, a local maximum higher order derivative, a local minimum higher order derivative, a zero crossing, a zero crossing of slope, a zero crossing of second order derivative, a zero crossing of higher order derivative, and/or another characteristics and/or spatial-temporal information.

There may be a search for a local extremum of the particular function for a particular value of the first time. The search may comprise the following operations. (1) A current time offset value may be initialized. This is followed by a recursion. (2) In each iteration of the recursion, a regression window around the current time offset value may be determined. (3) The particular function within the regression window around the current time offset value may be approximated with/by a regression function using regression analysis. (4) Regression error of the regression function with respect to the particular function may be determined. (5) The current time offset value may be updated based on convexity of the regression function, another characteristics and/or spatial-temporal information of the regression function, and/or regression error of the regression function with respect to the particular function in the regression window. (6) Performing the iteration of the recursion until at least one stopping criterion is satisfied.

The local extremum of the particular function may be determined for the particular value of the first time based on the corresponding extremum of the regression function in the regression window. A particular value of the time offset associated with the local extremum of the particular function may be identified in the regression window. At least one characteristics and/or spatial-temporal information of the object (e.g. 112) associated with the movement of the object (e.g. 112) may be computed based on the particular value of the time offset.

The local extremum may be at least one of: a local maximum, a local maximum with positive time offset, a first local maximum with positive time offset, a local maximum with negative time offset, a first local maximum with negative time offset, a local minimum, a local minimum with positive time offset, a first local minimum with positive time offset, a local minimum with negative time offset, a first local minimum with negative time offset, a local maximum slope, a local maximum slope with positive time offset, a first local maximum slope with positive time offset, a local maximum slope with negative time offset, a first local maximum slope with negative time offset, a local minimum slope, a local minimum slope with positive time offset, a first local minimum slope with positive time offset, a local minimum slope with negative time offset, a first local minimum slope with negative time offset, a local maximum second order derivative, a local minimum second order derivative, a local maximum higher order derivative, and/or a local minimum higher order derivative.

The initial current time offset value may be positive, negative and/or zero. In at least one iteration, a length of the regression window and/or a location of the regression window may change. The regression function may be a linear function, a quadratic function, a cubic function, a polynomial function, and/or another function.

The regression analysis may minimize an absolute error, a square error, a higher order error (e.g. third order, fourth order, etc.), a robust error (e.g. square error for smaller error magnitude and absolute error for larger error magnitude, or a first kind of error for smaller error magnitude and a second kind of error for larger error magnitude), another error, a weighted sum of absolute error (e.g. for a wireless transmitter (e.g. 108) with multiple antennas (e.g. 200A, 200B, 200C, 200D, 200E, 200F) and a wireless receiver (e.g. 109) with multiple antennas (e.g. 200A, 200B, 200C, 200D, 200E, 200F), each pair of transmitter antenna (e.g. 200A, 200B, 200C) and receiver antenna (e.g. 200D, 200E, 200F) form a link. Error associated with different links may have different weights. One possibility is that some links and/or some components with larger noise may have smaller or bigger weight.), a weighted sum of square error, a weighted sum of higher order error, a weighted sum of robust error, a weighted sum of the another error, an absolute cost, a square cost, a higher order cost, a robust cost, another cost, a weighted sum of absolute cost, a weighted sum of square cost, a weighted sum of higher order cost, a weighted sum of robust cost, and/or a weighted sum of another cost.

The regression error determined may be an absolute error, a square error, a higher order error, a robust error, yet another error, a weighted sum of absolute error, a weighted sum of square error, a weighted sum of higher order error, a weighted sum of robust error, and/or a weighted sum of the yet another error.

The time offset associated with maximum regression error of the regression function with respect to the particular function in the regression window may become the updated current time offset in the iteration.

In one example, if the regression function is locally convex in the regression window, time offset associated with maximum regression error of the regression function with respect to the particular function in the regression window may become the updated current time offset.

In another example, if the regression function is locally concave in the regression window, time offset associated with maximum regression error of the regression function with respect to the particular function in the regression window may become the updated current time offset.

If the regression function is locally convex in the regression window, at least one of time offsets associated with two ends of the regression window may become the updated current time offset.

If the regression function is locally concave in the regression window, at least one of time offsets associated with two ends of the regression window may become the updated current time offset.

At least one of time offsets associated with two ends of the regression window may become the updated current time offset based on the local convexity of the regression function in the regression window. If the regression is locally convex in part of the window and locally concave in another part of the window, the window size may be reduced.

The local extremum may be searched based on a quantity comprising a difference of two different errors (e.g. a difference between absolute error and square error). The two different errors may comprise an absolute error, a square error, a higher order error, a robust error, another error, a weighted sum of absolute error, a weighted sum of square error, a weighted sum of higher order error, a weighted sum of robust error, and/or a weighted sum of the another error.

Each of the first error and the second error of the two different errors may be an absolute error, a square error, a higher order error, a robust error, another error, a weighted sum of absolute error, a weighted sum of square error, a weighted sum of higher order error, a weighted sum of robust error, and/or a weighted sum of the another error. The second of the two different errors may be an absolute error, a square error, a higher order error, a robust error, another error, a weighted sum of absolute error, a weighted sum of square error, a weighted sum of higher order error, a weighted sum of robust error, and/or a weighted sum of the another error.

The local extremum may be searched based on a quantity comprising a difference of a first error and a second error. The quantity may be compared with an F-distribution, a central F-distribution, another statistical distribution, a threshold, a threshold associated with a probability, a threshold associated with a probability of finding a false peak, a threshold associated with the F-distribution, a threshold associated the central F-distribution, and/or a threshold associated with the another statistical distribution.

The regression window may be determined based on at least one of: the movement of the object (e.g. 112), a quantity associated with the object (e.g. 112), the at least one characteristics and/or spatial-temporal information of the object (e.g. 112) associated with the movement of the object (e.g. 112), an estimated location of the local extremum, a noise characteristics, an estimated noise characteristics, an F-distribution, a central F-distribution, another statistical distribution, a threshold, a preset threshold, a threshold associated with a probability, a threshold associated with a desired probability, a threshold associated with a probability of finding a false peak, a threshold associated with the F-distribution, a threshold associated the central F-distribution, a threshold associated with the another statistical distribution, a condition that a quantity at the window center is largest within the regression window, a condition that the quantity at the window center is largest within the regression window, a condition that there is only one of the local extremum of the particular function for the particular value of the first time in the regression window, another regression window, and/or another condition.

A time offset near time offset associated with maximum regression error of the regression function with respect to the particular function in the regression window may become the updated current time offset based on a condition.

A stopping criterion may be that change of current offset value in the updating in an iteration is less than a threshold. The threshold may be 0.5, 1, 1.5, 2, or another number. The threshold may be adaptive. It may change as the iteration progresses. The adaptive threshold may be determined based on the particular value of the first time, the current time offset value, the regression window, the regression analysis, the regression function, the regression error, the convexity of the regression function, and/or an iteration number.

A stopping criterion may be adaptive determined based on the particular value of the first time, the current time offset value, the regression window, the regression analysis, the regression function, the regression error, the convexity of the regression function, and/or an iteration number. A stopping criterion may be that change of current time offset value is less than a threshold. The threshold may be 1, 2, 3, or other number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The particular function may comprise de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function.

The searching for a local extremum may comprise a robust search, a minimization, a maximization, an optimization, a statistical optimization, a dual optimization, a constraint optimization, a convex optimization, a global optimization, a local optimization an energy minimization, a linear regression, a quadratic regression, a higher order regression, a linear programming, a nonlinear programming, a stochastic programming, a combinatorial optimization, a constraint programming, a constraint satisfaction, a calculus of variations, an optimal control, a dynamic programming, a mathematical programming, a multi-objective optimization, a multi-modal optimization, a disjunctive programming, a space mapping, an infinite-dimensional optimization, a heuristics, a metaheuristics, a convex programming, a semidefinite programming, a conic programming, a cone programming, an integer programming, a quadratic programming, a fractional programming, a numerical analysis, a simplex algorithm, an iterative method, a gradient descent, a subgradient method, a coordinate descent, a conjugate gradient method, a Newton's algorithm, a sequential quadratic programming, an interior point method, an ellipsoid method, a reduced gradient method, a quasi-Newton method, a simultaneous perturbation stochastic approximation, an interpolation method, a pattern search method, a line search, a non-differentiable optimization, a genetic algorithm, an evolutionary algorithm, a dynamic relaxation, a hill climbing, a particle swarm optimization, a gravitation search algorithm, a simulated annealing, a memetic algorithm, a differential evolution, a dynamic relaxation, a stochastic tunneling, a Tabu search, a reactive search optimization, a curve fitting, a least square, a simulation based optimization, a variational calculus, and/or a variant. The search for a local extremum may be associated with an objective function, a loss function, a cost function, a utility function, a fitness function, an energy function, and/or an energy function.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

The current time offset value may be initialized based on a target value, a target profile, a trend, a past trend, a current trend, a target speed, a speed profile, a target speed profile, a past speed trend, the movement of the object (e.g. 112), at least one characteristics and/or spatial-temporal information of the object (e.g. 112) associated with the movement of object (e.g. 112), a positional quantity of the object (e.g. 112), an initial speed of the object (e.g. 112) associated with the movement of the object (e.g. 112), a predefined value, an initial width of the regression window, a time duration, a value based on a carrier frequency of the wireless signal (e.g. 140), a bandwidth of the wireless signal (e.g. 140), an amount of antennas (e.g. 200A, 200B, 200C, 200D, 200E, 200F) associated with the wireless multipath channel (e.g. 144), a noise characteristics, and/or an adaptive value. The current time offset may be at the center, on the left side, on the right side, and/or at another fixed relative location, of the regression window.

One of the at least one characteristics and/or spatial-temporal information of the object (e.g. 112) associated with the movement of the object (e.g. 112) may be speed of the object (e.g. 112). The speed of the object (e.g. 112) may be computed based on the particular value of time offset associated with the local extremum of the particular function for a particular value of the first time in the regression window.

The speed of the object (e.g. 112) at a time may be computed based on the particular value of time offset associated with the local extremum of the particular function for a particular value of the first time in the regression window. The particular value of the first time may be equal to the time.

An acceleration of the object (e.g. 112) at a particular time may be determined based on at least one value of the speed of the object (e.g. 112) each at a time close to the particular time. The acceleration of the object (e.g. 112) at the particular time may be one of the at least one characteristics and/or spatial-temporal information of the object (e.g. 112) associated with the movement of the object (e.g. 112).

An acceleration of the object (e.g. 112) at a particular time may be determined based on at least one value of the speed of the object (e.g. 112) at one or more time each close to the particular time. The determination of the acceleration of the object (e.g. 112) at the particular time may comprise: approximating the speed of the object (e.g. 112) at the one or more time by a time function, determining one or more slopes of the time function close to the particular time, and computing the acceleration based on the one or more slopes of the time function.

The time function may be a continuous function, a continuous differentiable function, a linear function, a piecewise linear function, a quadratic function, a piecewise quadratic function, a polynomial, a piecewise continuous polynomial, a piecewise continuous differentiable polynomial, a regression function, an auto-regressive function, an adaptive function, a time adaptive function, a time-frequency function, another function, an optimized function, a constrained optimized function, an unconstrained optimized function, a low-pass filtered function of the speed, a bandpass filtered function of the speed, a high-pass filtered function of the speed, and/or another filtered function of the speed. The time function may be obtained by an optimization of a cost function associated with the speed of the object (e.g. 112). The optimization may be constrained and/or unconstrained.

The acceleration may be computed as a function of the one or more slopes of the time function. The function may be an average, a weighted average, a median, a mode, a quartile, a percentile, a robust function, a linear function, a nonlinear function, and/or another function.

One of the one or more slopes of the time function may be determined as a difference between two values of the speed of the object (e.g. 112) at two adjacent times divided by a difference of the two adjacent time values.

The time function may be a piecewise linear function. The acceleration may be computed as a slope of the piecewise linear function at the particular time. The one or more time may be within a time window around the particular time. The one or more time may comprise a time window around the particular time.

The acceleration of the object (e.g. 112) may be the acceleration of the object (e.g. 112) associated with the movement of the object (e.g. 112) at the particular time.

An acceleration of the object (e.g. 112) at a particular time may be determined based on a speed of the object (e.g. 112) computed at multiple values of time close to the particular time. The speed of the object (e.g. 112) may be one of the at least one characteristics and/or spatial-temporal information of the object (e.g. 112) associated with the movement of the object (e.g. 112) determined based on the at least one time series of channel information (e.g. 300, 111A, 111B).

The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time.

The speed of the object (e.g. 112) may also be one of the at least one characteristics and/or spatial-temporal information of the object (e.g. 112) associated with the movement of the object (e.g. 112) determined based on the time offset associated with the local extremum of the particular function for the particular value of the first time in the regression window, the particular value of the first time being equal to the time.

The speed of the object (e.g. 112) at the particular value of the first time may be computed as a quantity divided by the particular value of time offset associated with the local extremum of the particular function in the regression window.

In another example, one of the at least one characteristics and/or spatial-temporal information may be speed of the object (e.g. 112). The speed of the object (e.g. 112) at the first time may be computed based on the particular value of time offset associated with the local extremum of the particular function in the regression window. The local extremum may be the first local maximum with positive time offset, and/or the first local maximum with negative time offset. The particular function may be a derivative of a characteristic auto-correlation function with respect to the time offset. The channel information (e.g. 111A, 111B) may be CSI associated with a frequency decomposition. Each CSI may be a vector of complex components each corresponding to a frequency of the frequency decomposition. Component-wise auto-correlation function may be computed for each frequency of the frequency decomposition based on the particular time series of CSI. The characteristic auto-correlation may be computed as average of the component-wise auto-correlation function over the frequency of the frequency decomposition.

The iteration may be applied at least one time to obtain at least one extremum. Each extremum may be associated with a respective current time offset value, a respective regression window, a respective regression function, and/or a respective particular time offset value in the respective iteration. The at least one characteristics and/or spatial-temporal information of the object (e.g. 112) associated with the movement of the object (e.g. 112) may be computed based on at least one of the respective particular time offset value of the particular function in the regression window.

The iteration may be applied two times to obtain a first local extremum and a second local extremum. The first local extremum may be associated with a first current time offset value, a first regression window, a first regression function, and/or a first particular time offset value. The second local extremum may be associated with a second current time offset value, a second regression window, a second regression function, and/or a second particular time offset value. The at least one characteristics and/or spatial-temporal information of the object (e.g. 112) associated with the movement of the object (e.g. 112) may be computed based on the first particular time offset value and/or the second particular time offset value of the particular function in the regression window.

The iteration may be applied two times to obtain a first local extremum which is first local maximum with positive time offset, and a second local extremum which is first local maximum with negative time offset. The first local extremum may be associated with a first current time offset value, a first regression window, a first regression function, and/or a first particular time offset value. The second local extremum may be associated with a second current time offset value, a second regression window, a second regression function, and/or a second particular time offset value. The at least one characteristics and/or spatial-temporal information of the object (e.g. 112) associated with the movement of the object (e.g. 112) may be computed based on the first particular time offset value and/or the second particular time offset value, of the particular function in the regression window.

A gait cycle of the object (e.g. 112) may be determined based on at least one value of the speed of the object (e.g. 112), and/or at least one value of acceleration of the object (e.g. 112).

At least one gait cycle of the object (e.g. 112) may also be determined based on at least one value of the speed of the object (e.g. 112) and/or at least one value of the acceleration of the object (e.g. 112). The at least one gait cycle may be determined by detecting a succession of a period of positive acceleration and a period of negative acceleration. The at least one gait cycle may be determined by detecting a succession of a period of increasing speed and a period of decreasing speed.

The at least one gait cycle may be determined by detecting a succession of a period of positive speed and a period of negative speed. The at least one gait cycle may be determined by detecting an underlying periodic behavior of the speed of the object (e.g. 112), a speed change of the object (e.g. 112), and/or the acceleration of the object (e.g. 112), with an associated time period.

The at least one gait cycle may be determined by detecting an underlying periodic behavior of local maximum speed of the object (e.g. 112), local minimum speed of the object (e.g. 112), local maximum acceleration of the object (e.g. 112), local minimum acceleration of the object (e.g. 112), local maximum speed change of the object (e.g. 112), and/or local minimum speed change of the object (e.g. 112), with an associated time period.

The at least one gait cycle may be determined to be associated with a time period. A function of the speed of the object (e.g. 112) and/or the acceleration of the object (e.g. 112) may exhibit a local maximum at a location associated with the time period.

The at least one gait cycle may be determined to be associated with a time period. A function of the speed of the object (e.g. 112) and/or the acceleration of the object (e.g. 112) may be determined to exhibit peak localization with multiple pairs of local maximum and local minimum with associated multiple pairs of peak location associated with the time period.

The time period may be determined based on a distance between at least one of: two adjacent local maximum, two adjacent local minimum, a pair of adjacent local maximum and local minimum, two local maximums separated by a predetermined number of maximums, two local minimums separated by a predetermined number of minimums, and a pair of local maximum and local minimum separated by a predetermined number of extremum, of the function.

The function may comprise an auto-correlation function, an auto-correlation like function, an auto-covariance function, an auto-covariance like function, a product of the speed and a shifted version of the acceleration, a product of the speed and a shifted version of a periodic function with known period, a product of the acceleration and the shifted version of the periodic function with known period, an optimization of a cost function, a constrained optimization of the cost function, a unconstrained optimization of the cost function, a Fourier transform, a Laplace transform, another transform, and/or another function.

At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the at least one time series of channel information (e.g. 300, 111A, 111B). The acceleration of the object (e.g. 112) may be determined based on the speed of the object (e.g. 112).

At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time. The acceleration of the object (e.g. 112) may be determined based on the speed of the object (e.g. 112).

At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the time offset associated with the local extremum of the particular function for the particular value of the first time in the regression window, the particular value of the first time being equal to the time. The acceleration of the object (e.g. 112) may be determined based on the speed of the object (e.g. 112).

A gait of the object (e.g. 112) and/or an event may be detected based on at least one of: at least one segment of a time series of channel information (e.g. 300, 111A, 111B), at least one segment of a time series of channel state information (CSI, e.g. 110A, 110B of FIG. 1), at least one value of the particular function, at least one value of the speed of the object (e.g. 112), and/or at least one value of an acceleration of the object (e.g. 112) each based on at least one value of the speed of the object (e.g. 112).

The gait of the object (e.g. 112) and/or the event may be detected based on a time trend of at least one of: the channel information (e.g. 111A, 111B), the channel state information (CSI, e.g. 110A, 110B of FIG. 1), the particular function, the speed of the object (e.g. 112), and/or the acceleration of the object (e.g. 112).

The detection of the gait of the object (e.g. 112) and/or the event may comprise determining the gait of the object (e.g. 112) and/or the event, using an engine based on the time trend of the speed of the object (e.g. 112). Input to the engine may comprise at least one of: at least one segment of a time series of channel information (e.g. 300, 111A, 111B), at least one segment of a time series of channel state information (CSI, e.g. 110A, 110B of FIG. 1), at least one value of the particular function, at least one value of the speed of the object (e.g. 112), at least one value of an acceleration of the object (e.g. 112). The engine may be a neural network and/or a classification engine.

The engine may be trained in a training phase with training input to generate at least one reference time trend associated with known gait of the object (e.g. 112) and known event. The training input of the engine may be associated with the known gait of the object (e.g. 112) and the known event. The training may be at least one of: discriminative training, decision feedback training, machine learning, supervised learning, unsupervised learning, shallow learn, deep learning, and/or another training.

The determination of the gait of the object (e.g. 112) and/or the event using the engine may comprise: obtaining the time trend, comparing the time trend with each of the reference time trend, and aligning the time trend of a first duration with each of the at least one reference time trend of heterogeneous duration. It may further comprise computing at least one similarity score each between the time trend and respective aligned reference time trend, and/or determining the gait of the object (e.g. 112) and/or the event as one of the known gaits of the object (e.g. 112) and/or one of the known events, based on the at least one similarity score.

The speed of the object (e.g. 112) may be one of the at least one characteristics and/or spatial-temporal information of the object (e.g. 112) associated with the movement of the object (e.g. 112) determined based on the at least one time series of channel information (e.g. 300, 111A, 111B).

The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time.

At least one threshold may be determined. The at least one characteristics and/or spatial-temporal information of the object (e.g. 112) may be determined based on the at least one threshold.

The at least one threshold may be determined based on at least one time series of training channel information (e.g. 111A, 111B) (CI) of the wireless multipath channel (e.g. 144) using a second processor (e.g. 100A, 100B), a second memory (e.g. 102A, 102B) communicatively coupled with the second processor (e.g. 100A, 100B) and a second set of instructions (e.g. 104A, 104B) stored in the second memory (e.g. 102A, 102B). The second processor (e.g. 100A, 100B) may be the first processor (e.g. 100A, 100B), part of the first processor (e.g. 100A, 100B), and/or connected with the first processor (e.g. 100A, 100B). Some resources (hardware, network, communication, user-interface, and/or software) of the second processor (e.g. 100A, 100B) may be shared with the first processor (e.g. 100A, 100B). The second memory (e.g. 102A, 102B) may be the first memory (e.g. 102A, 102B), part of the first memory (e.g. 102A, 102B), connected to the first memory (e.g. 102A, 102B), and/or shared with the first memory (e.g. 102A, 102B). The second set of instructions (e.g. 104A, 104B) may be the first set of instructions (e.g. 104A, 104B), and/or part of the first set of instructions (e.g. 104A, 104B). The second set of instructions (e.g. 104A, 104B) and the first set of instructions (e.g.

104A, 104B) may share some software library, some software routine, some hardware resources, some communication resources and/or other resource. The second set of instructions (e.g. 104A, 104B) and the first set of instructions (e.g. 104A, 104B) may work independently, cooperatively, jointly, sequentially, in parallel, alternately, and/or interactively.

The at least one time series of training channel information (e.g. 111A, 111B) (CI) of the wireless multipath channel (e.g. 144) may be obtained from a second wireless signal (e.g. 140) sent through the wireless multipath channel (e.g. 144) in a training phase. The wireless multipath channel (e.g. 144) may be impacted by a training movement of a second object in the training phase. The training phase may be a training session, which may be carried out once, occasionally, regularly, and/or on demand.

At least one time series of first training channel information (e.g. 111A, 111B) of the wireless multipath channel (e.g. 144) associated with a target positive training movement of the second object in the training phase may be obtained. The positive training movement may be a target movement to be recognized, monitored, measured, studied, processed, detected, estimated, verified, and/or captured.

At least one time series of second training channel information (e.g. 111A, 111B) of the wireless multipath channel (e.g. 144) associated with a target negative training movement of the second object in the training phase may be obtained. The negative training movement may be a target movement to be ignored, missed, not monitored, not detected, not estimated, not recognized, not verified, not captured, not measured, and/or not studied.

At least one first quantity from the at least one time series of first training channel information (e.g. 111A, 111B) and/or at least one second quantity from the at least one time series of second training channel information (e.g. 111A, 111B) may be computed. The at least one first quantity and/or the at least one second quantity may comprise a motion statistics, a location statistics, a map coordinate statistics, a height statistics, a speed statistics, an acceleration statistics, a movement angle statistics, a rotation statistics, a size statistics, a volume statistics, a time trend, a time trend statistics, a time profile statistics, a periodic motion statistics, a frequency statistics, a transient statistics, a breathing statistics, a gait statistics, an action statistics, an event statistics, a suspicious event statistics, a dangerous event statistics, an alarming event statistics, a warning statistics, a belief statistics, a proximity statistics, a collision statistics, a power statistics, a signal statistics, a signal power statistics, a signal strength statistics, a received signal strength indicator (RSSI), a signal amplitude, a signal phase, a signal frequency component, a signal frequency band component, a channel state information (CSI, e.g. 110A, 110B of FIG. 1) (CSI), a CSI statistics, a map statistics, a time statistics, a frequency statistics, a time-frequency statistics, a decomposition statistics, a orthogonal decomposition statistics, a non-orthogonal decomposition statistics, a tracking statistics, a breathing statistics, a heart beat statistics, a biometric statistics, a baby statistics, a patient statistics, a machine statistics, a device statistics, a temperature statistics, a vehicle statistics, a parking lot statistics, a venue statistics, a lift statistics, an elevator statistics, a spatial statistics, a road statistics, a fluid flow statistics, a home statistics, a room statistics, an office statistics, a house statistics, a building statistics, a warehouse statistics, a storage statistics, a system statistics, a ventilation statistics, a fan statistics, a pipe statistics, a duct statistics, a people statistics, a human statistics, a car statistics, a boat statistics, a truck statistics, an airplane statistics, a drone statistics, a downtown statistics, a crowd statistics, an impulsive event statistics, a cyclo-stationary statistics, an environment statistics, a vibration statistics, a material statistics, a surface statistics, a 3-dimensional statistics, a 2-dimensional statistics, a local statistics, a global statistics, a presence statistics, and/or another statistics.

The at least one threshold may be determined based on the at least one first quantity and/or the at least one second quantity. The at least one threshold may be determined such that a first percentage of the first quantity is larger than, equal to and/or less than a first threshold (not the at least one threshold). The at least one threshold may be determined such that a second percentage of the second quantity is larger than, equal to and/or less than a second threshold (not the at least one threshold).

The first threshold may be greater than, equal to and/or less than the second threshold. The first threshold may be the second threshold. The first percentage may be greater than, equal to and/or less than the second percentage.

The at least one time series of first training channel information (e.g. 111A, 111B) of the wireless multipath channel (e.g. 144) may be associated with a training movement of the second object inside a monitored area in the training phase. The target positive training movement of the second object may be the training movement of the second object inside the monitored area.

The at least one time series of second training channel information (e.g. 111A, 111B) of the wireless multipath channel (e.g. 144) may be associated with a training movement of the second object outside the monitored area in the training phase. The target negative training movement of the second object may be the training movement of the second object outside the monitored area.

The second object may be the first object. The second object may be an imitation, a replacement, a backup, and/or a replica of the first object. The second object may be another object similar to the first object. The second object may be similar to the first object in terms of structure, size, shape, functionality, periodicity, deformation characteristics, motion characteristics, speed, acceleration, gait, trend, habit, wireless properties, and other characteristics.

Handover Technology

This disclosure is also about wireless sensing handover. A system, apparatus and/or method of wireless sensing handover comprises a Type 1 heterogeneous wireless transceiver capable of wirelessly coupling with at least one Type 2 heterogeneous wireless transceiver through a wireless multipath channel (e.g. 144) associated with a venue (e.g. 142), and/or at least one Type 2 heterogeneous wireless transceiver each at respective location of the venue (e.g. 142). It (i.e. the system, apparatus and/or method) further comprises a processor (e.g. 100A, 100B), a memory (e.g. 102A, 102B) communicatively coupled with the processor (e.g. 100A, 100B), and/or a set of instructions (e.g. 104A, 104B) stored in the memory (e.g. 102A, 102B) which when executed cause the processor (e.g. 100A, 100B) to do the following. It causes the Type 1 transceiver to establish a wireless connection with a first Type 2 transceiver at a first location of the venue (e.g. 142) through the wireless multipath channel (e.g. 144) associated with the venue (e.g. 142). The wireless multipath channel (e.g. 144) is impacted by an object in the venue (e.g. 142).

It (i.e. the system, apparatus and/or method) further causes the Type 1 transceiver to transmit a first wireless signal (e.g. 140) to the first Type 2 transceiver, and/or to receive a second wireless signal (e.g. 140) from the first Type 2 transceiver. It extracts at least one first channel information (e.g. 111A, 111B) from the first wireless signal (e.g. 140) and/or the second wireless signal (e.g. 140). It performs a wireless smart sensing task associated with an object in the venue (e.g. 142) based on the at least one first channel information (e.g. 111A, 111B). It further causes the Type 1 transceiver to switch the wireless connection from the first Type 2 transceiver to a second Type 2 transceiver at a second location of the venue (e.g. 142) based on the at least one first channel information (e.g. 111A, 111B). It causes the Type 1 transceiver to transmit a third wireless signal (e.g. 140) to the second Type 2 transceiver, and/or to receive the fourth wireless signal (e.g. 140) from the second Type 2 transceiver. It extracts at least one second channel information (e.g. 111A, 111B) from the third wireless sign and/or the fourth wireless signal (e.g. 140), and/or performs the wireless smart sensing task associated with the object (e.g. 112) in the venue (e.g. 142) based on the at least one second channel information (e.g. 111A, 111B).

A Type 1 transceiver may communicate wirelessly with multiple Type 2 transceivers which may be heterogeneous. A Type 2 transceiver may communicate wirelessly with multiple Type 1 transceivers, which may be heterogeneous.

The wireless multipath channel (e.g. 144) may be impacted by the object (e.g. 112) in the venue (e.g. 142), a presence of the object (e.g. 112), a position (e.g. 114, 115B, 115A, 117, 119, 406, 408, 410, 414) of the object (e.g. 112) in the venue (e.g. 142), a status of the object (e.g. 112), a movement of the object (e.g. 112), a change of the object (e.g. 112), a deformation of the object (e.g. 112), a speed of the object (e.g. 112), a characteristics of the object (e.g. 112) and/or a spatial-temporal information of the object (e.g. 112).

The venue (e.g. 142) may be an indoor space, an outdoor space, a mall, an airport, a train station, a bus terminal, a transportation hub, a shipping terminal, a government facility, a public facility, a school, a university, an entertainment facility, a recreational facility, a hospital, a seniors home, a community center, a stadium, a playground, a park, a field, a sports facility, a swimming facility, a track and/or field, a basketball court, a tennis court, a soccer stadium, a baseball stadium, a gymnasium, a hall, a garage, a shopping mart, a mall, a supermarket, a factory, a manufacturing facility, a parking facility, a construction site, a transportation facility, a highway, a road, a path, a park, an amusement park, a garden, a square, a plaza, a music hall, a bus, a train, a vehicle, a ship, a tram, a truck, a container, an airplane, a mining facility, a cave, a tunnel facility, an underground facility, a submersible, a valley, a forest, a wood, a terrain, a landscape, a den, a patio, a land, a floating facility, an underwater facility, an underway area, a downtown area, an over-air facility, a semi-open area, a closed area, a warehouse, a store, a distribution center, a storage facility, a container, a storage facility, a home, a house, an office, a workplace, a room, a hallway, a walkway, a lift, a well, a lift well, an escalator, an elevator, a sewage system, air ventilation system, a staircase, a gathering area, a duct, an air duct, a pipe, a tube, an enclosed structure, a semi-enclosed structure, an enclosed area, an area with at least one wall, an animal, a person, a blood vessel, a windpipe, a plant, a machine, an engine, a structure with wood, a structure with glass, a structure with metal, a structure with walls, a structure with doors, a structure with gaps, a structure with reflection service, a structure with fluid, and/or another object, an urban area with buildings, a suburban area with houses, and/or a metropolitan area.

The wireless coupling may be based on WiFi, WiMax, 3G/beyond 3G, 4G/beyond 4G, LTE, 5G, 6G, 7G, Bluetooth, Zigbee, a proprietary wireless system, and/or another wireless system.

The Type 1 heterogeneous wireless transceiver may support WiFi, WiMax, 3G/beyond 3G, 4G/beyond 4G, LTE, 5G, 6G, 7G, Bluetooth, Zigbee, a proprietary wireless system, and/or another wireless system. The at least one Type 2 heterogeneous wireless transceiver may use WiFi, WiMax, 3G/beyond 3G, 4G/beyond 4G, LTE, 5G, 6G, 7G, Bluetooth, Zigbee, a proprietary wireless system, and/or another wireless system.

A common wireless system and/or a common wireless channel may be shared by the Type 1 transceiver and/or the at least one Type 2 transceiver. The at least one Type 2 transceiver may transmit respective wireless signal (e.g. 140) contemporaneously using the common wireless system and/or the common wireless channel. The Type 1 transceiver may transmit a wireless signal (e.g. 140) to the at least one Type 2 transceiver using the common wireless system and/or the common wireless channel.

The processor (e.g. 100A, 100B), the memory (e.g. 102A, 102B) and/or the set of instructions (e.g. 104A, 104B) may be associated with the Type 1 heterogeneous wireless transceiver, one of the at least one Type 2 heterogeneous wireless transceiver, the object (e.g. 112), a device (e.g. 106A, 106B, 108, 109, 113A, 113B, 400, 402, 404) associated with the object (e.g. 112), another device (e.g. 106A, 106B, 108, 109, 113A, 113B, 400, 402, 404) associated with the venue (e.g. 142), a cloud server, and/or another server.

The object (e.g. 112) may be associated with a movement in the venue (e.g. 142). The object (e.g. 112) may be moving in the venue (e.g. 142). The wireless smart sensing task may be to track a characteristics and/or spatial-temporal information of the object (e.g. 112) in the venue (e.g. 142). The characteristics and/or spatial-temporal information of the object (e.g. 112) may comprise a presence of the object (e.g. 112), an identity of the object (e.g. 112), a composition of the object (e.g. 112), a position (e.g. 114, 115A, 117, 119), a position on a map (e.g. associated with 114, 115A, 117, 119), a height, a distance (e.g. 122), a speed, a direction (e.g. 123) of movement, a path, an acceleration, a rotation, a deformation, a transformation, a gait, an action, a head motion, a periodic motion, a transitional motion, a trend, a change in the trend, a head motion rate, a head motion direction, a mouth-related rate, an eye-related rate, a breathing rate, a heart rate, a hand motion rate, a hand motion direction, a leg motion, a body motion, a walking rate, a hand motion rate, a positional characteristics, a characteristics associated with movement of the object (e.g. 112), a tool motion, a machine motion, a complex motion, and/or a combination of multiple motions.

The at least one first channel information (e.g. 111A, 111B) and/or the at least one second channel information (e.g. 111A, 111B) may comprise: signal strength, signal amplitude, signal phase, received signal strength indicator (RSSI), channel state information (CSI, e.g. 110A, 110B of FIG. 1), information associated with at least one of: a frequency band, a frequency signature, a frequency phase, a frequency amplitude, a frequency trend, a frequency characteristics, a frequency-like characteristics, an orthogonal decomposition characteristics, and/or a non-orthogonal decomposition characteristics, information associated with at least one of: a time period, a time signature, a time amplitude, a time phase, a time trend, and/or a time characteristics, information associated with at least one of: a time-frequency partition, a time-frequency signature, a time-frequency amplitude, a time-frequency phase, a time-frequency trend, and/or a time-frequency characteristics, information associated with a direction, an angle of arrival, an angle of a directional antenna, and/or a phase, and/or another information of the wireless signal (e.g. 140) through the wireless multipath channel (e.g. 144).

Preprocessing may be applied the at least one first channel information (e.g. 111A, 111B) and/or the at least one second channel information (e.g. 111A, 111B) before the wireless smart sensing task may be performed. The preprocessing may comprise: de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, and/or another filter.

The wireless smart sensing task may comprise: object detection, object recognition, object verification, tool detection, tool recognition, tool verification, machine detection, machine recognition, machine verification, human detection, human recognition, human verification, baby detection, baby recognition, baby verification, human breathing detection, motion detection, motion estimation, motion verification, periodic motion detection, periodic motion estimation, periodic motion verification, stationary motion detection, stationary motion estimation, stationary motion verification, cyclo-stationary motion detection, cyclo-stationary motion estimation, cyclo-stationary motion verification, transient motion detection, transient motion estimation, transient motion verification, trend detection, trend estimation, trend verification, breathing detection, breathing estimation, breathing estimation, human biometrics detection, human biometrics estimation, human biometrics verification, environment informatics detection, environment informatics estimation, environment informatics verification, gait detection, gait estimation, gait verification, gesture detection, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, tracking, multiple object tracking, indoor tracking, indoor position, indoor navigation, power transfer, wireless power transfer, object counting, car tracking in parking garage, patient detection, patient monitoring, patient verification, wireless communication, data communication, signal broadcasting, networking, coordination, administration, encryption, protection, cloud computing, other processing and/or other task.

The switching from the first Type 2 transceiver at the first location to the second Type 2 transceiver at the second location may be based on: signal strength, signal amplitude, signal phase, received signal strength indicator (RSSI), channel state information (CSI, e.g. 110A, 110B of FIG. 1), a map, a current location of the Type 1 transceiver, information associated with at least one of: a frequency band, a frequency signature, a frequency phase, a frequency amplitude, a frequency trend, a frequency characteristics, a frequency-like characteristics, an orthogonal decomposition characteristics, and/or a non-orthogonal decomposition characteristics, information associated with at least one of: a time period, a time signature, a time amplitude, a time phase, a time trend, and/or a time characteristics, information associated with at least one of: a time-frequency partition, a time-frequency signature, a time-frequency amplitude, a time-frequency phase, a time-frequency trend, and/or a time-frequency characteristics, information associated with a direction, an angle of arrival, an angle of a directional antenna, and/or a phase, and/or another information.

The Type 1 transceiver may switch the wireless connection from the first Type 2 transceiver at the first location to the second Type 2 transceiver at the second location when a quantity derived from the at least one first channel information (e.g. 111A, 111B) and/or the at least one second channel information (e.g. 111A, 111B) may satisfy a switching condition.

Dummy Origin

A particular Type 2 (transceiver) device (e.g. 106A, 106B, 108, 109, 113A, 113B, 400, 402, 404) may broadcast a series of probing signals to one or more Type 1 (transceiver) device (e.g. 106A, 106B, 108, 109, 113A, 113B, 400, 402, 404). The particular Type 2 device (e.g. 106A, 106B, 108, 109, 113A, 113B, 400, 402, 404) may be a WiFi access point, an LTE base station, a Bluetooth device, and/or a BLE device. Initially or periodically or occasionally or at a reset, a procedure may be applied to trigger/initiate a broadcasting mode of the particular Type 2 device (e.g. 106A, 106B, 108, 109, 113A, 113B, 400, 402, 404) so that the Type 2 device (e.g. 106A, 106B, 108, 109, 113A, 113B, 400, 402, 404) may send the series of probing signals in the broadcasting mode. In the initiating procedure, the Type 2 device (e.g. 106A, 106B, 108, 109, 113A, 113B, 400, 402, 404) may function temporarily as a Type 1 device (e.g. 106A, 106B, 108, 109, 113A, 113B, 400, 402, 404) and communicate with another device (e.g. 106A, 106B, 108, 109, 113A, 113B, 400, 402, 404) that may function temporarily as a Type 2 device (e.g. 106A, 106B, 108, 109, 113A, 113B, 400, 402, 404) to send at least one probing signal to the Type 2 device (e.g. 106A, 106B, 108, 109, 113A, 113B, 400, 402, 404). The another device (e.g. 106A, 106B, 108, 109, 113A, 113B, 400, 402, 404) may be a dummy device (e.g. 106A, 106B, 108, 109, 113A, 113B, 400, 402, 404) dedicated to communicate with the Type 2 device (e.g. 106A, 106B, 108, 109, 113A, 113B, 400, 402, 404) in the initiating procedure. The another device (e.g. 106A, 106B, 108, 109, 113A, 113B, 400, 402, 404) may have other useful function.

Tracker Bot ID

A particular Type 2 (transceiver) device (e.g. 106A, 106B, 108, 109, 113A, 113B, 400, 402, 404) may broadcast a series of probing signals to one or more Type 1 (transceiver) device (e.g. 106A, 106B, 108, 109, 113A, 113B, 400, 402, 404).

The particular Type 2 device (e.g. 106A, 106B, 108, 109, 113A, 113B, 400, 402, 404) may be a WiFi access point, an LTE base station, a Bluetooth device, and/or a BLE device. Initially or periodically or occasionally or at a reset, a procedure may be applied to trigger/initiate a broadcasting mode of the particular Type 2 device (e.g. 106A, 106B, 108, 109, 113A, 113B, 400, 402, 404) so that the Type 2 device (e.g. 106A, 106B, 108, 109, 113A, 113B, 400, 402, 404) may send the series of probing signals in the broadcasting mode. In the initiating procedure, the Type 2 device (e.g. 106A, 106B, 108, 109, 113A, 113B, 400, 402, 404) may function temporarily as a Type 1 device (e.g. 106A, 106B, 108, 109, 113A, 113B, 400, 402, 404) and communicate with another device (e.g. 106A, 106B, 108, 109, 113A, 113B, 400, 402, 404) that may function temporarily as a Type 2 device (e.g. 106A, 106B, 108, 109, 113A, 113B, 400, 402, 404) to send at least one probing signal to the Type 2 device (e.g. 106A, 106B, 108, 109, 113A, 113B, 400, 402, 404). The another device (e.g. 106A, 106B, 108, 109, 113A, 113B, 400, 402, 404) may be a dummy device (e.g. 106A, 106B, 108, 109, 113A, 113B, 400, 402, 404) dedicated to communicate with the Type 2 device (e.g. 106A, 106B, 108, 109, 113A, 113B, 400, 402, 404) in the initiating procedure. The another device (e.g. 106A, 106B, 108, 109, 113A, 113B, 400, 402, 404) may have other useful function.

Map-Based Correction

This disclosure is also about tracking and/or navigation correction (correction for the tracking and/or navigation).

A system, apparatus and/or method of tracking and/or navigation correction comprises: a processor (e.g. 100A, 100B), a memory (e.g. 102A, 102B) communicatively coupled with the processor (e.g. 100A, 100B), and a set of instructions (e.g. 104A, 104B) stored in the memory (e.g. 102A, 102B) which when executed cause the processor (e.g. 100A, 100B) to do the following. It (the system, apparatus and/or method of tracking correction) determines a movement of an object along a trajectory in a venue (e.g. 142). A wireless signal (e.g. 140) is sent through a wireless multipath channel (e.g. 144) of the venue (e.g. 142). The wireless multipath channel (e.g. 144) of the venue (e.g. 142) is impacted by the movement of the object (e.g. 112) in the venue (e.g. 142). At least one time series of channel information (e.g. 300, 111A, 111B) is extracted from the wireless signal (e.g. 140). It (the system, apparatus and/or method of tracking correction) further determines an estimated trajectory path (and/or navigation path) of the object (e.g. 112) in the venue (e.g. 142) associated with the movement of the object (e.g. 112) estimated based on the at least one time series of channel information (e.g. 300, 111A, 111B), and applies corrective adjustment to the estimated trajectory (and/or navigation path) of the object (e.g. 112).

The wireless signal (e.g. 140) may be sent between two heterogeneous wireless transceivers through the wireless multipath channel (e.g. 144) in the venue (e.g. 142). One of the two heterogeneous wireless transceivers may be associated with the object (e.g. 112) and/or the movement of the object (e.g. 112).

The estimated trajectory of the object (e.g. 112) may be estimated based on the at least one time series of channel information (e.g. 300, 111A, 111B).

A map associated with the venue (e.g. 142) may be obtained. The map may be 2-dimension, 3-dimension and/or higher dimension. Points in the map may be associated with another spatial-temporal information such as longitude coordinate, latitude coordinate, The map associated with the venue (e.g. 142) may be obtained based on: a photo of a floor plan of the venue (e.g. 142), an image of the floor plan of the venue (e.g. 142), a picture of the floor plan of the venue (e.g. 142), at least one image of the venue (e.g. 142), at least one video of the venue (e.g. 142), at least one scanned data of the venue (e.g. 142), at least one captured data of the venue (e.g. 142), a recorded description of the venue (e.g. 142), an audio description of the venue (e.g. 142), an infra-red description of the venue (e.g. 142), a sonic description of the venue (e.g. 142), a subsonic description of the venue (e.g. 142), a ultra-sonic description of the venue (e.g. 142), a visible light description of the venue (e.g. 142), a radio frequency description of the venue (e.g. 142), a frequency description of the venue (e.g. 142), a time-frequency description of the venue (e.g. 142), a 2-dimensional description of the venue (e.g. 142), a 3-dimensional description of the venue (e.g. 142), a higher dimensional description of the venue (e.g. 142), descriptive information of the venue (e.g. 142) comprising at least one of: a global coordinate, a local coordinate, an elevator, an inclination, a slope, a terrain description, a main structure description, a wall description, a door description, a floor description, a ceiling description, a window description, a coupling description, a multi-storey description, a basement description, a roof-top description, a material description, a vegetation description, a fixture description, an electrical wiring description, a lighting description, a ventilation description, an air-conditioning description, a water pipe description, a sewage description, an installation description, a moveable installation description, a non-moveable installation description, a furniture description, a room description, an office description, a public area description, an open area description, a closed area description, a semi-closed area description, a shelving description, a walkway description, a pedestrian area description, a restricted area description, a limited access area description, an access control description, a height description, a building layout description, a people flow description, a wireless installation description, a surrounding area description, an outside area description, a staircase description, a lift description, an elevator description, a fire planning description, a catastrophe planning an emergency planning description, a daily routine description, a weekly routine description, a monthly routine description, a yearly routine description, a time pattern description, a time-related description, a maintenance description, a temporary arrangement description, a non-temporary arrangement description, an event description, a future event description, an imminent event description, a levitation description, a floating description, a submersing description, a weather description, a surrounding environment description, and a historical description, a scanned representation of the venue (e.g. 142), a graphics description of the venue (e.g. 142), an electronic representation of the venue (e.g. 142), a relational description of the venue (e.g. 142) and another venue (e.g. 142), and/or other description of the venue (e.g. 142).

The object (e.g. 112) on the map may be registered. The object (e.g. 112) may be associated with an initial spatial-temporal information (e.g. initial position 114) on the map with corresponding time stamp. The object (e.g. 112) may be a person.

A next spatial-temporal information and/or next position (e.g. 114, 115B, 115A, 117, 119, 406, 408, 410, 414) of the object (e.g. 112) may be predicted based on a current spatial-temporal information of the object (e.g. 112), a current spatial-temporal information and/or position (e.g. 114, 115B, 115A, 117, 119, 406, 408, 410, 414) of the object (e.g. 112), a current direction of the object (e.g. 112), a current speed of the object (e.g. 112), a current acceleration of the object (e.g. 112), a current characteristics and/or spatial-temporal information of the object (e.g. 112), a capability of the object (e.g. 112), a constraint of the object (e.g. 112), a status of the object (e.g. 112), a limitation of the surrounding on the object (e.g. 112), a behavior of the object (e.g. 112), a habit of the object (e.g. 112), a tendency of the object (e.g. 112), a model of the object (e.g. 112), and/or a history of the object (e.g. 112).

The map may be processed for the determination of the estimated trajectory of the object (e.g. 112) and the corrective adjustment to the estimated trajectory of the object (e.g. 112). The processing of the map may comprise scaling, resizing, rotation, transformation, deformation, mapping, labelling, coloring, tagging, time stamping, matching with another map, and/or synchronizing with another map.

The estimated trajectory of the object (e.g. 112) in the venue (e.g. 142) may be processed. The processing of the estimated trajectory of the object (e.g. 112) may comprise: de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, real-time processing, contemporaneous processing, delayed processing, non-real-time processing, another transform, another processing, and/or another filter. The processing may be applied to location, height, rectangular coordinate, polar coordinate, moving distance (e.g. 122), moving direction, speed, velocity, magnitude of velocity, phase of velocity, acceleration, magnitude of acceleration, phase of acceleration, instantaneous direction of motion, global coordinate, local coordinate, a time-varying characteristics and/or spatial-temporal information of the object (e.g. 112), a time-varying frequency characteristics and/or spatial-temporal information of the object (e.g. 112), a time series of channel information (e.g. 300, 111A, 111B), and/or a time segment of channel information (e.g. 111A, 111B).

The corrective adjustment may be applied to the estimated trajectory of the object (e.g. 112) based on a map associated with the venue (e.g. 142), and/or at least one constraint associated with the map.

The estimated trajectory of the object (e.g. 112) may be segmented into at least one segment. The corrective adjustment may be applied to the at least one segment. Each of the at least one segment may be associated with a segment identity (ID). The estimated trajectory may be classified such that each segment may be associated with one or more segmentation type. The corrective adjustment may be applied to the at least one segment based on a map of the venue (e.g. 142) and at least one constraints associated with the map.

The estimated trajectory of the object (e.g. 112) may be segmented and classified into at least one segment each associated with a segmentation type, a time stamp, and/or a segment identity (ID). The corrective adjustment may be applied to the at least one classified segment based on the segmentation type, the segment ID, a moving distance (e.g. 122), a moving directional angle, a map of the venue (e.g. 142), and/or at least one constraint associated with the map.

The classification may comprise: a segmentation type of straight line segments, a segmentation type of ARC segments, and/or another segmentation type. The classification may comprise an initial classification and/or a refined classification.

The estimated trajectory of the object (e.g. 112) may be segmented into at least one initial segment each associated with an initial segmentation type and/or an initial segment identity (ID) in the initial classification. The refined classification may be obtained by combining, merging, splitting, reorganizing, re-arranging, refining the map by scaling the map, scaling the map with a scaling factor, refining the map with a local scaling factor, and/or reclassifying the at least one initial segment to obtain at least one refined segment each associated with a refined segmentation type and a refined segment identity (ID).

The map-based correction may comprise a guide-based correction, a low-level correction and/or a high-level correction.

The guide-based correction may comprise: correcting an angle of the estimated trajectory of the object (e.g. 112) so that the corrected trajectory may be parallel to a straight path if the object (e.g. 112) may be determined to be moving along the straight path but the estimated trajectory may not parallel to the straight path. The guide-based correction may comprise adjusting the estimated trajectory to be farther away from a forbidden structure if the estimated trajectory may be too close to the forbidden structure.

The straight path may comprise: a corridor, a road, an alley, a lane, a path, a passage, a line, a driveway, a gap, a valley, a walkway, a pavement, a track, a duct, a pipe, a ladder, a staircase, a tunnel, a river, a waterway, an aisle, an aisle between shelves, an aisle between goods, an aisle between seats, an aisle between installations, an aisle in a shop, an aisle in a warehouse, an aisle in a vehicle, an aisle in a factory, an aisle in an office, an aisle in a home, an aisle in a building, a path in a garden, an area partially bounded by two parallel walls, an area partially bounded by two straight walls, an area partially bounded by two roughly straight walls, an area bounded by two parallel boundaries, an area bounded by two locally parallel boundaries, an area bounded by two straight boundaries, an area bounded by two roughly straight boundaries, an area bounded by two flexible straight boundaries, an area bounded by two parallel interfaces, an area bounded by two locally parallel interfaces, an area bounded by two straight interfaces, an area bounded by two roughly straight interfaces, an area bounded by two flexible straight interfaces, an area with an axis of symmetry, an area with an axis of local symmetry, and/or an area with an axis of near symmetry.

The forbidden structure may comprise: a wall, a boundary, an interface, a corridor side, a road side, a lane side, a path side, a passage side, a line, a driveway boundary, a gap side, a valley side, a walkway boundary, a pavement boundary, a track boundary, a duct, a pipe, a ladder edge, a staircase edge, a tunnel side, a river side, a waterway boundary, an aisle boundary, a row of objects, a row of seats, a shelf, an installation, an assembly line, a fenced area, a guarded area, an off-limit area, a fixture, a furniture, an equipment, a machine, an installation, a door, a fence, a ceiling, a floor, a ground, a rock, a duct, a pipe, a corner, a turning point, a curve, an arc, a straight line, a separation, a cliff, a shoreline, a forbidden area, a road structure, and/or another forbidden structure.

The estimated trajectory may be too close to the forbidden structure if a distance between the estimated trajectory and the forbidden structure may be less than a threshold. The estimated trajectory may be adjusted to be farther away by keeping a minimum distance from the forbidden structure. The minimum distance may be: zero, a positive quantity and a negative quantity. The minimum distance may be an adaptive quantity determined based on at least one characteristics and/or spatial-temporal information of the forbidden structure.

After a current segment may be adjusted, at least one previous segment may be checked for discrepancy and/or lack of consistency, between consecutive segments. If discrepancy and/or lack of consistency is detected, additional map-based correction comprising the low-level correction and/or the high-level correction may be applied.

The low-level adjustment may comprise: correcting error associated with a current segment of the estimated trajectory locally, wherein an error condition associated with the current segment of the estimated trajectory is determined, and adjusting the current segment and/or an immediate past segment so that the error condition does not occur in the corrected trajectory.

The error condition may comprise: the current segment hitting a forbidden structure, the current segment hitting a boundary associated with the forbidden structure, the current segment hitting an object-dependent forbidden structure of which a property of the object (e.g. 112)-dependent forbidden structure is based on a characteristics and/or spatial-temporal information of the object (e.g. 112), the current segment hitting a temporarily forbidden structure, the current segment going through a non-penetrable structure, the current segment going through at least one of: a ceiling, a floor, a wall, a structure, a machine, a furniture, and a fixture, the current segment hitting a boundary of the map, the current segment hitting a watched region, the current segment associating with an unusual behavior, the current segment associating with an unusual behavior of the object (e.g. 112), the current segment reaching an unreasonable height, and/or another error condition.

The high-level adjustment may comprise: correcting error associated with the current segment of the estimated trajectory globally, wherein the error condition associated with the current segment of the estimated trajectory is determined and the error condition is not corrected by a low-level adjustment, and adjusting the current segment and at least one past segment so that the error condition does not occur in the corrected trajectory.

The scaling factor may be obtained by determining an intersection-corridor (IC) graph based on the estimated trajectory, the map and/or the at least one constraints of the map. The intersection-corridor graph may comprise a set of vertices and/or a set of edges. A corridor in the venue (e.g. 142) corresponding to a series of vertices and/or edges of the intersection-corridor (IC) graph and also corresponding to at least one section of the estimated trajectory may be determined. A ground-truth length of the corridor may be computed based on the map and/or the at least one constraints of the map. A second length of the corridor may be computed based on the at least one section of the estimated trajectory, and/or the vertices and/or edges of the IC graph corresponding to the corridor. The scaling factor may be computed based on the ground-truth length and/or the second length.

The scaling factor may be further obtained by computing the estimated trajectory based on the wireless signal (e.g. 140) obtained while the object (e.g. 112) moves along the corridor at least one time.

The scaling factor may be obtained by: determining a second estimated trajectory of a second object in the venue (e.g. 142) associated with a second movement of the second object along a path at least one time based on at least one time series of second channel information (e.g. 111A, 111B) extracted from a second wireless signal (e.g. 140) sent through the wireless multipath channel (e.g. 144) of the venue (e.g. 142). The second estimated trajectory of the second object in the venue (e.g. 142) associated with the second movement of the second object may be computed based on the at least one time series of second channel information (e.g. 111A, 111B). An intersection-corridor graph comprising a set of vertices and/or a set of edges may be determined based on the map and/or the at least one constraints of the map. It may be determined that the path may correspond to a series of vertices and/or edges of the intersection-corridor (IC) graph and/or also to at least one section of the second trajectory. A ground-truth length of the path may be computed based on the intersection-corridor graph and/or the map. A second length of the path may be computed based on the at least one section of the second estimated trajectory and/or the vertices and/or edges of the IC graph corresponding to the path. The scaling factor may be computed based on the ground-truth length and/or the second length.

The second object may move along the path multiple times. The second length of the path may be computed based on a weighted average of lengths of the path associated with the multiple times the second object may move along the path.

The estimated trajectory, the map and/or the at least one constraint of the map may be scaled using the scaling factor.

The set of vertices may represent: a corner, a turning point, a control point, an end point of an arc, an end point of a straight line, a check point, a gate, an exit, a door, a crossroad, a crossing point of two paths, an intersection, and/or another point feature. The set of edges may represent: a corridor, a road, an alley, a lane, a path, a line, a straight line, an arc, a curve, a driveway, a gap, a valley, a walkway, a pavement, a track, a duct, a pipe, a ladder, a staircase, a tunnel, a river, a waterway, an aisle, an area partially bounded by two walls, an area bounded by two boundaries, an area bounded by two interfaces, and an area with an axis of symmetry.

An edge of the intersection-corridor (IC) graph may be undirected, directed, undirected, and/or bi-directed. Each vertex of the intersection-corridor graph may be associated with a vertex cost. Each edge may be associated with at least one edge cost based on the directionality of the edge.

The set of instructions (e.g. 104A, 104B) may further: segment and classify the estimated trajectory of the object (e.g. 112) into at least one segment each associated with a time stamp, a segment identity (ID), and/or at least one segmentation type. The estimated trajectory of the object (e.g. 112) may comprise a time series of trajectory points each associated with a time stamp and an estimated location. Each of the trajectory points may be determined based on: another trajectory point, a moving distance (e.g. 122), a moving direction, the at least one time series of channel information (e.g. 300, 111A, 111B), and/or another quantity.

The set of instructions (e.g. 104A, 104B) may: compute a delta-angle based on a difference between an estimated moving direction angle associated with a new trajectory point and another estimated moving direction angle associated with a past trajectory point. The current segment may comprise at least one trajectory point immediately before the new trajectory point. The current segment may comprise the past trajectory point. The new trajectory point may be associated with an estimated moving distance (e.g. 122) and an estimated moving direction angle. The set of instructions (e.g. 104A, 104B) may segment and classify the new trajectory point based on: the new trajectory point, the delta-angle, the current segment, and/or a past segment.

The at least one segmentation type may comprise a STRAIGHT LINE type and/or an ARC type, etc. The set of instructions (e.g. 104A, 104B) may: add the current trajectory point to the current segment if the current segmentation type is the STRAIGHT LINE type and the delta-angle is within a margin around zero.

The set of instructions (e.g. 104A, 104B) may add the current trajectory point to the current segment, change the current segmentation type to the ARC type and reset a valley finder, provided that the current segmentation type is the STRAIGHT LINE type and the delta-angle is outside a margin around zero and the current segment crosses zero at least once.

The set of instructions (e.g. 104A, 104B) may split the current segment into a front portion and a latter portion, use the latter portion of the split current segment to form a new segment, add the current trajectory point to the new segment, and reset a valley finder, provided that: the current segmentation type is the STRAIGHT LINE type, and the delta-angle is outside a margin around zero, and the current segment crosses zero at least once.

The set of instructions (e.g. 104A, 104B) may start a new segment with segmentation type of STRAIGHT LINE type and add the current trajectory point to the new segment, provided that the current segmentation type is the ARC type and the delta-angle hits a soft zero. The delta-angle may hit the soft zero if the delta-angle is within a margin from zero.

The set of instructions (e.g. 104A, 104B) may, if the current segmentation type is the ARC type and the delta-angle does not hit a soft zero, add the current trajectory point to the current segment, add the current trajectory point to a valley finder. If further a valley may be confirmed by the valley finder and/or absolute value of the delta-angle may be larger than a threshold, then the set of instructions (e.g. 104A, 104B) may split the current segment into a front portion and a latter portion, use the latter portion to form a new segment, and reset the valley finder.

If a current segment is of the STRAIGHT LINE type and a length of the current segment is short and a preceding segment immediately before the current segment is of the ARC type, the set of instructions (e.g. 104A, 104B) may temporarily combine the current segment and the preceding segment into a combined segment, apply arc-type-hit-correction recursively to the combined segment based on at least one of: the map and the constraint of the map, and separate the combined segment into a front portion and a latter portion. The front portion may be associated with the preceding segment and the latter portion may be associated with the current segment. If the current segment is of the ARC type, the set of instructions (e.g. 104A, 104B) may get an arc-hitting type, and apply arc-type-hit-correction recursively based on the arc-hitting type, and the map and the at least one constraint of the map.

If a current segment is of the STRAIGHT LINE type and at least one of: a length of the current segment is not short and a preceding segment immediately before the current segment is not of the ARC type, the set of instructions (e.g. 104A, 104B) may apply straight-segment-correction to the current segment based on the map and the at least one constraint of the map.

The straight-segment-correction to the current segment may comprise: computing a delta-angle between a direction of a boundary of the map and/or the at least one constraint of the map and a moving direction associated with the current segment. If the delta-angle is less than a threshold, the correction may apply parallel-cut-in-correction. If not, the correction may apply orthogonal-hit-correction.

The parallel-cut-in-correction may comprise correcting the moving direction associated with the current segment based on the delta-angle such that the moving direction is parallel to the direction of the boundary and/or approaching to the direction of the boundary.

The orthogonal-hit-correction may comprise shortening a moving distance associated with the current segment by a scaling factor less than 1 without changing the moving direction associated with the current segment. The scaling factor may be 0.9, 0.8, 0.7, 0.6, 0.5, 0.4, 0.3, 0.2, 0.1, 0.0, and/or another number.

The arc-hitting type may comprise: an exit-hit type, an entry-hit type, and/or a tangent type.

The exit-hit type may be associated with an exit. The exit-hit type may be associated with a straight portion and/or an arc portion. The arc-type-hit correction for the exit-hit type may comprise: adjusting the length of the straight portion towards the exit, and/or shifting the arc portion towards the exit.

The length of the straight portion may be decreased if the segment overshoots the exit. The length of the straight portion may be increased if the segment undershoots the exit.

The entry-hit type may be associated with a current boundary associated with the current segment of the estimated trajectory and an adjacent boundary adjacent to the current segment on the map at an angle to the current boundary. The arc-type-hit correction for the entry-hit type may comprise: adjusting the length of a straight portion of the current segment towards the adjacent boundary so that the current segment of the estimated trajectory is directed to a path next to the adjacent boundary, provided that the straight portion of the current segment is consistent with the current boundary.

The length of the straight portion may be decreased if the segment overshoots the path. The length of the straight portion may be increased if the segment undershoots the path.

The tangent-hit type may be associated with a front boundary being hit by the current segment of the estimated trajectory. The arc-type-hit correction for the tangent-hit type may comprise shortening a straight portion of the current segment to avoid hitting the front boundary.

The set of instructions (e.g. 104A, 104B) may apply the corrective adjustment to the estimated trajectory of the object (e.g. 112) when the estimated trajectory on the map hits a boundary associated with the map and the at least one constraint of the map.

The set of instructions (e.g. 104A, 104B) may adjust the estimated trajectory such that the adjusted estimated trajectory stay within a distance of the boundary without hitting the boundary.

The set of instructions (e.g. 104A, 104B) may adjust a current segment of the estimated trajectory such that the adjusted current segment stay within a distance of the boundary without hitting the boundary.

An opening associated with the map and the at least one constraint of the map may be near a position (e.g. 114, 115B, 115A, 117, 119, 406, 408, 410, 414) when the estimated trajectory may hit the boundary. The set of instructions (e.g. 104A, 104B) may adjust the estimated trajectory such that the adjusted estimated trajectory steers towards the opening without hitting the boundary.

Another boundary associated with the map and/or the at least one constraint of the map may be associated with an opening near a position (e.g. 114, 115B, 115A, 117, 119, 406, 408, 410, 414) when the estimated trajectory hits the boundary. The set of instructions (e.g. 104A, 104B) may adjust the estimated trajectory such that the adjusted estimated trajectory may steer towards the another boundary through the opening without hitting the boundary.

A corner associated with the map and the at least one constraint of the map may be near a position (e.g. 114, 115B, 115A, 117, 119, 406, 408, 410, 414) when the estimated trajectory hits the boundary. The set of instructions (e.g. 104A, 104B) may adjust the estimated trajectory such that the adjusted estimated trajectory may steer around the corner without hitting the boundary.

The corrective adjustment may comprise: changing a length of a current segment of the estimated trajectory, changing a direction of the current segment, changing a local curvature of the current segment, transforming a shape of the current segment, and/or changing a time stamp of the current segment.

A trajectory point of the estimated trajectory may be associated with a statistical region. The trajectory point may be adjusted such that it may stay within the statistical region.

Trajectory points of a current segment of the estimated trajectory may each be associated with a respective statistical region. The current segment may become an adjusted current segment after the corrective adjustment. Trajectory points of the adjusted current segment may each be within the statistical region of respective trajectory points of the current segment.

The set of instructions (e.g. 104A, 104B) may adjust a current segment of the estimated trajectory to become an adjusted current segment of the adjusted estimated trajectory. Trajectory points of the current segment of the estimated trajectory may be associated with a set of permissible regions. The set of instructions (e.g. 104A, 104B) may adjust the set of permissible regions to become a set of adjusted permissible regions. The current segment may be adjusted such that trajectory points of the adjusted current segment may each be within an adjusted permissible region.

The set of instructions (e.g. 104A, 104B) may adjust a current segment of the estimated trajectory to become an adjusted current segment of the adjusted estimated trajectory. A future segment of the estimated trajectory connected to the current segment of the estimated trajectory may be adjusted to become an adjusted future segment of the adjust estimated trajectory connected to the adjusted current segment of the adjusted estimated trajectory.

The set of instructions (e.g. 104A, 104B) may determine an arc-hitting type associated with a current segment of the estimated trajectory hitting a boundary associated with the map and the at least one constraint of the map. The set of instructions (e.g. 104A, 104B) may adjust the current segment to become an adjusted current segment of the adjusted estimated trajectory based on the arc-hitting type, wherein the current segment may be classified as an ARC type.

The set of instructions (e.g. 104A, 104B) may determine the arc-hitting type based on a current quantity and a past quantity. The current quantity may be determined based on a current angle between a current normal direction of the boundary and a current direction of the estimated trajectory associated with the current segment. The past quantity may be determined based on a past angle between a past normal direction of the boundary and a past direction of the estimated trajectory.

The arc-hitting type may be a TANGENT HIT type if the current quantity is larger than the past quantity.

The arc-hitting type may be a FREE SPACE EXIT HIT type if the current quantity is not larger than the past quantity, and an end point of the current segment where the current segment hits the boundary is not associated with a corridor.

The arc-hitting type may be an EXIT HIT type if the current quantity is not larger than the past quantity, the end point of the current segment where the current segment hits the boundary is associated with a first corridor, and the first corridor is the same as a second corridor associated with a beginning point of the current segment.

The arc-hitting type may be a DOOR ENTRY HIT type if: the current quantity is not larger than the past quantity, the end point of the current segment where the current segment hits the boundary is associated with the first corridor, the first corridor is not the same as the second corridor associated with the beginning point of the current segment, and the end point of the current segment is near a door associated with the second corridor.

The arc-hitting type may be a NON-DOOR ENTRY HIT type if the current quantity is not larger than the past quantity, the end point of the current segment where the current segment hits the boundary is associated with the first corridor, the first corridor is not the same as the second corridor associated with the beginning point of the current segment, and the end point of the current segment is near a non-door associated with the second corridor.

The set of instructions (e.g. 104A, 104B) may determine: a target checkpoint and/or a target direction, for the current segment based on the arc-hitting type. A length of a past segment of the estimated trajectory may be adjusted based on: the target checkpoint, the target direction and/or the arc-hitting type. The past segment may be classified as a STRAIGHT LINE type.

A length of a past segment of the estimated trajectory may be adjusted so that the current segment may steer towards: the target checkpoint and/or the target direction.

If the arc-hitting type is TANGENT HIT, the length of the past segment may be shortened by: a fixed amount, an adaptive amount, a percentage amount, and/or another amount, so that the current segment may not hit the boundary.

If the arc-hitting type is FREE SPACE EXIT HIT type, the target direction may be determined to be toward a point beyond the boundary not associated with any corridor. The length of the past segment may be adjusted by: a fixed amount, an adaptive amount, a percentage amount, and/or another amount, so that the end of the current segment may steer in general in the target direction.

If the arc-hitting type is FREE SPACE EXIT HIT type, the target checkpoint may be determined to be a point beyond the boundary not associated with any corridor. The length of the past segment may be adjusted by: a fixed amount, an adaptive amount, a percentage amount, and/or another amount, so that the end of the current segment may steer in general towards the target checkpoint.

If the arc-hitting type is EXIT HIT type, the target direction may be determined to be toward a second corridor different from a first corridor associated with the boundary.

The length of the past segment may be adjusted by: a fixed amount, an adaptive amount, a percentage amount, and/or another amount, so that the end of the current segment may steer in general in the target direction.

If the arc-hitting type is EXIT HIT type, the target checkpoint may be determined as a point in a second corridor different from a first corridor associated with the boundary. The length of the past segment may be adjusted by at least one of: a fixed amount, an adaptive amount, a percentage amount, and another amount, so that the end of the current segment steers in general towards the target checkpoint.

If the arc-hitting type is DOOR ENTRY HIT type, the target direction may be determined to be toward a door associated with an opening of the boundary. The length of the past segment may be adjusted by: a fixed amount, an adaptive amount, a percentage amount, and/or another amount, so that the end of the current segment may steer in general in the target direction.

If the arc-hitting type is DOOR ENTRY HIT type, the target checkpoint may be determined as a point associated with a door associated with an opening of the boundary. The length of the past segment may be adjusted by: a fixed amount, an adaptive amount, a percentage amount, and/or another amount, so that the end of the current segment may steer in general towards the target checkpoint.

If the arc-hitting type is NON-DOOR ENTRY HIT type, the target direction may be determined to be toward the non-door associated with the second corridor. The length of the past segment may be adjusted by: a fixed amount, an adaptive amount, a percentage amount, and/or another amount, so that the end of the current segment may steer in general in the target direction.

If the arc-hitting type is NON-DOOR ENTRY HIT type, the target checkpoint may be determined as a point associated with a non-door associated with the second corridor. The length of the past segment may be adjusted by: a fixed amount, an adaptive amount, a percentage amount, and/or another amount, so that the end of the current segment may steer in general towards the target checkpoint.

An (2D, 3D and/or higher dimension) array of map points associated with the map may be determined. At least one corridor associated with the map may be determined.

At least one map point associated with each corridor may be determined. Map points associated with the estimated trajectory may also be determined.

At least one map point may be determined to be associated with each corridor based on at least one boundary rectangle associated with the corridor.

At least one map point associated with a corridor may be tagged by a user.

A virtual gate associated with: a map, a corridor, a door, and/or a non-door may be determined. During a correction, an estimated trajectory near the virtual gate may be adjusted to go through the virtual gate.

A checkpoint associated with: a map, a corridor, a door, and/or a non-door may be determined. During a correction, an estimated trajectory near the virtual gate may be adjusted to steer towards the checkpoint.

A virtual gate may be determined to be associated with: the map, a corridor, a junction, a T-junction, a cross road, a cross-junction, an angled junction, a corner, an opening, a path, a lift, an elevator, an entrance, an exit, a ramp, a gate, a pavement, a walkway, a checkpoint, a heavy-traffic area, a window, a door, a non-door, a waiting area, a seat, a chair, a sofa, a garage, a parking space, a transition area, a common area, a public area, a kitchen, a toilet, a room, a house, a building, a stairs, a compartment, an office, and/or a home. A segment of the estimated trajectory near the virtual gate may be adjusted so that the adjusted segment may go through the virtual gate.

In one example, there may be at least one threshold to be determined. A quantity (e.g. a similarity score, a signal, a function, a function of the signal, a component of channel information (CI), a function of CI, a component of channel state information (CSI), a function of CSI, a component of power information (PI), a function of PI, an output of an operation, a time quantity, a frequency quantity, a spatial-temporal quantity, etc.) may be compared with the threshold. The at least one threshold may be determined adaptively. Train data of the quantity may be obtained for at least one target case (e.g. a target case of "door open", a target case of "door close", a target case of "door half-open", etc.). The at least one threshold may be determined adaptively such that there would be at least one of: positive response for a first percentage of a first target case, positive response for a second percentage of a second target case, negative response for a third percentage of a third target case, and negative response for a fourth percentage of a fourth target case.

In one example, a first target case may be "someone walking (or something moving) inside a protected region" (e.g. the protected region may be a house, an office, an apartment, and/or any area). A third target case may be "someone walking (or something moving) outside a protected region" (e.g. the someone may be walking outside the house, the office, the apartment, and/or the area). The threshold may be adaptively adjusted such that most (e.g. 99.99%) of the first target case is detected while most of (or a maximum amount of) the third target case is not detected.

A pair of device (namely, a first device and a second device) may perform a task jointly using channel information obtained/extracted from a wireless signal transmitted between the pair of devices. Directional antenna, which radiates/receives greater power in specific directions for increased performance and reduced interference from unwanted sources, may be used in the pair of devices. The pair of device may comprise: a device, a wireless transmitter (e.g. 108), a wireless receiver (e.g. 109), a Type 1 heterogeneous wireless device, a Type 2 heterogeneous wireless device, and/or another device.

The first device may comprise at least one directional antenna (e.g. a phase array) which is steered (e.g. mechanically, electronically and/or digitally) to aim at a particular direction. The directional antenna and/or the particular direction may be adjusted/steered/changed over time, perhaps adaptively in response to at least one factor (e.g. external factor such as a movement of an object and/or the second device, a possible location of the object and/or the second device, a location/direction associated with a map, a characteristics/status (e.g. battery level, distance, relative direction) of the second device, a direction with possibly less interference, and/or internal factor such as battery level, a timed delay, etc.). The directional antenna and/or the particular direction may be adjusted/steered/changed over time, in a pre-programmed manner.

In an example, the directional antenna of the first device may be aimed at a particular area (e.g. a conference room, a bedroom, a living room, a dining area, an office, a walkway, a waiting area, an entrance/exit area, a high security area, etc.) in the venue. The directional antenna (and associated channel information) may enable detection of an event happening in the particular area (but not outside the particular area, e.g. the conference room, the bedroom, the living room, the dining area, the office, the walkway, the waiting area, the entrance/exit area, the high security area, etc.) and/or in the direction of the particular area.

The event may include an object moving, an object undergoing a certain motion sequence, a periodic motion, a transient motion, a door opening/closing, a window opening/closing, a man falling down, a machine undergoing a motion sequence, a robot doing a motion sequence (e.g. robotic arm performing a task in an assembly line), a mammal doing a certain motion sequence, a person walking/jogging/running, a baby crying, an old man leaving/entering a facility, a patient/doctor/nurse moving in a medical facility, a security personnel patrolling, a person (e.g. carrying the second device) appearing at a checkpoint (the particular area), a delivery person making a delivery, a postman dropping mail items, a janitor doing janitorial tasks, etc.

The pair of device (the first device and the second device) may perform a task jointly using the channel information obtained/extracted from the wireless signal transmitted between the pair of devices. The power/power gain of an antenna of a wireless transmitter, a wireless receiver, a wireless device, a Type 1 heterogeneous wireless device, a Type 2 heterogeneous wireless device and/or another device may be controlled/adjusted such that the task is restricted to a particular area (e.g. a conference room, a bedroom, a living room, a dining area, an office, a walkway, a waiting area, an entrance/exit area, a high security area, etc.) in the venue. The task may be restricted to the particular area but not outside the particular area.

In an example, training data for the task (e.g. motion detection) happening in the particular area (e.g. training data for "detection of motion in a conference room") may be used in conjunction with training data for the task happening outside the particular area (e.g. training data for "detection of motion outside the conference room"). The two types of training data may be used jointly to determine at least one threshold such that the task (e.g. motion detection) is restricted to the particular area but not outside the particular area.

Figure 5:
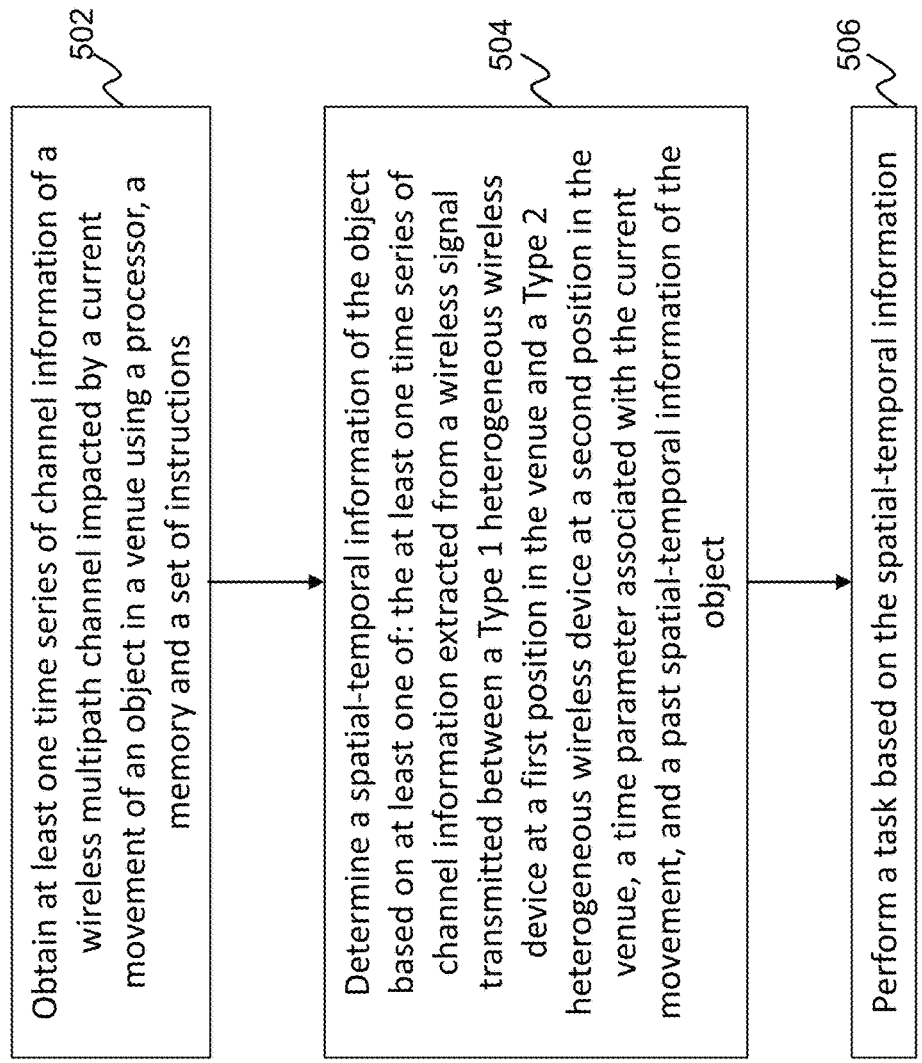
FIG. 5 illustrates an exemplary method for object tracking, according to one embodiment of the present teaching.

FIG. 5 illustrates an exemplary method for object tracking, according to one embodiment of the present teaching. At operation 502, at least one time series of channel information f a wireless multipath channel is obtained, using a processor, a memory and a set of instructions stored in the memory. The at least one time series of channel information is extracted from a wireless signal transmitted between a Type 1 heterogeneous wireless device at a first position in a venue and a Type 2 heterogeneous wireless device at a second position in the venue through the wireless multipath channel. The wireless multipath channel is impacted by a current movement of an object in the venue. At operation 504, a spatial-temporal information of the object is determined based on at least one of: the at least one time series of channel information, a time parameter associated with the current movement, and a past spatial-temporal information of the object. At operation 506, a task is performed based on the spatial-temporal information.

Figure 6:
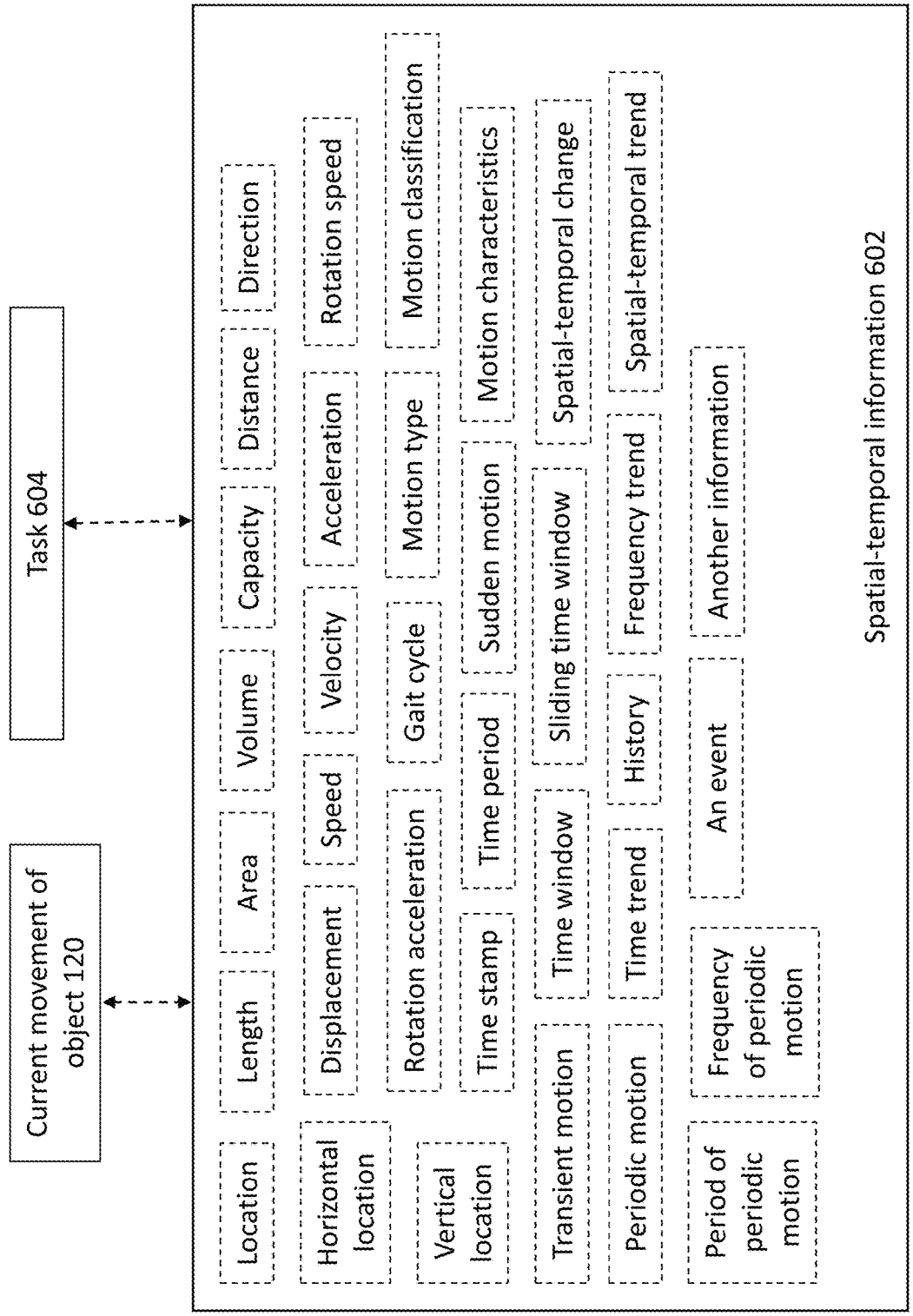
FIG. 6 illustrates examples of spatial-temporal information, according to one embodiment of the present teaching.
Figure 7:
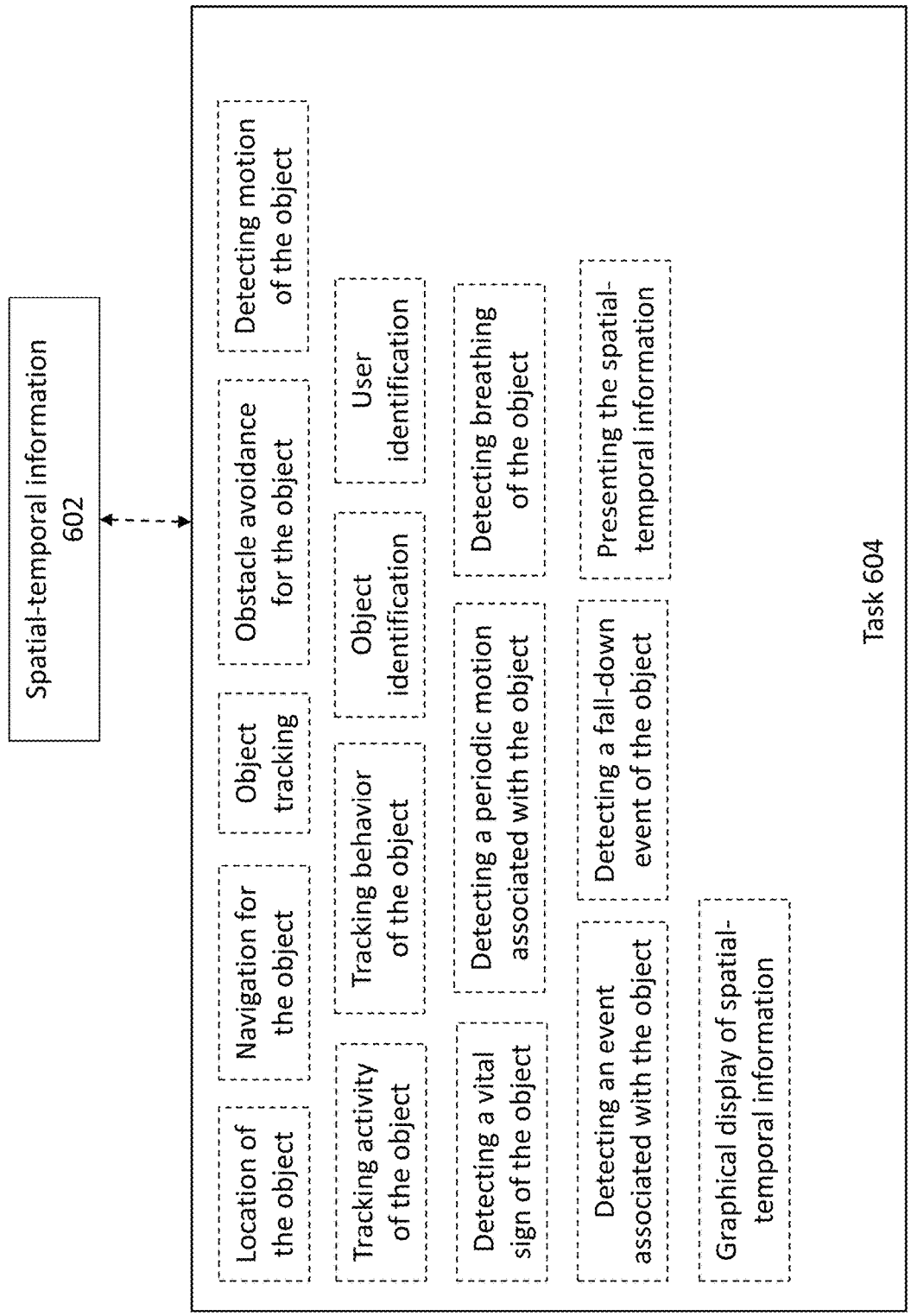
FIG. 7 illustrates examples of tasks performed based on spatial-temporal information, according to one embodiment of the present teaching.

FIG. 6 illustrates examples of the spatial-temporal information 602, according to one embodiment of the present teaching. Accordingly, FIG. 7 illustrates examples of task 604 performed based on spatial-temporal information, according to one embodiment of the present teaching.

Figure 8:
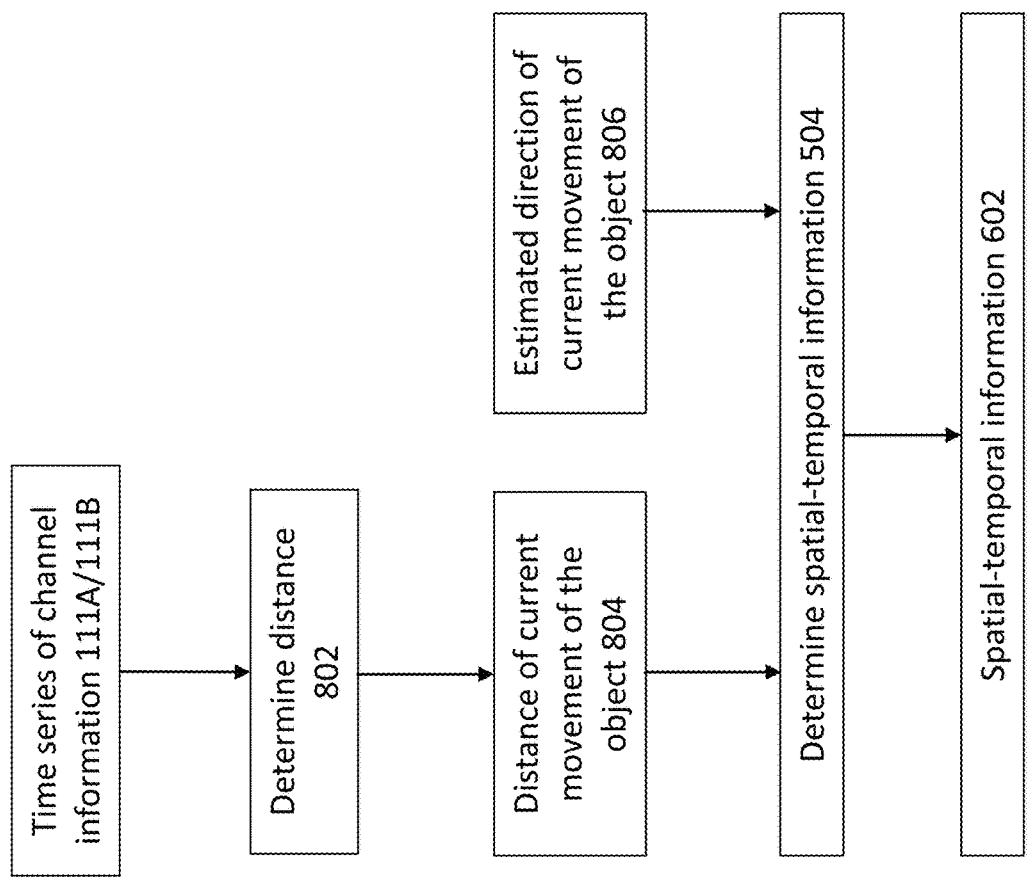
FIG. 8 illustrates another exemplary method for object tracking, according to one embodiment of the present teaching.

FIG. 8 illustrates another exemplary method for object tracking, according to one embodiment of the present teaching. As shown in FIG. 8, time series of channel information 111A/111B may be obtained to determined distance at operation 802, such that distance information 804 of the current movement of the object may be obtained. In parallel, some mechanism may be used to obtain an estimated direction 806 of the current movement of the object. As such, the spatial-temporal information may be determined, similar to the operation 504 as shown in FIG. 5, based on the distance information 804 and the estimated direction 806, to obtain the spatial-temporal information 602 as illustrated in FIG. 6.

In general, a task may be performed based on the spatial-temporal information, as shown in operation 506 of FIG. 5. In one embodiment, the task may comprise a presentation of the spatial-temporal information. It may be presented in an audio-visual way, a graphical way, a textual way, symbolic way or mechanical way. For example, the spatial-temporal information may be a detection of motion of the object in different rooms of a house. A graphical user interface (GUI) may be constructed to show that the where-about of the object in a house. For example, the object may be a person. The location or approximate location of the object may be shown/marked. And the GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated also. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area. living room, bedroom1, etc. The GUI may be a software for a computer/a tablet, an app on a smart phone (e.g. iPhone, Android phone, etc.), an app in a smart device (e.g. smart glass, smart watch, etc.).

Figure 9:
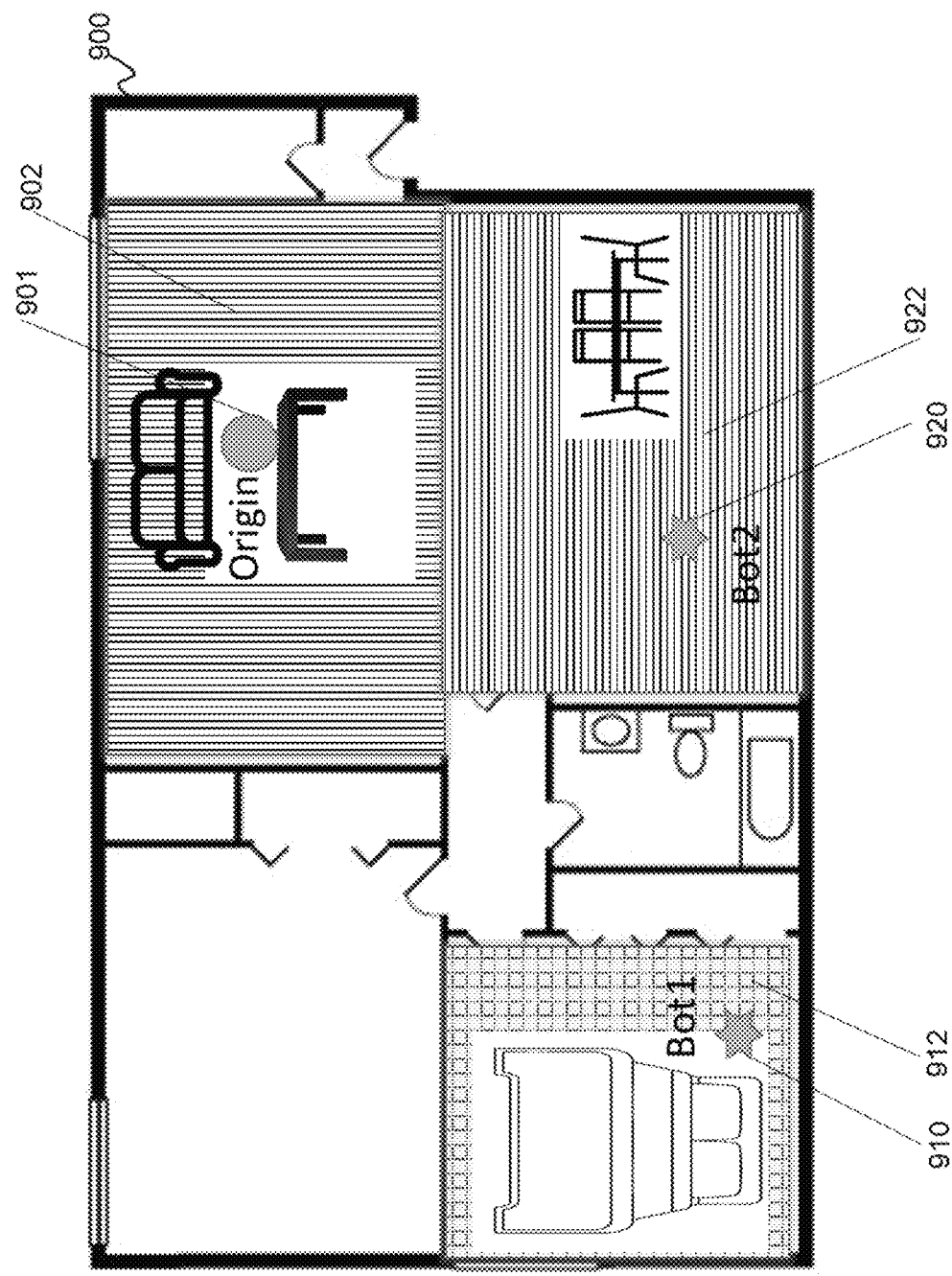
FIG. 9 illustrates an exemplary presentation of the spatial-temporal information in a venue, according to one embodiment of the present teaching.

FIG. 9 illustrates an exemplary presentation of the spatial-temporal information in a venue, according to one embodiment of the present teaching. For example, as shown in FIG. 9, in a 2-bedroom apartment 900, Origin 901 may be placed in the living-room area 902, Bot 1 910 may be placed in a bedroom1-area 912, and Bot 2 920 may be placed in the dining-room area 922. If both Bot 1 910 and Bot 2 920 detect motion/activity, the activity/motion/person/user may be in the living-room area 902. If only Bot 1 910 detects motion/activity, the activity/motion/person/user may be in the bedroom-1 area 912. If only Bot 2 920 detects motion/activity, the activity/motion/person/user may be in the dining-room area 922. If neither of the two Bots detects motion/activity, then nobody may be in the apartment 900. The corresponding area where the activity/motion/person/user is detected may be marked with a predetermined pattern or color.

A number of implementations of the disclosure have been described. Nevertheless, it will be understood that various modifications may be made without departing from the spirit and scope of the disclosure. For example, the wireless transmitter, the wireless receiver, the antenna, the directional antenna, the wireless transmission, the multipath channel, the wireless signal, the object, the object, the processor, the memory, the set of instructions, the channel information (CI), the channel state information (CSI), the power information (PI), the format/features/components/contexts of CI/CSI/PI, the compression/representation/storage/transmission/encryption/processing/preprocessing/post-processing of CI/CSI/PI, the time series format/order/sequencing, the extraction of CI from the wireless signal, the spatial-temporal information, the past information, the initial information, the time quantities, the spatial quantities, the spatial-temporal quantities, the estimated direction, the similarity score, the object, the distance, the movement of the object, the characteristics points, the local device, and/or the computational workload sharing may be different from those described above.

Figure 10:
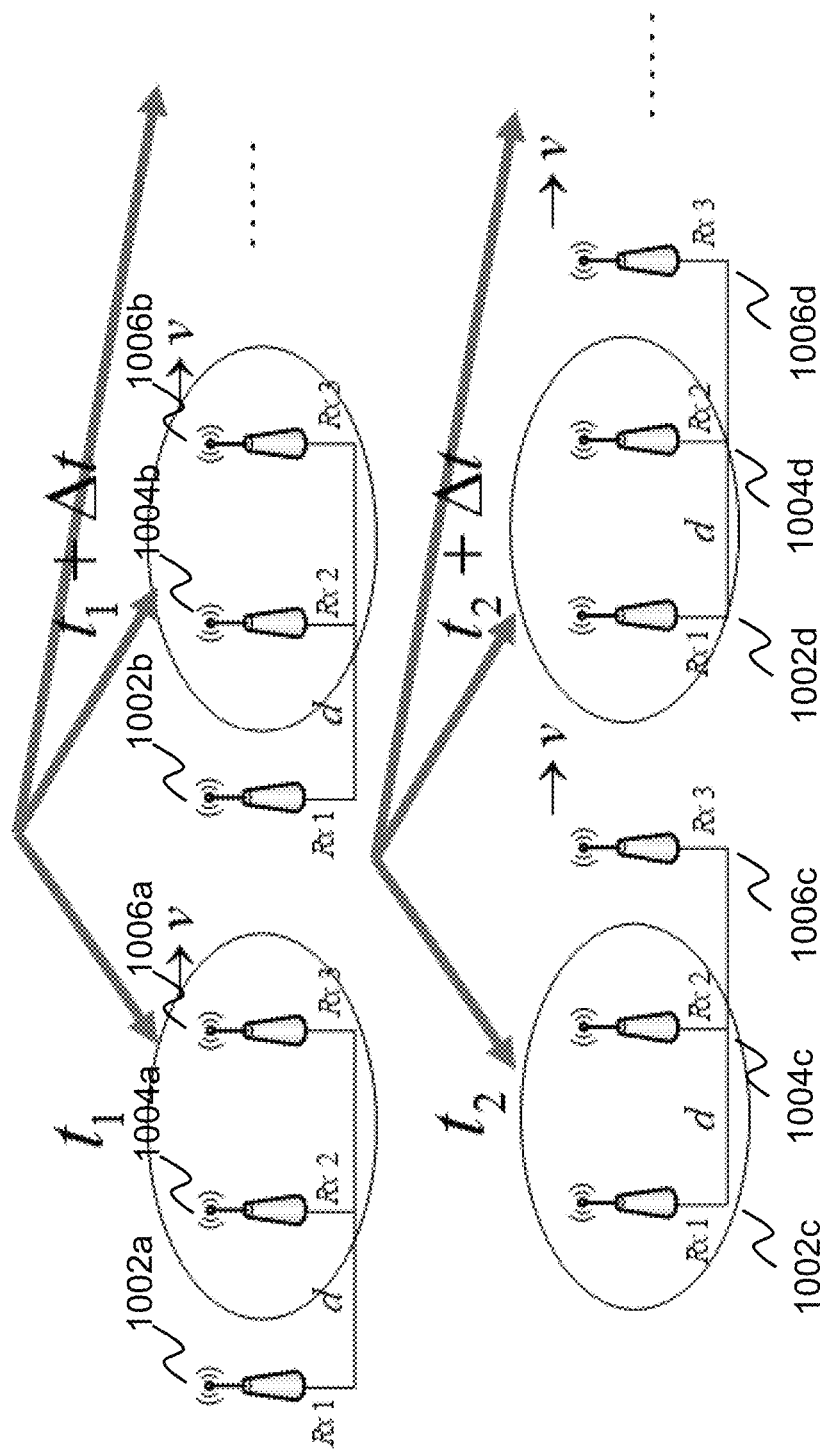
FIG. 10 is an exemplary illustration of antenna matching based speed estimation, according to one embodiment of the present teaching.

The spatial-temporal information may be speed. An exemplary explanation of a speed estimation method is as below. The three receive antennas may be aligned in a line parallel to the moving direction as shown in FIG. 10. FIG. 10 is an exemplary illustration of antenna matching based speed estimation, according to one embodiment of the present teaching. Furthermore, the speed of the receive antennas may change slowly in time, i.e., within a short period, the speed may be approximated to be a constant value v. One may group the receive antennas Rx2 and Rx3 together and call them the leading antennas, and group the receive antennas Rx1 and Rx2 together and call them the following antennas or trailing antennas. This is because the following antennas (or trailing antennas) may go through the same trajectory as the leading antennas, but with an unknown delay T. The speed may be estimated by the relation: $\hat{v}=d/\tau$, where d is the separation between adjacent antennas (equal separation). Therefore, the speed estimation problem may be transformed to the estimation of $\tau$. In the following, the TRRS may be used to estimate $\tau$. Let $H_i(t)$ denote the CSI (or channel information CI) measured at the i-th receive antenna at time t and let $\Delta t$ stand for the duration between two adjacent CSI measurement. For each time $t_1$, one may form the reference CSI, which is measured by the leading antennas, as $H_{lead}(t_1)=[H_2(t_1), H_3(t_1), H_2(t_1+\Delta t), H_3(t_1+\Delta t), \ldots, H_2(t_1+(N-1)\Delta t), H_3(t_1+(N-1)\Delta t)]$, where N may be 1, 2, 3 . . . , and form the CSI for comparison, which is measured by the following antennas (or trailing antennas), as $H_{follow}(t)=[H_1(t), H_2(t), H_1(t+\Delta t), H_2(t+\Delta t), \ldots, H_1(t+(N-1)\Delta t), H_2(t+(N-1)\Delta t]$. The TRRS $\gamma(t_1, t)$ value and/or some similarity measure and/or some distance measure between $H_{lead}(t_1)$ and $H_{follow}(t)$ may be computed. When the following antennas reach the location of the leading antennas corresponding to time $t_1$, $\gamma(t_1, t)$ may achieve its maximum over the variable t. In the example of FIG. 1, one may have $t=t_2$ and thus one may have the estimation $\hat{\tau}=t_2-t_1$.

Figure 11:
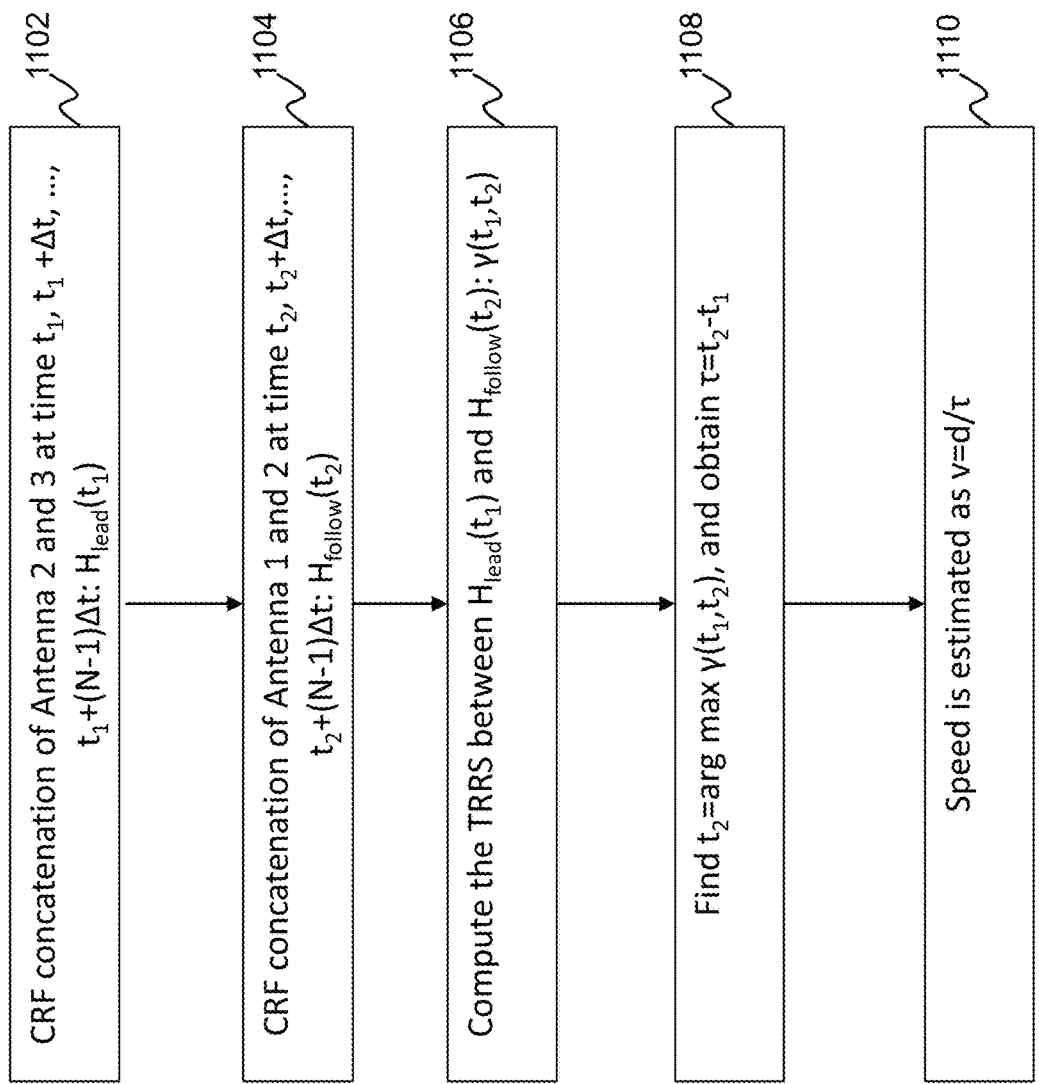
FIG. 11 is a flowchart illustrating a method for antenna matching based speed estimation, according to one embodiment of the present teaching.

An exemplary flow chart of antenna matching based speed estimation is shown in FIG. 11. In operation 1102, the detailed formulation of the CFR concatenation for the leading antennas is $H_{lead}(t_1)=[H_2(t_1), H_3(t_1), H_2(t_1+\Delta t), H_3(t_1+\Delta t), \ldots, H_2(t_1+(N-1)\Delta t), H_3(t_1+(N-1)\Delta t)]$. In operation 1104, the detailed formulation of the CFR concatenation for the following antennas is $H_{follow}(t_2)=[H_1(t_2), H_2(t_2), H_1(t_2+\Delta t), H_2(t_2+\Delta t), \ldots, H_1(t_2+(N-1)\Delta t), H_2(t_2+(N-1)\Delta t)]$. In operation 1106, for each time slot $t_1$, the TRRS $\gamma(t_1, t_2)$ between the two CFR fingerprint $H_{lead}(t_1)$ and $H_{follow}(t_2)$ is computed for different $t_2$'s nearby $t_1$. In operation 1108, it may determine the $t_2$ that gives the maximum value of $\gamma(t_1, t_2)$ and then the delay $\tau$ between the group of leading antennas and the group of following antennas is thus $\tau=t_2-t_1$.

In operation 1110, the speed estimation is thus $v=d/\tau$, where d the distance between any two adjacent uniformly separated antennas.

Accordingly, other embodiments are within the scope of the following claims.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method performed by an object tracking system, comprising:
   detecting at least one time series of channel information (CI) of a wireless multipath channel impacted by a current movement of an object to be tracked in a venue using: a processor, a memory communicatively coupled with the processor and a set of instructions stored in the memory,
      wherein the at least one time series of channel information is detected from a wireless signal transmitted between a Type 1 heterogeneous wireless device at a first position in the venue and a Type 2 heterogeneous wireless device at a second position in the venue through the wireless multipath channel,
   continuously computing a distance of the current movement of the object based on a similarity score between a pair of temporally adjacent CI of the at least one time series of CI associated with the current movement of the object,
   monitoring a spatial-temporal information of the object based on the distance and based on at least one of: the at least one time series of channel information, a time parameter associated with the current movement, and a past spatial-temporal information of the object,
      wherein the at least one time series of channel information is preprocessed,
      wherein the spatial-temporal information is related to the current movement of the object and comprises at least one of: a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a time stamp, a time period, a time window, a sliding time window, a history, a frequency trend, a spatial-temporal trend, a spatial-temporal change, and an event,
      wherein computational workload associated with the method is shared among the processor, the Type 1 heterogeneous wireless device and the Type 2 heterogeneous wireless device, and
   tracking the object based on the spatial-temporal information,
      wherein the tracking the object comprises at least one of: determining a map location of the object, tracking the location of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting an event associated with the current movement of the object, detecting a fall-down movement of the object, presenting the location of the object, and graphical display of the location of the object.

2. The method of claim 1, further comprising:
   determining the distance of the current movement of the object based on the at least one time series of channel information; and
   obtaining an estimated direction of the current movement of the object,
      wherein the spatial-temporal information of the object is determined based on at least one of: the distance and the estimated direction of the current movement of the object.

3. The method of claim 1, wherein continuously computing the distance comprises:
   computing at least one similarity score each based on a pair of temporally adjacent CI of the time series of CI associated with the current movement of the object;
   computing a characteristic similarity score based on the at least one similarity score; and
   determining the distance of the current movement of the object based on comparing the characteristic similar score to a reference decay curve.

4. The method of claim 1, further comprising:
   determining at least one most recent CI each being most recent in one of the at least one time series of CI;
   computing at least one time series of similarity scores, each similarity score being computed based on two CI of a particular time series associated with the similarity score: the most recent CI, and a temporally adjacent CI within a time window associated with the current movement of the object;
   determining at least one curve, each based on a time series of similar scores; and
   identifying at least one feature point each associated with one of the at least one curve,
      wherein the spatial-temporal information of the object is determined based on the at least one feature point,
      wherein the at least one feature point comprises at least one of: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and another feature point.

5. The method of claim 1, further comprising:
   computing at least one second similarity score each based on an initial CI and a current CI,
      wherein the initial CI is temporally close to a beginning of the current movement,
      wherein the current CI is temporally close to an end of the current movement;
   determining a characteristic second similarity score based on the at least one second similar score; and
   determining the object to be stationary and the current movement to be a null movement if the characteristic second similarity score is greater than a threshold.

6. The method of claim 1, further comprising:
   preprocessing the at least one time series of channel information, which comprises at least one of: doing nothing, de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and another preprocessing; and computing a similarity score based on a pair of temporally adjacent CI of a particular time series of CI,
  wherein the similarity score is at least one of: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and another score, and
  wherein the channel information is associated with at least one of:
    signal strength, signal amplitude, signal phase,
    attenuation of the wireless signal through the wireless multipath channel,
    received signal strength indicator (RSSI),
    channel state information (CSI),
    an equalizer information,
    a channel impulse response,
    a frequency domain transfer function,
    information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics,
    information associated with at least one of: a time period, a time signature, a time amplitude, a time phase, a time trend, and a time characteristics,
    information associated with at least one of: a time-frequency partition, a time-frequency signature, a time-frequency amplitude, a time frequency phase, a time-frequency trend, and a time-frequency characteristics,
    information associated with a direction, an angle of arrival, an angle of a directional antenna, and a phase, and
    another channel information,
  of the wireless signal through the wireless multipath channel,
  wherein the spatial-temporal information of the object is determined based on the similarity score.

7. The method of claim 1, further comprising:
determining an initial spatial-temporal information of the object at an initial time prior to the current movement of the object based on another time series of another channel information (CI) associated with a prior movement of the object,
  wherein the another time series of the another channel information is extracted from a second wireless signal transmitted between a second Type 1 heterogeneous device at a third position in the venue and a second Type 2 heterogeneous device at a fourth position in the venue through the wireless multipath channel,
  wherein the wireless multipath channel is impacted by the prior movement of the object;
determining the initial spatial-temporal information of the object at the initial time to be a known location associated with at least one of: the second Type 1 heterogeneous device and the second Type 2 heterogeneous device;
determining a time period in which essentially all corresponding CI of the another time series of the another CI is at least one of: larger than a first adaptive threshold and smaller than a second adaptive threshold; and
determining the initial time as a characteristic point of the time period,
  wherein the spatial-temporal information of the object is determined based on the initial spatial-temporal information of the object at the initial time,
  wherein the characteristic point of the time period is at least one of: a mid-point, a quartile point, a percentile point, a starting point, an ending point, a point at which the another CI is locally maximum, a point at which the another CI is locally minimum, a point at which the another CI has a certain characteristics, and another characteristic point.

8. The method of claim 7:
wherein, at the initial time during the prior movement of the object, one of the second Type 1 heterogeneous device and the second Type 2 heterogeneous device is spatially close to and moves with the object;
wherein, at the initial time, the other one of the second Type 1 heterogeneous device and the second Type 2 heterogeneous device has a directional antenna;
wherein the initial spatial-temporal information of the object at the initial time is determined to be a known location associated with the other one of the second Type 1 heterogeneous device and the second Type 2 heterogeneous device with the directional antenna;
wherein, at a current time during the movement of the object, one of the first Type 1 heterogeneous device and the first Type 2 heterogeneous device is spatially close to and moves with the object;
wherein, at the current time, one of the first Type 1 heterogeneous device and the first Type 2 heterogeneous device is at least one of:
  communicatively coupled with a network server, and
  communicatively coupled with a local device that is communicatively coupled with the network server;
wherein the local device is at least one of: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and another device.

9. The method of claim 1, further comprising:
computing at least one time series of power information (PI) based on the at least one time series of CI, wherein each PI is associated with a CI, with real part of the PI computed based on at least one of: magnitude, square of magnitude, phase, real part, imaginary part and another function, of the CI;

computing a first function of the at least one time series of PI, wherein the first function comprises an operation on at least one of: an autocorrelation function, a square of autocorrelation function, an autocovariance function, a square of auto-covariance function, an inner product, an auto-correlation-like function, and a covariance-like function, wherein the operation comprises at least one of: a polynomial function, a linear function, a nonlinear function, a filtering, a de-noising, a smoothing, a conditioning, an enhancement, a restoration, a feature extraction, a weighted averaging, a high-pass filtering, a low-pass filtering, a bandpass filtering, a median filtering, a quartile filtering, a percentile filtering, a mode filtering, a linear filtering, a nonlinear filtering, a finite impulse response (FIR) filtering, an infinite impulse response (IIR) filtering, a moving average (MA) filtering, an auto-regressive (AR) filtering, an autoregressive moving average (ARMA) filtering, a selective filtering, an adaptive filtering, a thresholding, a soft thresholding, a hard thresholding, a soft clipping, a first derivative, a second derivative, a higher order derivative, a local maximization, a local minimization, an optimization of a cost function, a neural network, a machine learning, a supervised learning, an unsupervised learning, a semi-supervised learning, a zero crossing, an absolute function, an indicator function, a Fourier transform, a Laplace transform, a Hadamard transform, another transform, a transformation, a decomposition, a derivative, a first order derivative, a second order derivative, a higher order derivative, a convolution, a multiplication, a division, zero crossing, an indicator function, an absolute conversion, a preprocessing, a post-processing, and another operation;

determining at least one characteristics of the first function, wherein the at least one characteristics comprises: a local maximum, a local minimum, a local extremum, a constrained (with argument within a constraint) maximum, a constrained minimum, a constrained extremum, a maximum slope, a minimum slope, a constrained maximum slope, a constrained minimum slope, a maximum higher order derivative, a minimum higher order derivative, a constrained higher order derivative, a zero-crossing, a constrained zero-crossing, a zero-crossing of slope, a zero-crossing of higher order derivative, and another characteristics; and identifying at least one argument of the first function associated with the at least one characteristics of the first function, wherein the spatial-temporal information of the object is determined based on the at least one argument of the first function.

10. The method of claim 1, further comprising:

causing the Type 1 heterogeneous wireless device to switch wireless coupling from the Type 2 heterogeneous wireless device to a second Type 2 heterogeneous wireless device at another location in the venue, wherein the Type 1 heterogeneous device is capable of wirelessly coupling with at least two Type 2 heterogeneous devices;

causing a second wireless signal to be transmitted between the Type 1 heterogeneous device and the second Type 2 heterogeneous device through the wireless multipath channel that is impacted by the current movement of the object in the venue;

obtaining at least one second time series of channel information (CI) of the wireless multipath channel, wherein the at least one second time series of channel information is extracted from the second wireless signal; and determining the spatial-temporal information of the object based on the at least one second time series of channel information.

11. An object tracking server, comprising:

a processor;

a memory communicatively coupled with the processor; and a set of instructions stored in the memory which when executed by the processor causes the object tracking server to:

detect at least one time series of channel information (CI) of a wireless multipath channel impacted by a current movement of an object in a venue, wherein the at least one time series of channel information is detected from a wireless signal transmitted between a Type 1 heterogeneous wireless device at a first position in a venue and a Type 2 heterogeneous wireless device at a second position in the venue through the wireless multipath channel, continuously compute a distance of the current movement of the object based on a similarity score between a pair of temporally adjacent CI of the at least one time series of CI associated with the current movement of the object, monitor a spatial-temporal information of the object based on the distance and based on at least one of: the at least one time series of channel information, a time parameter associated with the current movement, and a past spatial-temporal information of the object, wherein the at least one time series of channel information is preprocessed, wherein the spatial-temporal information is related to the current movement of the object and comprises at least one of: a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a time stamp, a time period, a time window, a sliding time window, a history, a frequency trend, a spatial-temporal trend, a spatial-temporal change, and an event, wherein computational workload is shared by the processor with the Type 1 heterogeneous wireless device and Type 2 heterogeneous wireless device, track the object based on the spatial-temporal information, wherein the tracking the object comprises at least one of: determining a location of the object, tracking the location of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting an event associated with the current movement of the object, detecting a fall-down movement of the object, presenting the location of the object, and graphical display of the location of the object.

12. The object tracking server of claim 11, wherein the set of instructions causes the object tracking server further to:
determine the distance of the current movement of the object based on the at least one time series of the channel information; and
obtain an estimated direction of the current movement of the object,
wherein the spatial-temporal information of the object is determined based on at least one of: the distance and the estimated direction of the current movement of the object.

13. The object tracking server of claim 11, wherein the set of instructions causes the object tracking server further to:
compute at least one similarity score each based on a pair of temporally adjacent CI of the time series of CI associated with the current movement of the object;
compute a characteristic similarity score based on the at least one similarity score; and
determine the distance of the current movement of the object based on comparing the characteristic similar score to a reference decay curve.

14. The object tracking server of claim 11, wherein the set of instructions causes the object tracking server further to:
determine at least one most recent CI each being most recent in one of the at least one time series of CI;
compute at least one time series of similarity scores, each similarity score being computed based on two CI of a particular time series associated with the similarity score: the most recent CI and a temporally adjacent CI within a time window associated with the current movement of the object;
determine at least one curve, each based on a time series of similar scores; and
identify at least one feature point, each associated with a curve,
wherein the spatial-temporal information of the object is determined based on the at least one feature point,
wherein the at least one feature point comprises at least one of: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and another feature point.

15. The object tracking server of claim 11, wherein the set of instructions causes the object tracking server further to:
compute at least one second similarity score each based on an initial CI and a current CI, wherein the initial CI is temporally close to a beginning of the current movement, wherein the current CI is temporally close to an end of the current movement;
determine a characteristic second similarity score based on the at least one second similar score; and
determine the object to be stationary and the current movement to be a null movement if the characteristic second similarity score is greater than a threshold.

16. The object tracking server of claim 11, wherein the set of instructions causes the object tracking server further to:
preprocess the at least one time series of channel information, which comprises at least one of: doing nothing, de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, non-linear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and another preprocessing; and
compute a similarity score based on a pair of temporally adjacent CI of the time series of CI,
wherein the similarity score is at least one of: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and another score, and
wherein the channel information is associated with at least one of:
signal strength, signal amplitude, signal phase,
attenuation of the wireless signal through the wireless multipath channel,
received signal strength indicator (RSSI),
channel state information (CSI),
an equalizer information,
a channel impulse response,
a frequency domain transfer function,
information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics,
information associated with at least one of: a time period, a time signature, a time amplitude, a time phase, a time trend, and a time characteristics,
information associated with at least one of: a time-frequency partition, a time-frequency signature, a time-frequency amplitude, a time frequency phase, a time-frequency trend, and a time-frequency characteristics, information associated with a direction, an angle of arrival, an angle of a directional antenna, and a phase, and another channel information, of the wireless signal through the wireless multipath channel, wherein the spatial-temporal information of the object is determined based on the similarity score.

17. The object tracking server of claim 11, wherein the set of instructions causes the object tracking server further to:

determine an initial spatial-temporal information of the object at an initial time prior to the current movement of the object based on another time series of another channel information (CI) associated with a prior movement of the object, wherein the another time series of the another channel information is extracted from a second wireless signal transmitted between a second Type 1 heterogeneous device at a third position in the venue and a second Type 2 heterogeneous device at a fourth position in the venue through the wireless multipath channel, wherein the wireless multipath channel is impacted by the prior movement of the object;

determine the initial spatial-temporal information of the object at the initial time to be a known location associated with at least one of: the second Type 1 heterogeneous device and the second Type 2 heterogeneous device;

determine a time period in which essentially all corresponding CI of the another time series of the another CI is at least one of: larger than a first adaptive threshold and smaller than a second adaptive threshold; and determine the initial time as a characteristic point of the time period, wherein the spatial-temporal information of the object is determined based on the initial spatial-temporal information of the object at the initial time, wherein the characteristic point of the time period is at least one of: a mid-point, a quartile point, a percentile point, a starting point, an ending point, a point at which the another CI is locally maximum, a point at which the another CI is locally minimum, a point at which the another CI has a certain characteristics, and another characteristic point.

18. The object tracking server of claim 17:

wherein, at the initial time during the prior movement of the object, one of the second Type 1 heterogeneous device and the second Type 2 heterogeneous device is spatially close to and moves with the object;

wherein, at the initial time, the other one of the second Type 1 heterogeneous device and the second Type 2 heterogeneous device has a directional antenna;

wherein the initial spatial-temporal information of the object at the initial time is determined to be a known location associated with the other one of the second Type 1 heterogeneous device and the second Type 2 heterogeneous device with the directional antenna;

wherein, at a current time during the movement of the object, one of the first Type 1 heterogeneous device and the first Type 2 heterogeneous device is spatially close to and moves with the object;

wherein, at the current time, one of the first Type 1 heterogeneous device and the first Type 2 heterogeneous device is at least one of: communicatively coupled with a network server, and communicatively coupled with a local device that is communicatively coupled with the network server;

wherein the local device is at least one of: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and another device.

19. The object tracking server of claim 11, wherein the set of instructions causes the object tracking server further to:

compute at least one time series of power information (PI) based on the at least one time series of CI, wherein each PI is associated with a CI, with real part of the PI computed based on at least one of: magnitude, square of magnitude, phase, real part, imaginary part and another function, of the CI;

compute a first function of the at least one time series of PI, wherein the first function comprises an operation on at least one of: an autocorrelation function, a square of autocorrelation function, an autocovariance function, a square of auto-covariance function, an inner product, an auto-correlation-like function, and a covariance-like function, wherein the operation comprises at least one of: a polynomial function, a linear function, a nonlinear function, a filtering, a de-noising, a smoothing, a conditioning, an enhancement, a restoration, a feature extraction, a weighted averaging, a high-pass filtering, a low-pass filtering, a bandpass filtering, a median filtering, a quartile filtering, a percentile filtering, a mode filtering, a linear filtering, a non-linear filtering, a finite impulse response (FIR) filtering, an infinite impulse response (IIR) filtering, a moving average (MA) filtering, an auto-regressive (AR) filtering, an autoregressive moving average (ARMA) filtering, a selective filtering, an adaptive filtering, a thresholding, a soft thresholding, a hard thresholding, a soft clipping, a first derivative, a second derivative, a higher order derivative, a local maximization, a local minimization, an optimization of a cost function, a neural network, a machine learning, a supervised learning, an unsupervised learning, a semi-supervised learning, a zero crossing, an absolute function, an indicator function, a Fourier transform, a Laplace transform, a Hadamard transform, another transform, a transformation, a decomposition, a derivative, a first order derivative, a second order derivative, a higher order derivative, a convolution, a multiplication, a division, zero crossing, an indicator function, an absolute conversion, a preprocessing, a post-processing, and another operation;

determine at least one characteristics of the first function, wherein the at least one characteristics comprises: a local maximum, a local minimum, a local extremum, a constrained (with argument within a constraint) maximum, a constrained minimum, a constrained extremum, a maximum slope, a minimum slope, a constrained maximum slope, a constrained minimum slope, a maximum higher order derivative, a minimum higher order derivative, a constrained higher order derivative, a zero-crossing, a constrained zero-crossing, a zero-crossing of slope, a zero-crossing of higher order derivative, and another characteristics; and identify at least one argument of the first function associated with the at least one characteristics of the first function, wherein the spatial-temporal information of the object is determined based on the at least one argument of the first function.

20. The object tracking server of claim 11, wherein the set of instructions causes the object tracking server further to:

obtain at least one second time series of channel information (CI) of the wireless multipath channel, wherein the at least one second time series of channel information is extracted from a second wireless signal; and determine the spatial-temporal information of the object based on the at least one second time series of channel information, wherein the Type 1 heterogeneous device is capable of wirelessly coupling with multiple Type 2 heterogeneous devices;

wherein the Type 1 heterogeneous wireless device to switch wireless coupling from the Type 2 heterogeneous wireless device to a second Type 2 heterogeneous wireless device at another location in the venue, wherein the second wireless signal is transmitted between the Type 1 heterogeneous device and the second Type 2 heterogeneous device through the wireless multipath channel that is impacted by the current movement of the object in the venue.

21. A system for object tracking, comprising:

a Type 1 heterogeneous wireless device at a first position in a venue;

a Type 2 heterogeneous wireless device at a second position in the venue wirelessly coupled with the Type 1 heterogeneous device through a wireless multipath channel associated with the venue; and an object tracking server including a processor, a memory communicatively coupled with the processor and a set of instructions stored in the memory executed by the processor, wherein the object tracking server, the Type 1 heterogeneous device and the Type 2 heterogeneous device are configured to:

detect at least one time series of channel information (CI) of the wireless multipath channel impacted by a current movement of an object in the venue, wherein the at least one time series of channel information is detected from a wireless signal transmitted between the Type 1 heterogeneous device and the Type 2 heterogeneous device through the wireless multipath channel, continuously compute a distance of the current movement of the object based on a similarity score between a pair of temporally adjacent CI of the at least one time series of CI associated with the current movement of the object, monitor a spatial-temporal information of the object based on the distance and based on at least one of: the at least one time series of channel information, a time parameter associated with the current movement, and a past spatial-temporal information of the object, wherein the at least one time series of channel information is preprocessed, wherein the spatial-temporal information is related to the current movement of the object and comprises at least one of: a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a time stamp, a time period, a time window, a sliding time window, a history, a frequency trend, a spatial-temporal trend, a spatial-temporal change, and an event, track the object based on the spatial-temporal information, wherein the tracking the object comprises at least one of: determining a location of the object, tracking the location of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting an event associated with the current movement of the object, detecting a fall-down movement of the object, presenting the location of the object, and graphical display of the location of the object; and share computational workload among the processor, the Type 1 heterogeneous wireless device and Type 2 heterogeneous wireless device.

22. The system of claim 21, wherein the object tracking server, the Type 1 heterogeneous device and the Type 2 heterogeneous device are further configured to:

determine the distance of the current movement of the object based on the at least one time series of the channel information; and obtain an estimated direction of the current movement of the object, wherein the spatial-temporal information of the object is determined based on at least one of: the distance and the estimated direction of the current movement of the object.

23. The system of claim 21, wherein the object tracking server, the Type 1 heterogeneous device and the Type 2 heterogeneous device are further configured to:

compute at least one similarity score each based on a pair of temporally adjacent CI of the time series of CI associated with the current movement of the object;

compute a characteristic similarity score based on the at least one similarity score; and determine the distance of the current movement of the object based on comparing the characteristic similar score to a reference decay curve.

24. The system of claim 21, wherein the object tracking server, the Type 1 heterogeneous device and the Type 2 heterogeneous device are further configured to:

determine at least one most recent CI each being most recent in one of the at least one time series of CI;

compute at least one time series of similarity scores, each similarity score being computed based on two CI of a particular time series associated with the similarity score: the most recent CI, and a temporally adjacent CI within a time window associated with the current movement of the object;

determine at least one curve, each based on a time series of similar scores; and identify at least one feature point each associated with a curve,
wherein the spatial-temporal information of the object is determined based on the at least one feature point,
wherein the at least one feature point comprises at least one of: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and another feature point.

25. The system of claim 21, wherein the object tracking server, the Type 1 heterogeneous device and the Type 2 heterogeneous device are further configured to:

compute at least one second similarity score each based on an initial CI and a current CI, wherein the initial CI is temporally close to a beginning of the current movement, wherein the current CI is temporally close to an end of the current movement;

determine a characteristic second similarity score based on the at least one second similar score; and determine the object to be stationary and the current movement to be a null movement if the characteristic second similarity score is greater than a threshold.

26. The system of claim 21, wherein the object tracking server, the Type 1 heterogeneous device and the Type 2 heterogeneous device are further configured to:

preprocess the at least one time series of channel information, which comprises at least one of: doing nothing, de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, non-linear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and another preprocessing; and compute a similarity score based on a pair of temporally adjacent CI of the time series of CI,
wherein the similarity score is at least one of: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and another score, and wherein the channel information is associated with at least one of:
signal strength, signal amplitude, signal phase,
attenuation of the wireless signal through the wireless multipath channel,
received signal strength indicator (RSSI),
channel state information (CSI),
an equalizer information,
a channel impulse response,
a frequency domain transfer function,
information associated with at least one of: a frequency band, a frequency signature, a frequency phase, a frequency amplitude, a frequency trend, a frequency characteristics, a frequency-like characteristics, an orthogonal decomposition characteristics, and a non-orthogonal decomposition characteristics,
information associated with at least one of: a time period, a time signature, a time amplitude, a time phase, a time trend, and a time characteristics,
information associated with at least one of: a time-frequency partition, a time-frequency signature, a time-frequency amplitude, a time frequency phase, a time-frequency trend, and a time-frequency characteristics,
information associated with a direction, an angle of arrival, an angle of a directional antenna, and a phase, and
another channel information,
of the wireless signal through the wireless multipath channel,
wherein the spatial-temporal information of the object is determined based on the similarity score.

27. The system of claim 21, wherein the object tracking server, the Type 1 heterogeneous device and the Type 2 heterogeneous device are further configured to:

determine an initial spatial-temporal information of the object at an initial time prior to the current movement of the object based on another time series of another channel information (CI) associated with a prior movement of the object,
wherein the another time series of the another channel information is extracted from a second wireless signal transmitted between a second Type 1 heterogeneous device at a third position in the venue and a second Type 2 heterogeneous device at a fourth position in the venue through the wireless multipath channel,
wherein the wireless multipath channel is impacted by the prior movement of the object;

determine the initial spatial-temporal information of the object at the initial time to be a known location associated with at least one of: the second Type 1 heterogeneous device and the second Type 2 heterogeneous device;

determine a time period in which essentially all corresponding CI of the another time series of the another CI is at least one of: larger than a first adaptive threshold and smaller than a second adaptive threshold; and determine the initial time as a characteristic point of the time period,
wherein the spatial-temporal information of the object is determined based on the initial spatial-temporal information of the object at the initial time,
wherein the characteristic point of the time period is at least one of: a mid-point, a quartile point, a percentile point, a starting point, an ending point, a point at which the another CI is locally maximum, a point at which the another CI is locally minimum, a point at which the another CI has a certain characteristics, and another characteristic point.

28. The system of claim 27:
wherein, at the initial time during the prior movement of the object, one of the second Type 1 heterogeneous device and the second Type 2 heterogeneous device is spatially close to and moves with the object;
wherein, at the initial time, the other one of the second Type 1 heterogeneous device and the second Type 2 heterogeneous device has a directional antenna;
wherein the initial spatial-temporal information of the object at the initial time is determined to be a known location associated with the other one of the second Type 1 heterogeneous device and the second Type 2 heterogeneous device with the directional antenna;
wherein, at a current time during the movement of the object, one of the first Type 1 heterogeneous device and the first Type 2 heterogeneous device is spatially close to and moves with the object;
wherein, at the current time, one of the first Type 1 heterogeneous device and the first Type 2 heterogeneous device is at least one of:
  communicatively coupled with a network server, and
  communicatively coupled with a local device that is communicatively coupled with the network server;
wherein the local device is at least one of: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and another device.

29. The system of claim 21, wherein the object tracking server, the Type 1 heterogeneous device and the Type 2 heterogeneous device are further configured to:
  compute at least one time series of power information (PI) based on the at least one time series of CI,
    wherein each PI is associated with a CI, with real part of the PI computed based on at least one of: magnitude, square of magnitude, phase, real part, imaginary part and another function, of the CI;
  compute a first function of the at least one time series of PI,
    wherein the first function comprises an operation on at least one of: an autocorrelation function, a square of autocorrelation function, an autocovariance function, a square of auto-covariance function, an inner product, an auto-correlation-like function, and a covariance-like function,
    wherein the operation comprises at least one of: a polynomial function, a linear function, a nonlinear function, a filtering, a de-noising, a smoothing, a conditioning, an enhancement, a restoration, a feature extraction, a weighted averaging, a high-pass filtering, a low-pass filtering, a bandpass filtering, a median filtering, a quartile filtering, a percentile filtering, a mode filtering, a linear filtering, a non-linear filtering, a finite impulse response (FIR) filtering, an infinite impulse response (IIR) filtering, a moving average (MA) filtering, an auto-regressive (AR) filtering, an autoregressive moving average (ARMA) filtering, a selective filtering, an adaptive filtering, a thresholding, a soft thresholding, a hard thresholding, a soft clipping, a first derivative, a second derivative, a higher order derivative, a local maximization, a local minimization, an optimization of a cost function, a neural network, a machine learning, a supervised learning, an unsupervised learning, a semi-supervised learning, a zero crossing, an absolute function, an indicator function, a Fourier transform, a Laplace transform, a Hadamard transform, another transform, a transformation, a decomposition, a derivative, a first order derivative, a second order derivative, a higher order derivative, a convolution, a multiplication, a division, zero crossing, an indicator function, an absolute conversion, a preprocessing, a post-processing, and another operation;
  determine at least one characteristics of the first function,
    wherein the at least one characteristics comprises: a local maximum, a local minimum, a local extremum, a constrained (with argument within a constraint) maximum, a constrained minimum, a constrained extremum, a maximum slope, a minimum slope, a constrained maximum slope, a constrained minimum slope, a maximum higher order derivative, a minimum higher order derivative, a constrained higher order derivative, a zero-crossing, a constrained zero-crossing, a zero-crossing of slope, a zero-crossing of higher order derivative, and another characteristics; and
  identify at least one argument of the first function associated with the at least one characteristics of the first function,
    wherein the spatial-temporal information of the object is determined based on the at least one argument of the first function.

30. The system of claim 21, wherein the object tracking server, the Type 1 heterogeneous device and the Type 2 heterogeneous device are further configured to:
  obtain at least one second time series of channel information (CI) of the wireless multipath channel,
    wherein the at least one second time series of channel information is extracted from a second wireless signal; and
  determine the spatial-temporal information of the object based on the at least one second time series of channel information,
    wherein the Type 1 heterogeneous device is capable of wirelessly coupling with multiple Type 2 heterogeneous devices;
    wherein the Type 1 heterogeneous wireless device to switch wireless coupling from the Type 2 heterogeneous wireless device to a second Type 2 heterogeneous wireless device at another location in the venue,
  wherein the second wireless signal is transmitted between the Type 1 heterogeneous device and the second Type 2 heterogeneous device through the wireless multipath channel that is impacted by the current movement of the object in the venue.

* * * * *